(12) United States Patent
Asao et al.

(10) Patent No.: US 6,195,147 B1
(45) Date of Patent: Feb. 27, 2001

(54) LIQUID CRYSTAL SUBSTRATE WITH OPTICAL MODULATION REGION HAVING DIFFERENT ALIGNMENT CONTROL FORCES

(75) Inventors: Yasufumi Asao; Yasuyuki Watanabe, both of Atsugi; Masahiro Terada, Hadano; Shosei Mori, Hiratsuka; Seishi Miura, Ebina; Takashi Moriyama, Atsugi, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/126,857

(22) Filed: Jul. 31, 1998

(30) Foreign Application Priority Data

Aug. 1, 1997 (JP) .................................................. 9-207924
Aug. 1, 1997 (JP) .................................................. 9-207925
Aug. 1, 1997 (JP) .................................................. 9-207926

(51) Int. Cl.$^7$ .......................... G02F 1/141; G02F 1/1337; C09F 19/02
(52) U.S. Cl. .......................... 349/133; 349/129; 349/134; 349/172; 349/184
(58) Field of Search .................... 349/129, 133, 349/134, 172, 184

(56) References Cited

U.S. PATENT DOCUMENTS

| | | | |
|---|---|---|---|
| 4,367,924 | 1/1983 | Clark et al. | 350/334 |
| 4,720,173 | 1/1988 | Okada et al. | 350/341 |
| 4,820,026 | 4/1989 | Okada et al. | 350/341 |
| 4,932,757 | 6/1990 | Hanyu et al. | 350/339 R |
| 4,932,758 | 6/1990 | Hanyu et al. | 350/350 S |
| 5,007,716 | 4/1991 | Hanyu et al. | 350/336 |
| 5,082,587 | 1/1992 | Janulis | 252/299.01 |
| 5,103,331 | 4/1992 | Taniguchi et al. | 359/81 |
| 5,165,076 | 11/1992 | Tsuboyama et al. | 359/75 |
| 5,192,596 | 3/1993 | Hanyu et al. | 428/1 |
| 5,200,848 | 4/1993 | Hanyu et al. | 359/100 |
| 5,262,082 | 11/1993 | Janulis et al. | 252/299.01 |
| 5,268,780 | 12/1993 | Hanyu et al. | 359/75 |
| 5,268,783 | 12/1993 | Yoshinaga et al. | 359/103 |
| 5,301,049 | * 4/1994 | Katagiri et al. | 359/90 |
| 5,303,076 | * 4/1994 | Okada et al. | 359/78 |
| 5,316,805 | 5/1994 | Hanyu et al. | 428/1 |
| 5,320,883 | 6/1994 | Asaoka et al. | 428/1 |

(List continued on next page.)

FOREIGN PATENT DOCUMENTS

| | | |
|---|---|---|
| 56-107216 | 8/1981 | (JP) . |
| 59-193426 | 11/1984 | (JP) . |
| 59-193427 | 11/1984 | (JP) . |
| 60-156046 | 8/1985 | (JP) . |
| 60-156047 | 8/1985 | (JP) . |
| 2-142753 | 5/1990 | (JP) . |
| 6-027451 | 2/1994 | (JP) . |
| 8-262447 | 10/1996 | (JP) . |

*Primary Examiner*—William L. Sikes
*Assistant Examiner*—Tarifur R. Chowdhury
(74) *Attorney, Agent, or Firm*—Fitzpatrick, Cella, Harper & Scinto

(57) ABSTRACT

A liquid crystal device is constituted by a pair of substrates and a liquid crystal disposed in a uniform alignment state between the substrates. At least one of the substrate has a surface contacting the liquid crystal and including a first region having a larger uniaxial alignment control force and a second region having a smaller or substantially no uniaxial alignment control force, respectively acting on the liquid crystal. In the device, phase transition from liquid phase to mesomorphic phase on temperature decrease, of the liquid crystal has been initiated from a portion contacting the first region and enlarged toward the second region to place the liquid crystal in a uniform alignment state, thus ensuring an increased effective voltage applied to the liquid crystal while retaining a good alignment characteristic to improve drive and display characteristics.

76 Claims, 16 Drawing Sheets

U.S. PATENT DOCUMENTS

| | | | |
|---|---|---|---|
| 5,325,219 | 6/1994 | Hanyu et al. | 359/78 |
| 5,347,381 | 9/1994 | Shinomiya et al. | 359/78 |
| 5,353,141 | 10/1994 | Onuma et al. | 359/76 |
| 5,381,256 | 1/1995 | Hanyu et al. | 359/75 |
| 5,417,813 | 5/1995 | Berg | 203/60 |
| 5,419,932 | 5/1995 | Togano et al. | 428/1 |
| 5,426,525 | 6/1995 | Hanyu et al. | 359/76 |
| 5,452,114 * | 9/1995 | Hotta et al. | 359/75 |
| 5,453,861 | 9/1995 | Shinjo et al. | 359/78 |
| 5,467,209 | 11/1995 | Hotta et al. | 359/74 |
| 5,473,448 | 12/1995 | Yoshinaga et al. | 359/51 |
| 5,475,515 | 12/1995 | Yoshinaga et al. | 359/52 |
| 5,510,159 | 4/1996 | Asaoka et al. | 428/1 |
| 5,541,752 | 7/1996 | Taniguchi et al. | 359/78 |
| 5,543,943 | 8/1996 | Hanyu et al. | 359/43 |
| 5,583,680 | 12/1996 | Nakamura et al. | 349/134 |
| 5,589,964 | 12/1996 | Hotta et al. | 349/160 |
| 5,612,802 * | 3/1997 | Okada et al. | 349/129 |
| 5,641,427 | 6/1997 | Shinjo et al. | 252/299.01 |
| 5,666,217 * | 9/1997 | Kaneko et al. | 349/122 |
| 5,724,114 * | 3/1998 | Katagiri et al. | 349/134 |
| 5,750,214 | 5/1998 | Ito et al. | 428/1 |
| 5,786,879 * | 7/1998 | Kodera et al. | 349/134 |
| 5,812,227 | 9/1998 | Toshida et al. | 349/88 |
| 5,825,447 * | 10/1998 | Hanyu et al. | 349/128 |
| 5,863,458 * | 1/1999 | Miyata et al. | 252/299.01 |
| 5,877,836 * | 3/1999 | Miura et al. | 349/184 |
| 5,880,803 * | 3/1999 | Tamai et al. | 349/156 |
| 5,973,761 * | 10/1999 | Gofuku et al. | 349/128 |

* cited by examiner

LIQUID CRYSTAL SUBSTRATE WITH OPTICAL MODULATION REGION HAVING DIFFERENT ALIGNMENT CONTROL FORCES

FIELD OF THE INVENTION AND RELATED ART

The present invention relates to a liquid crystal device for use in light-valves for flat-panel displays, projection displays, printers, etc. The present invention also relates to an aligning method of a liquid crystal in the liquid crystal device and a process for producing the liquid crystal device.

As a type of a nematic liquid crystal display device used heretofore, there has been known an active matrix-type, a liquid crystal device wherein each pixel is provided with an active element (e.g., a thin film transistor (TFT)).

As a nematic liquid crystal material used for such an active matrix-type liquid crystal device using a TFT, there has been presently widely used a twisted nematic (TN) liquid crystal as disclosed by M. Schadt and W. Helfrich, "Applied Physics Letters", Vol. 18, No. 4 (Feb. 17, 1971), pp. 127–128.

In recent years, there has been proposed a liquid crystal device of In-Plain Switching mode utilizing an electric field applied in a longitudinal direction of the device, thus improving a view angle characteristic being problematic in TN-mode liquid crystal displays. Further, a liquid crystal device of a super twisted nematic (STN) mode without using the active element (TFT etc.) has also be known as a representative example of the nematic liquid crystal display device.

Accordingly, the nematic liquid crystal display device includes various display or drive modes. In any mode however, the resultant nematic liquid crystal display device has encountered a problem of a slow response speed of several ten miliseconds or above.

In order to solve the above-mentioned difficulties of the conventional types of nematic liquid crystal devices, a liquid crystal device using a liquid crystal exhibiting bistability, has been proposed by Clark and Lagerwall (Japanese Laid-Open Patent Application (JP-A) 56-107216, U.S. Pat. No. 4,367,924). As the liquid crystal exhibiting bistability, a chiral smectic or ferroelectric liquid crystal having chiral smectic C phase (SmC*) is generally used. Such a chiral smectic (ferroelectric) liquid crystal has a very quick response speed because it causes inversion switching based on its spontaneous polarization. In addition, the chiral smectic liquid crystal develops bistable states showing a memory characteristic and further has an excellent viewing angle characteristic. Accordingly, the chiral smectic liquid crystal is considered to be suitable for constituting a display device or a light valve of a high speed, a high resolution and a large area.

In recent years, as another liquid crystal material, an antiferroelectric liquid crystal showing tristability (tristable states) has caught attention. Similarly as in the ferroelectric liquid crystal, the antiferroelectric liquid crystal causes inversion switching due to its spontaneous polarization, thus providing a very high-speed responsiveness. This type of the liquid crystal material has a molecular alignment (orientation) structure wherein liquid crystal molecules counterbalance their spontaneous polarizations each other under no electric field application,. thus having no spontaneous polarization in the absence of the electric field. In more recent years, there has been reported an antiferroelectric liquid crystal showing no threshold value developed for actuating (driving) the antiferroelectric liquid crystal in an active matrix-type device.

The above-mentioned ferroelectric and antiferroelectric liquid crystal causing inversion switching based on spontaneous polarization are liquid crystal materials assuming smectic phase. Accordingly, by using these liquid crystal materials capable of solving the problem of the conventional nematic liquid crystal materials in terms of response speed, it has been expected to realize a smectic liquid crystal display device.

In the case of a smectic liquid crystal display device using the ferroelectric liquid crystal, a thickness of an alignment control layer generally of an insulating material for effecting an alignment control, particularly a uniaxial alignment control, of the liquid crystal is made as small as possible to provide a resultant alignment control layer with a larger (electric) capacitance to minimize a reverse electric field (an electric field in reverse direction induced by a spontaneous polarization of the liquid crystal within this device), thus improving switching characteristics and a drive margin. An influence of the reverse electric field is noticeable as the spontaneous polarization becomes large, so that it is essential for the insulating alignment control layer to have a small thickness particularly in the case where a liquid crystal material having a large spontaneous polarization is employed.

Further, a chiral smectic liquid crystal device using the ferroelectric or antiferroelectric liquid crystal effects switching based on a response of the liquid crystal to an applied pulse electric field. In this instance, a magnitude of a voltage effectively applied to the liquid crystal layer is determined by a proportion (or reverse portion) of capacitances of respective layers (e.g., the liquid crystal layer and the alignment control layer) constituting the liquid crystal device.

In order to increase an effective voltage applied to the liquid crystal layer thereby to obtain better switching characteristics, a capacitance of the alignment control layer is set to be sufficiently larger than that of the liquid crystal layer. In other words, the thickness of the alignment control layer is designed to become sufficiently smaller than the liquid crystal layer thickness.

However, as the thickness of the alignment control layer is made smaller, the resultant alignment control layer is liable to fail to develop a desired alignment control performance. Consequently, it becomes difficult to realize some essential improvements in switching characteristics (reverse electric field and drive margin), response speed and an alignment characteristic in combination. Further, when an alignment control layer is formed in a uniform thickness in production process, it becomes difficult to control the uniform thickness with a decreasing film thickness.

SUMMARY OF THE INVENTION

In view of the above-mentioned circumstances, an object of the present invention is to provide a liquid crystal device, particularly a chiral smectic liquid crystal device (e.g., using a liquid crystal showing a ferroelectricity or antiferroelectricity) capable of providing a large drive margin and a high-speed switching characteristic while realizing a uniform alignment state of liquid crystal molecules.

Another object of the present invention is to provide an aligning method of a liquid crystal used in the liquid crystal device and a process for producing the device.

According to a first aspect of the present invention, there is provided a liquid crystal device: comprising a pair of substrates, and a liquid crystal disposed in an alignment state between the substrates, wherein at least one of the substrate has a surface contacting the liquid crystal and including a first region having a larger uniaxial alignment control force and a second region having a smaller or substantially no uniaxial alignment control force, respectively acting on the liquid crystal, whereby phase transition from liquid phase to mesomorphic phase on temperature decrease, of the liquid crystal has been initiated from a portion contacting the first region and enlarged toward the second region to place the liquid crystal in the alignment state.

According to a second aspect of the present invention, there is also provided an aligning method of a liquid crystal, comprising:

providing a liquid crystal device including a pair of substrates and a liquid crystal disposed between the substrates, wherein at least one of the substrate has a surface contacting the liquid crystal and including a first region having a larger uniaxial alignment control force and a second region having a smaller or substantially no uniaxial alignment control force, respectively acting on the liquid crystal, and gradually cooling the liquid crystal from liquid phase, whereby phase transition from liquid phase to mesomorphic phase on temperature decrease, of the liquid crystal has been initiated from a portion contacting the first region and enlarged toward the second region to place the liquid crystal in a prescribed alignment state.

According to further present invention, there is provided a process for producing a liquid crystal device, comprising:

forming a cell comprising a pair of substrates, disposed opposite to each other, wherein at least one of the substrate has a surface contacting a liquid crystal and including a first region having a larger uniaxial alignment control force and a second region having a smaller or substantially no uniaxial alignment control force, respectively acting on the liquid crystal, injecting a liquid crystal into the cell, and gradually cooling the liquid crystal from liquid phase, whereby phase transition from liquid phase to mesomorphic phase on temperature decrease, of the liquid crystal has been initiated from a portion contacting the first region and enlarged toward the second region to place the liquid crystal in the alignment state.

These and other objects, features and advantages of the present invention will become more apparent upon a consideration of the following description of the preferred embodiments of the present invention taken in conjunction with the accompanying drawings.

DETAILED DESCRIPTION OF THE PREFERRED EMBODIMENTS

Preferred embodiments of the liquid crystal device according to the present invention will be described with reference to the drawings.

A first embodiment of the liquid crystal of the present invention is described with reference to FIGS. 1 and 2.

Figure 1:
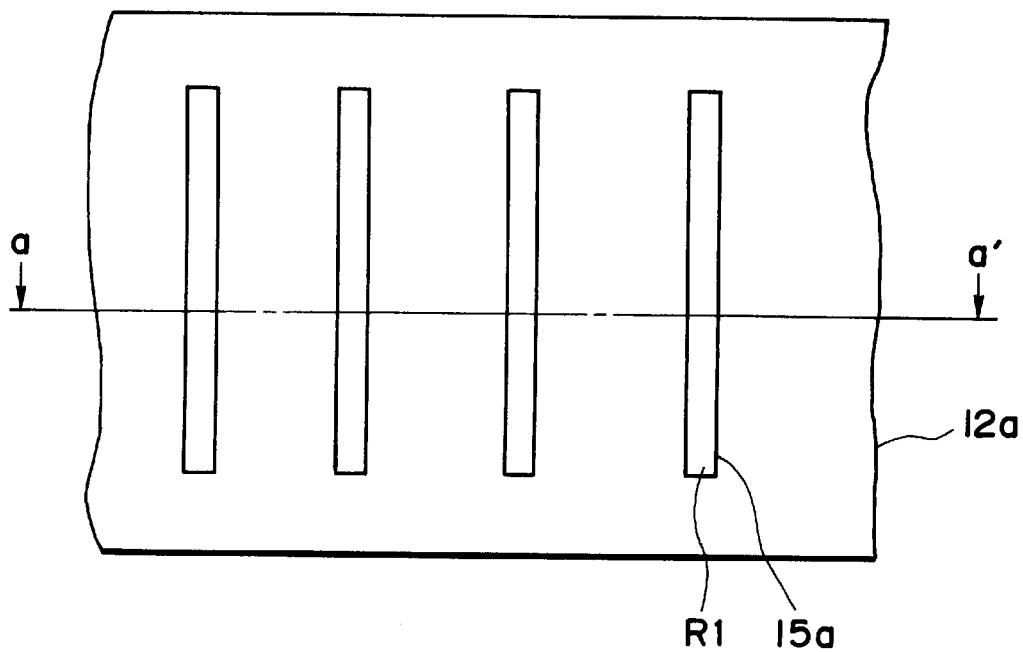
FIG. 1 is a plan view of a liquid crystal device according to a first embodiment of the present invention wherein a structure of one of a pair of substrates is illustrated.

FIG. 1 is a plan view of an example of one substrate 12a (selectively provided with an alignment control layer having a large uniaxial alignment control force) when viewed from an upper (opposing substrate) side. FIG. 2 is a sectional view of a liquid crystal device 1 taken along a–a' line of FIG. 1 using the substrate 21a as one of a pair of substrates.

Figure 2:
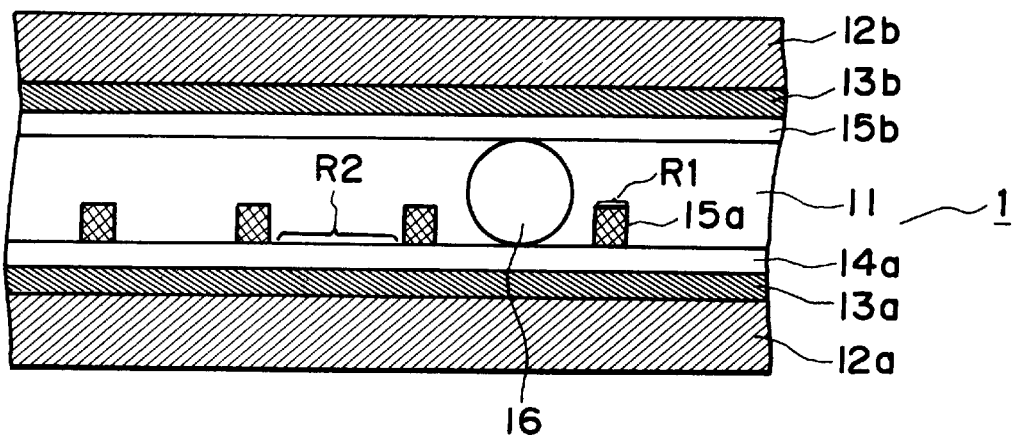
FIG. 2 is a schematic sectional view of a liquid crystal device according to the first embodiment of the present invention taken along a–a' line shown in FIG. 1.

Referring to FIG. 2, the liquid crystal device 1 principally includes a pair of oppositely disposed substrates 12a and 12b and a liquid crystal 11 comprising a liquid crystal composition disposed between the substrates 12a and 12b.

On the substrate 12a, an electrode 13a for applying an electric field to the liquid crystal 11 is disposed. Further thereon, a layer (underlying layer) 14a is formed.

On the layer 14a, an alignment control layer 15a is selectively formed in a stripe pattern (as also shown in FIG. 1) with an elongated planar upper surface (R1) contacting the liquid crystal 11.

The alignment control layer 15a may comprise an insulating material and may appropriately treated to have a larger uniaxial alignment control force acting on the liquid crystal 11.

In this embodiment, a uniaxial aligning treatment is performed at least with respect to the upper surface (R1) of the alignment control layer 15a substantially parallel to the substrate 12a an contacting the liquid crystal 11, thus providing a (larger) uniaxial alignment control force to the alignment control layer 15a acting on the liquid crystal 11. Specifically, the substrate 12a has a surface including a first region (R1) corresponding to the alignment control layer portion showing a uniaxial alignment control force to the liquid crystal 11 and a second region (R2) corresponding to the exposed portion of the layer 14 contacting the liquid crystal 11 and located between the adjacent stripe lines of the stripe-shaped alignment control layer 15a.

On the opposing substrate 12b, an electrode 13a for applying an electric field to the liquid crystal 11 is disposed and thereon, an alignment control layer 15b contacting the liquid crystal 11 and capable of alignment-controlling the liquid crystal 11 is formed.

The oppositely disposed substrates 12a and 12b are spaced apart from each other via a spacer 16 and the liquid crystal 11.

Outside the substrates 12a and 12b, a pair of polarizers (not shown) is disposed as desired. Further, behind the device 1 viewed from a viewer side, a light source (not shown) may optionally be disposed.

In the liquid crystal device 1, switching is effected by applying an electric field in accordance with a switching signal from a signal source (not shown) to the liquid crystal 11 via the electrodes 13a and 13b, thus modulating external light passing through the liquid crystal layer 11.

In the device 1, phase transition of the liquid crystal 11 from liquid phase to mesomorphic phase on temperature decrease is initiated from a portion contacting the first region R1 (the planar upper surface of the alignment control layer 15a parallel to the substrate 12a), continuously extends along a direction of a uniaxial alignment axis (a direction of the uniaxial alignment control force of the alignment control layer 15a), and enlarges toward the second region R2 to place the liquid crystal 11 in a prescribed alignment state by appropriately selecting and setting the material, treating method and conditions, etc., for the liquid crystal 11, and the stripe-shaped alignment control layer 15a, the layer 14a and the alignment control layer 15b each contacting the liquid crystal 11.

Hereinbelow, the thus formed alignment state of the liquid crystal 11 will be explained with reference to FIGS. 3A–3C and FIGS. 4A–4C.

Figure 3A:
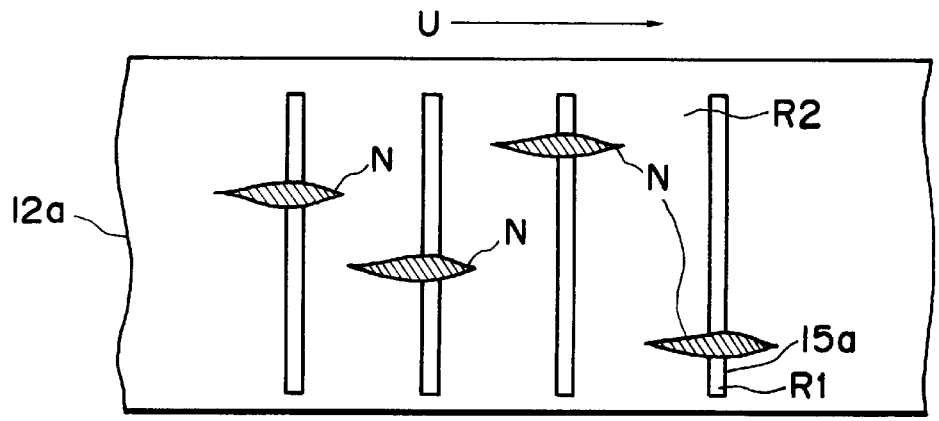
FIGS. 3A–3C, 4A–4C and 5A–5C are respectively a set of plan views for illustrating a process of formation of an alignment state of a liquid crystal, respectively.
Figure 3B:
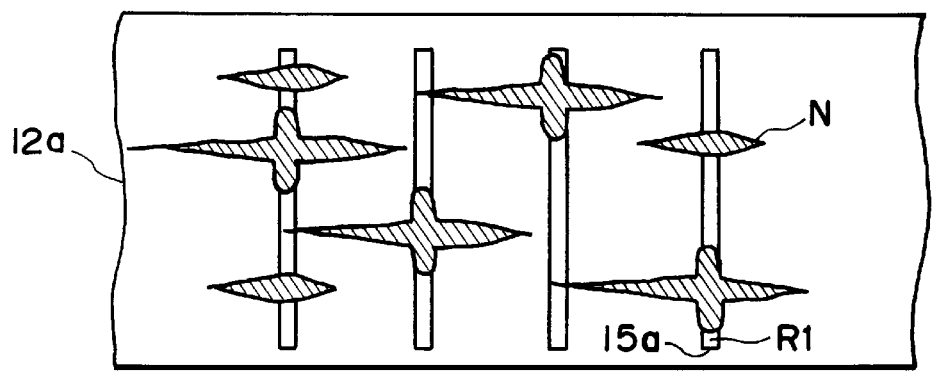
Figure 3C:
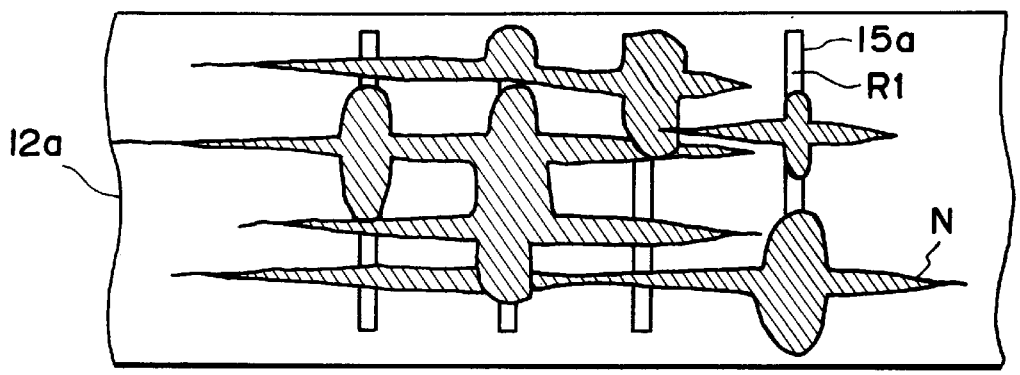

FIGS. 3A–3C are schematic plan views for illustrating a change in phase transition state (behavior) of a smectic liquid crystal from liquid phase to smectic phase on temperature decrease (in the order of (A)→(B)→(C)) under observation with a polarizing microscope (magnification: 100) when a direction U of an uniaxial alignment control (a direction of the uniaxial aligning treatment to the alignment control layer 15a) is set perpendicular to a longitudinal (extension) direction of the (stripe shaped) alignment control layer 15a.

First, as show in FIG. 3A, when the smectic liquid crystal is cooled from a higher temperature phase (e.g., liquid phase), batonnets (N) (nuclei or seed liquid crystals for smectic liquid crystal molecules) are generated at the phase transition to the smectic phase from a liquid crystal portion contacting the region R1 (the upper surface of the alignment control layer 15a) having a larger uniaxial alignment control force on the substrate 12a.

On temperature decrease, as shown in FIG. 3B, the batonnets N grow along the uniaxial aligning treatment direction U (perpendicular to the longitudinal direction of the alignment control layer 15a, i.e., a direction of a normal to smectic molecular layers defined by the batonnets N). Generally, the batonnets in smectic phase have such a anisotropy that they are liable to grow along the smectic layer normal direction, thus linearly enlarged toward the region R2 (between the adjacent stripe lines of the alignment control layer 15a).

Based on the above anisotropy of the batonnets growth, a direction of smectic molecular layers in an alignment state in the region R2 providing a smaller or substantially no uniaxial alignment control force relative to the region R1 is also uniformized similarly as in the region R1.

On further temperature decrease, as shown in FIGS. 3B and 3C, the growth of the batonnets N is initiated not only in the uniaxial aligning treatment direction U but also in its perpendicular direction (the longitudinal direction of the alignment control layer 15a). At this time, the batonnets are not only gradually expanded as a whole but also enlarged with branching. The thus-generated branch of the batonnets N gradually grow first along the longitudinal direction of the alignment control layer 15a.

When the device is cooled to a temperature providing the entire smectic phase over the area between the substrates, a uniform alignment state such that smectic molecular layers are uniformly aligned along the longitudinal direction of the alignment control layer 15a in the entire liquid crystal portion including a portion contacting the alignment control layer 15a and a portion not contacting the alignment control layer 15a is finally formed.

Figure 4A:
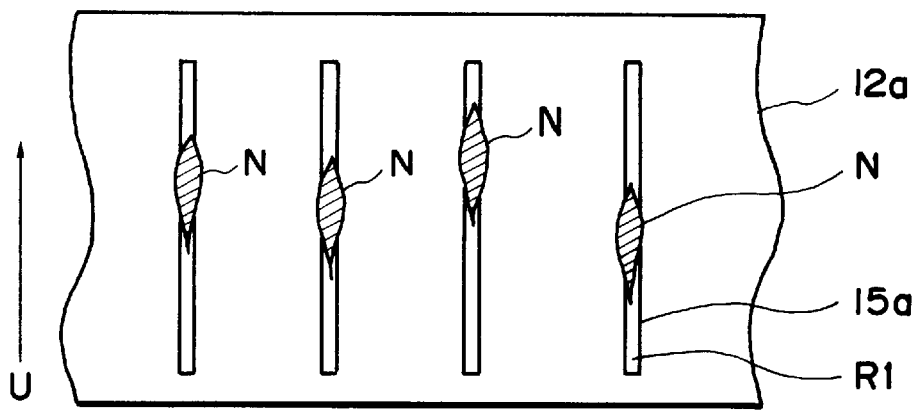
Figure 4B:
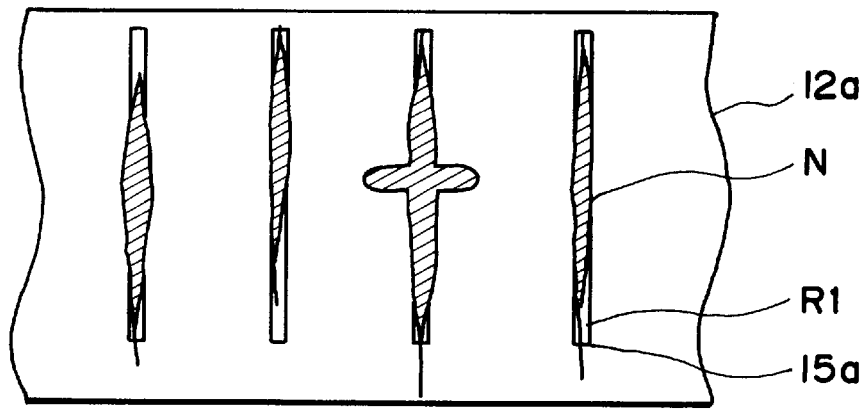
Figure 4C:
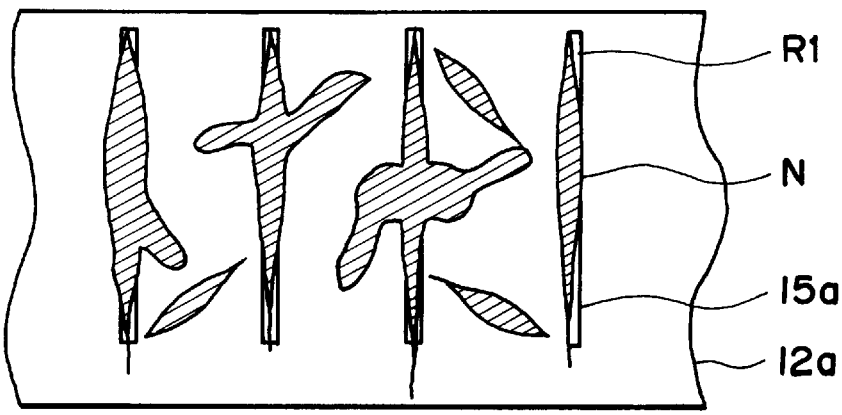

On the other hand, FIGS. 4A–4C are schematic plan views similar to FIGS. 3A–3C except that the uniaxial aligning treatment direction U is set substantially parallel to the longitudinal direction of the alignment control layer 15a.

Referring to FIG. 4A, similarly as in FIG. 3A, batonnets N are generated at a portion contacting the region R1 of the alignment control layer 15a having a larger uniaxial alignment control force.

On temperature decrease, as shown in FIG. 4B, based on the above-described batonnet growth anisotropy the batonnets N extend along the uniaxial aligning treatment U (the direction of the normal to smectic molecular layers defined by the batonnets N), i.e., the longitudinal direction of the alignment control layer 15a. In this instance, the batonnets quickly extend along the region R1 of the alignment control layer 15a since the batonnet growth direction determined based on the batonnet growth anisotropy coincides with the longitudinal direction of the alignment control layer 15a having the larger uniaxial alignment control force.

On further temperature decrease, as shown in FIGS. 4B and 4C, the batonnets N start to enlarge not only in the longitudinal direction of the alignment control layer 15a but also in a direction perpendicular thereto. In this instance, the batonnets gradually expand as a whole with branching into a portion corresponding to a region (R2 as shown in FIGS. 2 and 3A between the adjacent stripe lines of the alignment control layer 15a), thus finally joining together at the portion to provide an alignment state.

As described above, when the entire area between the substrates is cooled to show smectic phase, the batonnets N finally provide such a uniform alignment state that smectic molecular layers are uniformly aligned perpendicular to the longitudinal direction of the alignment control layer 15a at the entire liquid crystal portion including a portion contacting the region R1 of the alignment control layer 15a and a portion not contacting the alignment control layer 15a.

In the above-described liquid crystal device, the alignment control layer 15a of, generally, the insulating material and having the larger uniaxial alignment control force is formed in a stripe pattern necessary to supply batonnets for initiating the formation of a liquid crystal alignment state, whereby the formation of a uniform alignment state of smectic molecular layers is ensured. In addition, an amount of the insulating alignment control layer being an electrical barrier to drive of the liquid crystal device is minimized to enlarge a liquid crystal portion supplied with a voltage not through the insulating alignment control layer, thus resulting in a larger effective voltage applied to the liquid crystal at the time of the drive with a pulse voltage.

Accordingly, it becomes possible to realize a uniform alignment state and a high-speed liquid crystal drive (switching) in combination.

Hereinbelow, the respective structure members of the liquid crystal device shown in FIGS. 1 and 2 will be described in detail.

The substrates 12a and 12b may preferably comprise a high transparent material, such as glass and plastics. Further, the electrodes 13a and 13b may preferably be a transparent electrode of, e.g., ITO (indium tin oxide). Each of the electrodes 13a and 13b may be (partially) coated with a metal electrode (layer) as desired in order to reduce an electrical resistance of the resultant electrode structure as a whole.

The liquid crystal 11 may preferably be of a liquid crystal material, such as a chiral smectic liquid crystal showing ferroelectricity or antiferroelectricity. In this case, in order to realize the bistability as in the above-mentioned liquid crystal device (proposed by Clark and Lagerwall), a cell gap (a distance between the substrates) may preferably be set to 0.5–50 µm. The liquid crystal 11 may be a nematic liquid crystal.

In a preferred embodiment, a chiral smectic liquid crystal having no cholesteric phase may suitably be used as the liquid crystal material.

In this regard, for example, almost synthesized liquid crystal materials showing antiferroelectricity do not have cholesteric phase.

In the case of the ferroelectric liquid crystal, a mesomorphic compound having a perfluoroalkyl ether terminal chain (Marc D. Radcliffe et al. The 4th International Ferroelectric Liquid Crystal Conference, P-46 (1993)) may, e.g., preferably be used as a material therefor since the mesomorphic compound suppresses the formation of a chevron (layer) structure and readily provides a bookshelf (layer) structure (a layer structure including smectic molecular layers aligned substantially perpendicular to the substrate) or a structure close thereto, thereby to provide a resultant liquid crystal device with a high contrast. Such a liquid crystal material per se has a property developing the bookshelf structure or a structure close thereto having a small layer inclination angle and has a phase transition from isotropic phase to smectic phase with no cholesteric phase.

As the liquid crystal material showing the bookshelf structure (or the close structure thereto), it is preferred to use a chiral smectic liquid crystal composition comprising at least one species of a fluorine-containing mesomorphic compound having a fluorocarbon terminal portion and a hydrocarbon terminal portion connected by a central core and has smectic phase or latent smectic phase. The term "latent smectic phase" refers to a property of a compound concerned that the compound alone does not exhibit smectic phase but can be a component compatibly contained in smectic phase of a liquid crystal composition.

The central core comprises at least two rings independently selected from aromatic, heteroaromatic, cycloaliphatic, substituted aromatic, substituted heteroaromatic, or substituted cycloaliphatic rings, which may be connected one with another by means of functional groups selected from —COO—, —COS—, —HC=N—, —COSe—. Rings may be fused or non-fused. Heteroatoms within the heteroaromatic ring comprise at least one atom selected from N, O or S. Non-adjacent methylene groups in cycloaliphatic rings may be substituted by O atom.

The fluorine-containing mesomorphic compound and the chiral smectic liquid crystal composition containing the compound may be obtained through processes as decreased in JP-A 6-27451; U.S. Pat. Nos. 5,082,587 (corr. to JP-A 2-142753), 5,262,082 and 5,417,813; and PCT 93/22396.

The above-mentioned liquid crystal material having the phase transition from isotropic phase to smectic phase free from cholesteric phase a larger batonnet growth anisotropy in the alignment formation. Accordingly, batonnets of smectic phase is generated and abruptly grow along a normal direction to the smectic layers and then are quickly enlarged into the smectic layers. For this reason, in the liquid crystal device using such a material, by providing a change in, e.g., uniaxial alignment control force or wettability with the liquid crystal at a boundary between the liquid crystal and the substrate thereby to provide a batonnet generation position of smectic phase with a selectivity, it is possible to effect the alignment state formation based on the anisotropy of batonnet growth direction even when a uniaxial alignment control force is not present particularly at the boundary between the substrate and the liquid crystal in a growth region of the generated batonnets.

As described above, the liquid crystal material (having the phase transition from isotropic phase to smectic phase free from cholesteric phase) is particularly suitable for a device structure as shown in FIGS. 1 and 2 wherein the stripe-shaped alignment control layer 15a having a larger uniaxial alignment control force is selectively disposed on the substrate to minimize its proportion in a liquid crystal drive region.

The alignment control layer 15a having a uniaxial alignment control force acting on the liquid crystal is formed in a prescribed (stripe) pattern and as described above, and a liquid crystal portion contacting the surface region R1 of each stripe line functions as a batonnet generation position in combination with the material and surface characteristic of the layer 14a contacting the liquid crystal between the adjacent stripe lines at the time of phase transition to mesomorphic phase in the process of the formation of the liquid crystal alignment sate as described with reference to FIGS. 3 and 4. In other words, the liquid crystal portion corresponding to the surface region R1 of the stripe line of the alignment control layer has a phase transition temperature from liquid phase to mesomorphic phase higher than that at a liquid crystal portion not corresponding to the region R1 (but corresponding to the surface region R2 between the adjacent stripe lines).

The alignment control layer 15a may preferably be provided by forming a film an inorganic or (insulating) organic material by solution coating, vapor deposition, sputtering, etc., and rubbing the film with a fibrous material, such as velvet, cloth or paper (uniaxial aligning treatment). Examples of the inorganic material may include: silicon monoxide, silicon dioxide, aluminum oxide, zirconium oxide, magnesium fluoride, cerium oxide, cerium fluoride, silicon nitride, silicon carbide and boron nitride. Example of the organic material may include: polyvinyl alcohol, polyimide, polyamideimide, polyester, polyamide, polyesterimide, polyparaxylylene, polycarbonate, polyvinyl acetal, polyvinyl chloride, polystyrene, polysiloxane, cellulosic resin, melamine resin, urea resin and acrylic resin. It is also possible to form such an alignment control layer by oblique vapor deposition, i.e., vapor deposition in an oblique direction onto a substrate, of an oxide, such as SiO, or a nitride, to form a film provided with a uniaxial alignment control force. The material for the alignment control layer may appropriately be selected depending on the liquid crystal material used.

In the case of using a chiral smectic liquid crystal, particularly a chiral smectic liquid crystal composition containing at least one species of a fluorine-containing mesomorphic compound as described above, as the alignment control layer subjected to a uniaxial aligning treatment, it is preferred to use a film of a polyimide having a recurring unit represented by the following general formula P:

[Formula P]

$(K\text{-}P^{11}\text{-}L^{11}\text{-}M^{11}\text{-}(L^{12})_a\text{-}P^{12})$, wherein K is ia tetra valent-group of

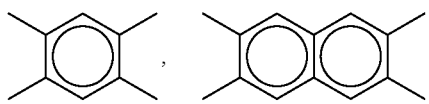

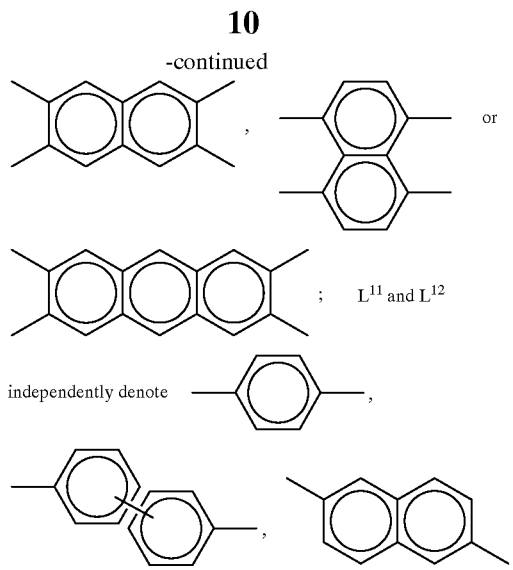

or an alkylene group hating 1–20 carbon atoms; $P^{11}$ and $P^{12}$ denote an imide bond; $M^{11}$ denotes a single bond or —O—; and a is 0, 1 or 2.

Specific examples of the polyimide may include those having the following recurring units:

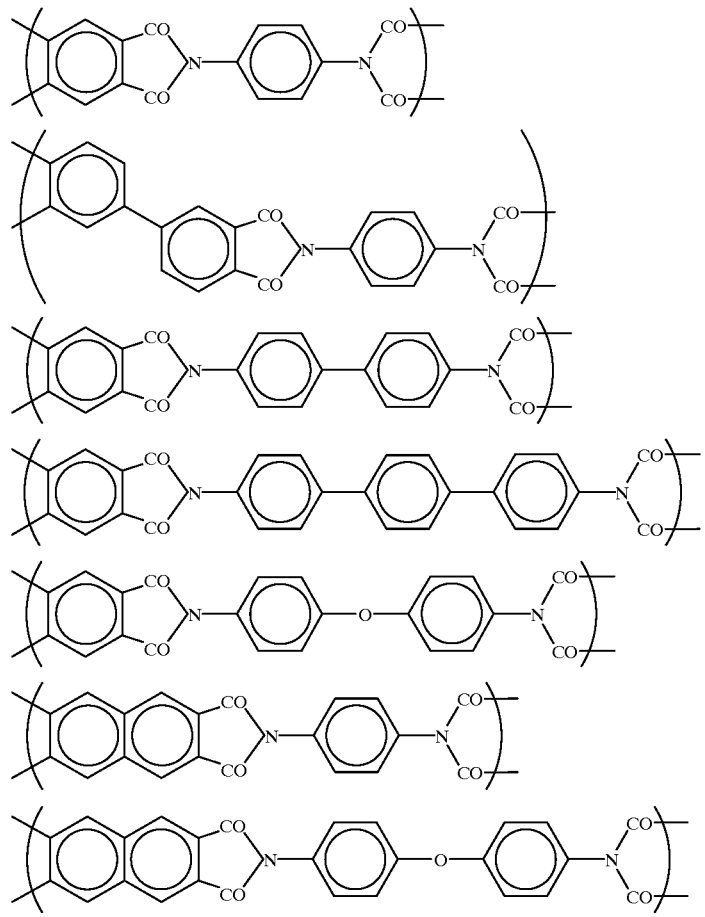

-continued

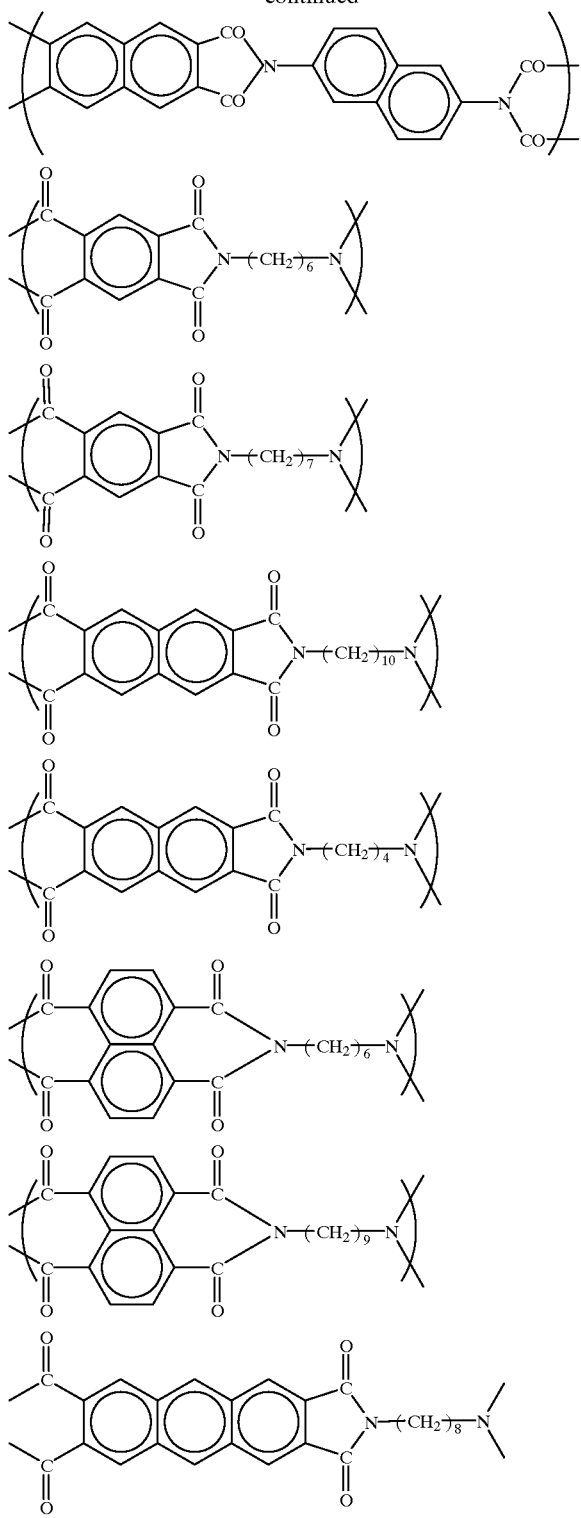

The alignment control layer 15a may be patterned in ai prescribed shape (e.g., as shown in FIG. 1) after the film formation by a prescribed method, such as mask etching, rift-off or ultraviolet (UV) ashing. The alignment control layer 15a may be of an organic photosensitive material, followed by patterning to form a patterned layer.

The alignment control layer 15a may also be patterned in a prescribed shape at the time of the film formation by offset printing, an ink jet method or a bubble jet method.

Further, the alignment control layer 15a may be provided by forming a film in a uniform thickness on the substrate 12a and effecting a selective uniaxial aligning treatment (e.g., selective rubbing) to the film, thus providing the film with a patterned portion having a uniaxial alignment control force.

The pattern of the alignment control layer 15a may preferably be the stripe pattern as shown in FIG. 1 and may also be other shapes, such as a cross-stripe shape and island shape, selected depending on, e.g., the alignment characteristic of the liquid crystal material, a degree of the uniaxial alignment control force of the alignment control layer, a unit of optical modulation of the liquid crystal device and a pixel size.

The proportion of the alignment control layer pattern to the entire substrate area, however, may preferably be set so that the alignment control layer 15a provides an entire planar area of the surface region R1 (having the larger uniaxial alignment control force) being smaller than that of a portion of the substrate not coated with the alignment control layer 15a (i.e., spacings between the stripe lines of the alignment control layer 15a) in view of both the uniform alignment state and the high-speed liquid crystal drive (switching) within the device as described above.

Further, a relationship between the shape of the alignment control layer pattern having the larger uniaxial alignment control force and the direction of uniaxial alignment axis (the directing of the uniaxial aligning treatment) may be determined depending on, e.g., the above-mentioned liquid crystal alignment characteristic and the uniaxial alignment control force of the alignment control layer 15a.

In the case of using the smectic liquid crystal as the liquid crystal 11 in combination with the stripe-shaped alignment control layer 15a uniaxially treated in the direction U (parallel to the stripe extension direction) as shown in FIGS. 4A–4C, if the spacing between the adjacent stripe lines (of the alignment control layer 15a) is excessively large, as shown in FIG. 4C, there is a possibility that the branched batonnets extended from the stripe line portion grow not linearly but obliquely to form bent smectic molecular layers since at the spacings, the corresponding substrate surface has substantially no uniaxial alignment control force acting on a major proportion of the liquid crystal. As a result, the smectic layer direction is liable to become ununiform at an almost central portion of the liquid crystal between the stripe lines after the entire device area is cooled to smectic phase.

On the other hand, in the case of using the smectic liquid crystal in combination with the stripe-shaped alignment control layer 15a uniaxially treated in the direction U (perpendicular to the stripe extension direction) as shown in FIGS. 3A–3C, the branched batonnets of smectic phase as shown in FIG. 3C substantially linearly extend along the stripe lines of the alignment control layer 15a, thus being liable to uniformly form the smectic molecular layers in the stripe line direction.

Accordingly, in the case of using the smectic liquid crystal, in order to ensure a uniformity in layer direction during the growth of the branched batonnets in the course of the alignment state formation of the liquid crystal, the alignment control layer 15a may desirably be formed in a stripe shape extending or substantially extending in the smectic layer direction to be formed, i.e., the uniaxial alignment axis (rubbing axis) direction.

When the stripe-shaped alignment control layer pattern as shown in FIG. 1 includes a plurality of stripe lines each having a longitudinal direction parallel to the smectic layer (extension) direction, each of the stripe lines may preferably have a length (or width) in a direction of a normal to the smectic layer shorter than a portion not provided with the alignment control layer (i.e., a portion (spacing) between adjacent stripe lines).

Figure 5A:
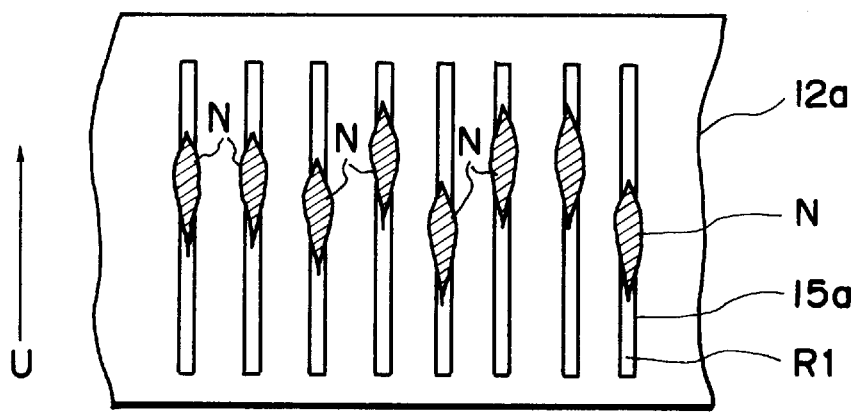
Figure 5B:
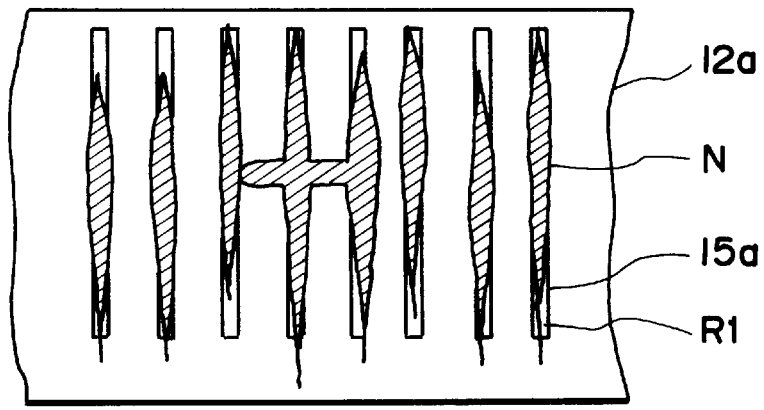
Figure 5C:
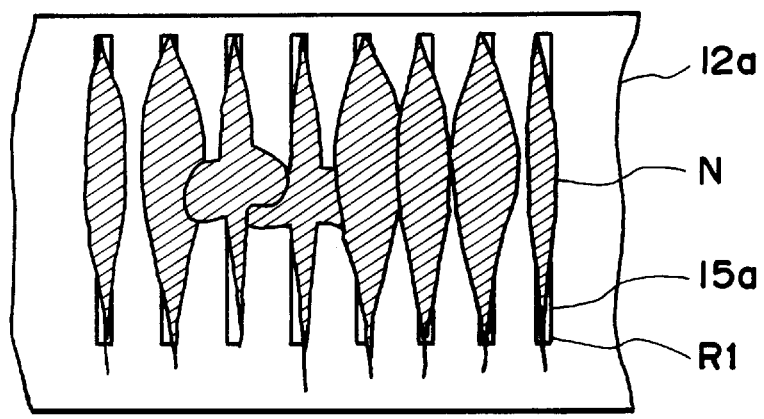

In the stripe-shaped pattern of the alignment control layer 15a as shown in FIG. 1, setting of the spacing between adjacent stripe lines is important to a resulting alignment state. Particularly, when the stripe pattern is formed in substantially parallel with the uniaxial alignment axis direction as shown in FIGS. 4A–4C, the spacing between the stripe lines is set to be smaller as shown in FIGS. 5A–5C, thus increasing batonnet-generating positions and narrowing a distance of branched batonnet growth until branched batonnets each extended from adjacent stripe lines join together. As a result, particularly in the case of using the smectic liquid crystal, the smectic molecular layers are improved in uniformity in their layer directions. In this case, however, in order to minimize a liquid crystal-contacting area of the insulating alignment control layer 15a to enlarge a portion of the liquid crystal supplied with a voltage not via the insulating alignment control layer 15a, it is necessary to set a certain distance between the adjacent stripe lines of the alignment control layer 15a.

For example, in the case of the stripe pattern of the alignment control layer 15a as shown in FIGS. 3A–3C and 4A–4C, each stripe line may preferably have a width of a. 2–20 μm and a spacing (distance) between adjacent (two) stripe lines may preferably be set to 10–50 μm. Further, each stripe line may preferably have a thickness of 50–5000 Å, more preferably 200–1000 Å.

The layer 14a providing the surface region R2 contacting the liquid crystal 11 at the spacings between the stripe lines of the alignment control layer 15a has a smaller uniaxial alignment control force or substantially no uniaxial alignment control force relative to the surface region R1 of the alignment control layer 15a in order to realize the alignment state-forming processes as shown in FIGS. 3–5.

The material for the layer 14a may appropriately be selected and (surface-)treated in view of a relationship with the natural and property of the alignment control layer 15a and also so as not to adversely affect a driving (switching) a characteristic of the liquid crystal, particularly a chiral smectic liquid crystal, i.e., so as to suppress insulating properties and little affect liquid crystal molecules.

In the case of providing the layer 14a with substantially no uniaxial alignment control force, hard materials such as metal oxides incapable of being provided with the uniaxial alignment control force even by, e.g., the rubbing treatment may preferably be used. In this respect, in the cell structure as shown in FIG. 2, the layer 14a may be omitted, whereby it is possible to dispose the patterned alignment control layer 15a directly on the ITO electrode 13a.

In order to provide a good alignment state-forming behavior as shown in FIGS. 3–5, the surface region R2 is controlled to have a weakly interaction thereof with the liquid crystal when compared with the surface region R1 of the alignment control layer 15a having a larger uniaxial alignment control force. Thus, the region R2 may preferably be formed of an appropriate material in combination with an appropriate forming method or treating method, as desired, so as to have a prescribed property such as a poor wettability by the liquid crystal (a large water-repellent property), a larger contact angle, a smaller dispersion term of its surface energy or a larger bond term of its surface energy. As a result, the phase transition temperature from liquid phase to mesomorphic phase of a liquid crystal portion corresponding to (or contacting) the region R1 of each stripe line of the alignment control layer 15a is controlled to be higher than that of a liquid crystal portion corresponding to the region R2 of the layer 14a between adjacent stripe lines of the alignment control layer 15a, thus realizing a good alignment state-forming behavior.

Specifically, as the layer 14a, it is possible to use a layer of a ladder- type polysiloxane or modified organic silica having a dispersion term of surface energy relatively smaller than that of a polyimide film as the alignment control layer 15a.

The layer 14a may preferably have a volume resistivity in the range of $1.0\times10^4$–$1.0\times10^{10}$ ohm.cm, in addition to its weaker interaction with the liquid crystal than the material for the alignment control layer 15a.

Such a layer 14a having the above-mentioned properties may for example comprise a polycrystalline or amorphous metal oxide film, a polycrystalline or amorphous semiconductor film or a film comprising an insulating binder and electroconductivity-imparted (electrically conductive) fine particles dispersed in the binder. The polycrystalline or amorphous metal oxide film, the polycrystalline or amorphous semiconductor film, and the particles may have an adjusted electroconductivity by adding conductivity-controlling impurities as desired.

Examples of the polycrystalline or amorphous metal oxide may include: oxides of Group 12 elements, such as ZnO, CdO and $ZnCdO_x$; and oxides of Group 4 and 14 elements, such as $GeO_2$, $SnO_2$, $GeSnO_x$, $TiO_2$, $ZnO_2$, and $TiZrO_x$.

Examples of the polycrystalline or amorphous semiconductor may include: Group 14 semiconductors, such as Si and SiC.

Examples of the dispersed particles may include: particles of the above-mentioned oxides of Group 12 elements, oxides of Group 4 elements, oxides of Group 14 elements, and Group 14 semiconductors.

Examples of the optionally added conductivity-controlling impurities may include: Group 13 elements, such as B, Al, Ga and In as n-type impurities (donor/electron conductivity-enhancing impurities), and Group 1 and 11 elements, such as Cu, Ag, Au and Li, as p-type impurities (acceptor/hole conductivity-enhancing impurities), respectively for doping the oxides of Group 12 elements; and Group 15 elements, such as P, As, Sb and Bi, as n-type impurities, and Group 13 elements, such as B, Al, Ga and In, as p-type impurities, respectively for doping the oxides or semiconductors of Group 14 elements.

As the conductivity-controlling impurity, a donor may be used in case where the substrate having an alignment control layer comprising a material doped with the impurity has a positive surface potential, and an acceptor may be used in case of a negative surface potential. The additive impurity concentration may be set depending on the species (particles, combination with impurities, etc.) and crystalline states (level of crystal defect density) of materials and may preferably be set to provide a free electron or free hole concentration on the order of $1.0\times10^{11}$–$1.0\times10^{14}$ atm/cm$^3$ after the impurity addition. In the case of using a polycrystalline or amorphous material as a matrix material to be doped with the impurity, it may be suitable to set an actual addition level of $1.0\times10^{17}$–$1.0\times10^{20}$ atm/cm$^3$ (on the order of 0.01×1% of the matrix material) in consideration of the efficiency of the impurity addition.

Examples of the binder material for dispersing the particles may include: $SiO_x$, $TiO_x$, $ZrO_x$, fused matrix of other oxides, and siloxane polymers.

On the other hand, the alignment control layer 14b provided to the other substrate 12b may appropriately be imparted with a uniaxial alignment control force or other alignment control abilities depending on the liquid crystal material used.

In the case where the liquid crystal material free from cholesteric phase and having the isotropic-smectic phase transition series is used, the alignment control layer 15a on the substrate 12a having a larger uniaxial alignment control force and the alignment control layer 15b on the other substrate 12b having substantially no uniaxial alignment control force may preferably be used in combination. In this case, the alignment control layer 15b may more preferably have the similar function as the layer 14a (on the substrate 12a) having the weaker interaction with the liquid crystal molecules, thus comprising a material usable also for the layer 14a, particularly a material identical to the material for the layer 14a. As a result, a major proportion of the substrates 12a and 12b contacting the liquid crystal 11 at the boundaries between the entire inner surface of the substrates 12a and 12b and the liquid crystal 11 is suppressed in (electrically) insulating properties, thus improving the driving characteristic of the liquid crystal 11, particularly a chiral smectic liquid crystal.

The liquid crystal device of the present invention may optionally have another insulating film for preventing a short-circuit between the substrates 12a and 12b or a layer of an organic or inorganic material.

The spacer 16 for determining the cell gap (the distance between the substrates) may, e.g., comprise silica beads. In addition to the spacer 16, in order to improve an adhesiveness between the substrates 12a and 12b, adhesive beads comprising a resinous material (e.g., epoxy adhesive) may be dispersed between the substrates.

Incidentally, the above-mentioned smectic liquid crystal display device has generally encounted a problem such that a burning of display image or afterimage phenomenon (herein, referred to as "display burning") in continuously displaying an identical image for a long time is relatively noticeable when compared with the nematic liquid crystal display device. This problem is pronounced in the case of the ferroelectric liquid crystal having bistability although it is common to the smectic liquid crystal. The problem of display burning may be attributable to an electrical factor and an alignment factor.

In the ferroelectric liquid crystal device, localization of ions are induced by a spontaneous polarization of the ferroelectric liquid crystal, thus providing an electrical asymmetry leading to breakage of bistability.

This breakage of bistability due to the electrical asymmetry is observed as the display burning. This is intrinsic to the ferroelectric liquid crystal.

The display burning is considered to be also a problem of molecular alignment at a boundary between the surface of an alignment control layer and a liquid crystal.

In all the liquid crystal device, a molecular alignment (orientation) direction of the liquid crystal in a bulk state in the vicinity of a central portion between the opposing substrates changes that at the boundary thereby to charge the driving characteristic, thus being observed as the display burning.

Specifically, in the liquid crystal device including a pair of substrates at least one of which is subjected to a uniaxial alignment layer, liquid crystal molecules in the vicinity of the substrate having the uniaxial alignment control force are as a whole aligned in a direction in which the alignment of the liquid crystal molecules are readily caused but the bulk liquid crystal molecules are affected by the direction of an electric field applied to the liquid crystal device, thus resulting in a difference in alignment direction between these liquid crystal molecules. In this instance, the liquid crystal molecules continuously extending in a thickness direction of the liquid crystal layer between the substrates changes the alignment direction of the boundary liquid crystal molecules per se in order to decrease an increment of elastic free energy caused by a strain of molecular alignment direction between the boundary liquid crystal molecules and the bulk liquid crystal molecules. At this time, a degree of the alignment direction change of the boundary liquid crystal molecules is considered to become noticeable as a frank elastic constant is larger or the liquid crystal material used has a larger continuous characteristic in the liquid crystal thickness direction. For this reason, compared with the nematic liquid crystal, the smectic liquid crystal having a higher-ordered mesomorphic phase is considered to be liable to cause the display burning.

In a preferred embodiment of the liquid crystal device as described above with reference to FIGS. 1–5, in order to prevent the display burning, the liquid crystal comprises a first liquid crystal portion where first liquid crystal molecules in the vicinity of a boundary between the liquid crystal and said substrate surface in the first region and second liquid crystal molecules in a bulk state between the substrates from a substantially continuous alignment state and comprises a second liquid crystal portion where first liquid crystal molecules in the second region and corresponding second liquid crystal molecules form a substantially discontinuous alignment state.

Such a liquid crystal device having the first and second liquid crystal portions will be described with reference to FIG. 16.

Figure 16:
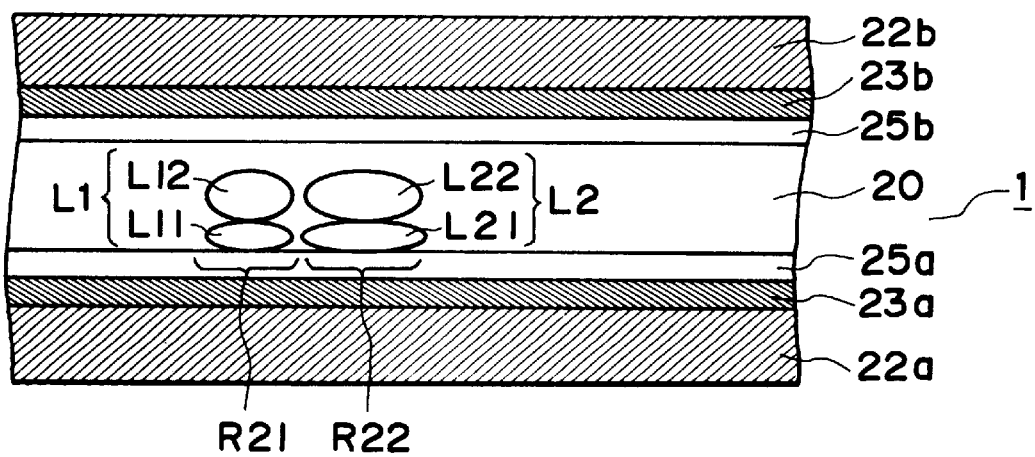
FIG. 16 is a schematic sectional view of a liquid crystal device of the present invention for illustrating an alignment state of liquid crystal molecules.

Referring to FIG. 16, a liquid crystal device 1 has a cell structure wherein a liquid crystal 20 is disposed between a pair of substrates 22a and 22b each successively provided with an electrode 23a (or 23b) for applying an electric field to the liquid crystal 20 and an alignment control layer 25a (or 25b) for controlling an alignment state of the liquid crystal 20.

In the liquid crystal device 1, by appropriately selecting materials for the alignment control layer 25a and 25b and appropriately controlling alignment states or their properties of surface regions R21 and R22 contacting the liquid crystal 20, the liquid crystal 20 includes a first liquid crystal portion L1 where liquid crystal molecules L11 in the vicinity of the boundary (between the liquid crystal and the substrate surface in the region R21) and liquid crystal molecules L12 in a bulk state (between the substrates) form a substantially continuous alignment state and includes a second liquid crystal portion L2 where liquid crystal molecules L21 in the vicinity of the boundary (between the liquid crystal and the substrate surface in the region R22) and liquid crystal molecules L22 in a bulk state (between the substrates) form a substantially discontinuous alignment state.

The above-mentioned display burning is also considered as a phenomenon which is caused when the entire liquid crystal portion between the substrates including the bulk liquid crystal portion and the boundary liquid crystal portion behaves as an elastically continuous matter in the liquid crystal thickness direction.

In the liquid crystal device 1 shown in FIG. 16, at the second liquid crystal portion L2, the display burning is suppressed by providing the discontinuous alignment state between the boundary liquid crystal molecules L21 in the vicinity of the surface of the alignment control layer 25a and the bulk liquid crystal molecules L22 between the substrates. Specifically, the boundary and bulk liquid crystal molecules L21 and L22 have different alignment states since a continuous matter as a group of liquid crystal molecules is not formed by appropriately controlling the liquid crystal molecular alignment. More specifically, the liquid crystal molecules L21 are controlled have a random alignment state and the liquid crystal molecules L22 are controlled to have an ordered uniaxial alignment state (in the uniaxial alignment axis direction). At the liquid crystal portion L2, by providing such alignment states, the boundary and bulk liquid crystal molecules L21 and L22 can form the discontinuous alignment state where the alignment states do not affect each other, thus realizing a stable alignment state which is not changed with time.

In the liquid crystal device 1 shown in FIG. 16, the boundary liquid crystal molecules L11 and L21 generally extend from the substrate surface (boundary between the alignment control layer 25a (or 25b) and the liquid crystal 20) to ca. 100 Å distant therefrom, and the bulk liquid crystal molecules L11 and L21 generally extend between the upper and lower boundary liquid crystal molecules at a central (intermediate) portion of the liquid crystal layer in its thickness direction. The behaviors of these boundary and bulk liquid crystal molecules may be observed through a TIR (total internal reflection) method or an SHG (second harmonic generation) method as described in, e.g., Appl. Phys. Lett. Vol. 53 (24), pp. 2397–2398.

Generally, the liquid crystal molecule alignment direction over the entire cell is determined according to the direction of aligning treatment applied to the pair of substrates. Specifically, phase transition of liquid crystal molecules from liquid phase to mesomorphic phase is initiated from a boundary portion in the vicinity of the alignment control layer. In this instance, the liquid crystal molecules are aligned in the uniaxial alignment treatment direction on the alignment control layer and a further temperature decrease, the phase transition extends in a bulk portion to provide the mesomorphic phase over the entire liquid crystal layer. Accordingly, in an ordinary liquid crystal device, the liquid crystal molecular alignment is controlled by the boundary surface, thus resulting in a continuous molecular alignment state of the boundary and bulk liquid crystal molecules as at the first liquid crystal portion L1 within the liquid crystal device shown in FIG. 16.

On the other hand, in order to obtain a discontinuous molecular alignment state of the boundary and bulk liquid crystal molecules as at the second liquid crystal portion L2, it is preferable that a portion having a (larger) uniaxial alignment control force (subjected to a uniaxial aligning treatment) and a portion having substantially no uniaxial alignment control force (not subjected to a uniaxial aligning treatment) are provided to one substrate. I the liquid crystal device shown in FIG. 16, the portion having the uniaxial alignment control force is the surface region R21 of the alignment control layer 25a and the portion having substantially no uniaxial alignment control force is the surface region R22 of the alignment control layer 25a. In this liquid crystal device, the phase transition from liquid phase to mesomorphic phase is initiated from the boundary liquid crystal molecules L11 contacting the region R21 having the uniaxial alignment control force and extend toward the second liquid crystal portion L2 free from the alignment control. This is clear from the fact that the phase transition temperature to the mesomorphic phase is generally increased as the uniaxial alignment control force is stronger.

In the case of providing the surface regions R21 and R22 to the same substrate, the molecular alignment of the bulk liquid crystal molecules L22 is not affected by the region R22 having substantially no uniaxial alignment control force but is in accordance with that of the adjacent bulk liquid crystal molecules L12 corresponding to the region R21 having the larger uniaxial alignment control force. Particularly, in the smectic phase being a mesomorphic phase having a higher crystallinity, uniform liquid crystal alignment is first formed at the liquid crystal portion LI corresponding to the region R21 having the uniaxial alignment control force and then extend toward the liquid crystal portion L2 corresponding to the region R22 having substantially no uniaxial alignment control force, thus providing a uniform alignment over the entire cell.

The smectic liquid crystal is a one-dimensional crystal with respect to a normal to the smectic layers, so that the direction of the crystal growth of liquid crystal molecules is liable to be in the layer normal direction. Accordingly, the region R21 having the uniaxial alignment control force may desirably be continuous or substantially continuous with respect to the smectic layer direction. On the other hand, at this time, at the liquid crystal portion L2 corresponding to the region R22 having substantially no uniaxial alignment control force, the boundary liquid crystal molecules L21 are randomly aligned or oriented. This is because at the liquid crystal portion L2, the boundary liquid crystal molecules fist cause the phase transition to liquid phase and form a molecular alignment state to some degree under the interaction thereof with the region R2 even when the bulk liquid crystal molecules L22 are in the temperature range providing the mesomorphic phase, thus being essentially provided with a random alignment characteristic. As a result, it is possible to realize a liquid crystal device showing a discontinuous alignment state, (at the second liquid crystal portion L2) in the thickness direction of the liquid crystal layer 11, including a uniform alignment state of the bulk liquid crystal molecules L22 and a random alignment state of the boundary liquid crystal molecules L21.

The surface region R22 of the alignment control layer 25$a$ may preferably have a surface state providing an average (arithmetic mean) surface roughness Ra of at least 2 nm, a mean square surface roughness of Rms of at least 2.5 nm, and a degree of surface roughness Rd of at least 5%.

When the region R22 has such a surface state, a pretilt angle (molecular-rising angle) of the boundary liquid crystal molecules L21 in the vicinity of the region R22 is determined in accordance with the surface unevenness of the region R22, whereby the resultant pretilt angle correspondingly provide random values in the vicinity of the region R22. Specifically, the boundary and bulk liquid crystal molecules L21 and L22 can be controlled to have a discontinuous alignment state not only in the various horizontal (longitudinal) directions of the substrate (azimuthal direction) but also in the rising angle from the substrate (polar angle direction), thus further enhancing the display burning-prevention effect.

Herein, the average surface roughness Ra represents an average of absolute values of deviation with respect to a range from a center (reference) plane to a surface at a measuring portion. The mean square surface roughness Rms represents a square root of square mean value of deviation with respect to a range from a center plane to a surface at a measuring portion. The degree of surface roughness represents a degree of increase in surface area when a film having an uneven surface ((entire) surface area: S') is formed on a prescribed layer (surface area: S) and is obtained according to the following equation:

$$Rd\ (\%) = [(S'-S)/S] \times 100.$$

In the liquid crystal device 1 shown in FIG. 16, the liquid crystal layer portion 20 may be divided into a plurality of units of effective drive regions apart from each other and each corresponding to one pixel in a liquid crystal display device and, the liquid crystal in the effective drive regions can be driven entirely or selectively. In this case, the effective drive regions may preferably correspond to at least the second liquid crystal portion L2 and spacings between the effective drive regions may preferably correspond to the first liquid crystal portion L1.

The first and second liquid crystal portions L1 and L2 may preferably be provided by setting the surface region R21 having the uniaxial alignment control force and the surface region R22 having substantially no (or relatively small) uniaxial alignment control force as mentioned above.

Accordingly, by employing the device structure and the treated substrate as shown in FIGS. 1 and 2 to ensure the alignment state-forming behavior as shown in FIGS. 3–5, it becomes possible to provide a liquid crystal device as shown in FIG. 16 including the first and second liquid crystal portions L1 and L2. In this case, the surface regions R21 and R22 shown in FIG. 16 correspond to the surface regions R1 and R2 shown in FIG. 2, respectively.

Specifically, in the liquid crystal device of FIG. 2, the insulating alignment control layer 15$a$ having the larger uniaxial alignment control force is formed in a prescribed pattern so as to provide the batonnets as an initial portion for the alignment state formation, whereby the formation of a uniform alignment state over the entire device is ensured through the alignment state-forming processes as shown in FIGS. 3–5. Based on such alignment state-forming processes and the relationship in uniaxial alignment control force between the region R1 of the alignment control layer 15$a$ and the region R2 of the layer 14$a$ (exposed between the alignment control layer 15$a$), as shown in FIG. 16, the resultant liquid crystal portion includes the first liquid crystal portion L2 (corr. to the region R1) providing a substantially continuous alignment state of the boundary and bulk liquid crystal molecules L11 and L12 and the second liquid crystal portion L2 (corr. to the region R2) providing a substantially discontinuous alignment state of the boundary and bulk liquid crystal molecules L21 and L22.

The layer 14$a$ as shown in FIG. 2 may preferably have the surface state as mentioned above with respect to the region R22 of the alignment control layer 25$a$ shown in FIG. 16 and accordingly may be formed by appropriately roughening a layer of the above-mentioned material (for, e.g., weakening the interaction with the liquid crystal molecules).

In order to provide the liquid crystal portion L2 and desired electric and surface properties, the layer 14$a$ may be formed of a film comprising an insulating matrix or binder and (electroconductive) fine particles dispersed therein, as described above. The fine particles may further contain conductivity-controlling impurities as desired to control electroconductivity.

In the liquid crystal device 1 shown in FIG. 2, the liquid crystal layer 11 may preferably include a plurality of effective drive regions apart from each other wherein an electric field depending on a switching signal from a signal supply (not shown) is applied to the prescribed effective drive regions via the electrodes 13$a$ and 13$b$ to effect switching, thus optically modulating light passing through the liquid crystal layer 11 to provide bright and dark states.

Further, in order to provide a liquid crystal portion (L1 shown in FIG. 16) corresponding to the alignment control layer 15$a$ (the entire liquid crystal portion corresponding to the region R1 in the thickness direction) with the dark state, the position of the liquid crystal molecules at the liquid crystal portion may be fixed. In this regard, it is possible to fix the liquid crystal molecular position at the liquid crystal portion by providing the region R1 of the alignment control layer 15$a$ an the opposing alignment control layer 15$b$ with different surface potentials, preferably a difference in surface potential therebetween of at least 50, mV, particularly at least 100 mV, thus ensuring the fixed liquid crystal molecular position providing the dark state.

In a liquid crystal display device using the ferroelectric liquid crystal and the matrix electrode where a pair of substrates each provided with stripe-shaped electrodes is oppositely disposed so as to provide a plurality of pixels at each intersection of the stripe lines of the electrodes of the substrates while having spacings between the pixels, the liquid crystal molecular alignment state cannot be controlled by an applied electric field at the spacings where the electrodes of the substrates do not intersect each other, thus resulting in leakage of light at the spacings to be liable to lower a contrast. For this reason, generally, a black matrix (e.g., metal layer) is disposed on the substrate at the spacings between the pixels. However, the formation of the black matrix is required to effect an accurate positional registration (alignment) so as to correspond to a portion where the pixel electrodes intersect each other, thus increasing production costs. If the metal layer is used as the black matrix, the display surface of the device has a larger reflectance, thus lowering display qualities.

Further, in the antiferroelectric liquid crystal display device, a liquid crystal alignment state is somewhat disordered at the pixel spacings in some cases when compared with other portions. In this instance, the light leakage from the pixel spacings is also liable to occur to lower a contrast. Although the black matrix may be employed similarly as in the ferroelectric liquid crystal display device, the device is also accompanied with the similar problems as described above (i.e., increase in production cost and lowering in display qualities).

In the liquid crystal device of the present invention, however, by fixing the liquid crystal molecular position providing the dark state at the pixel spacings as described above, it is possible to prevent the light leakage between the pixels (effective drive regions) to improve a contrast, thus realizing a practical liquid crystal display device providing a uniform liquid crystal molecular alignment, a wider drive margin and a high-speed switching (drive) characteristic while retaining a simpler structure.

A second embodiment of the liquid crystal device according to the present invention will be described with reference to FIG. 17.

Herein, the identical reference numerals denote structural members identical to those described with reference to FIG. 2, respectively, unless expressly noted otherwise.

Figure 17:
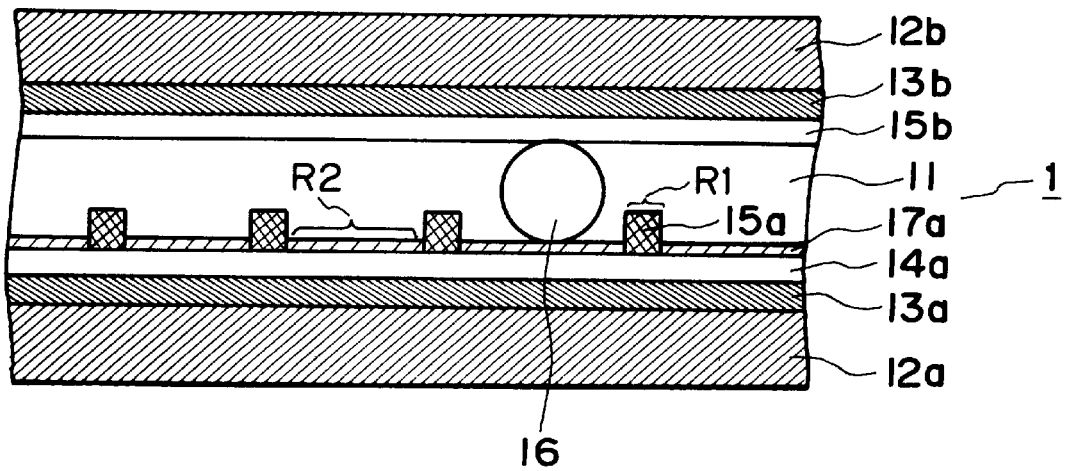
FIGS. 17 and 18 are respectively a schematic sectional view of a liquid crystal device according to second and third embodiments of the present invention, respectively.

FIG. 17 shows a schematic sectional view of an example of the liquid crystal device according to the second embodiment of the present invention.

Referring to FIG. 17, a liquid crystal device 1 has a similar structure as in the liquid crystal device shown in FIG. 1 except that a layer 17a is disposed on the (underlying) layer 14a and contacts the liquid crystal 11 at a surface region R2.

The layer 17a may be composed of an insulating film similarly as in the alignment control layer 15a (as mentioned above with reference to FIG. 2) and also may be treated in the same manner as in the alignment control layer 15a to have a uniaxial alignment control force. However, the layer 17a is designed to have a thickness sufficiently smaller than the thickness of the alignment control layer 15a, whereby the surface region R2 of the layer 17a has a smaller uniaxial alignment control force to has a weaker interaction thereof with the liquid crystal 11 when compared with the surface region R1 of the alignment control layer 15a.

The surface region R2 of the liquid crystal device (FIG. 17) of this embodiment has a substantially similar function as that of the liquid crystal device (FIG. 2) of the first embodiment, thus ensuring the alignment state-forming processes as shown in FIGS. 3–5.

The layer 17a may be formed by utilizing the material identical to that of the alignment control layer 15a as described above.

Specifically, a film of the alignment control layer material is formed over the entire layer 14a, and then is patterned by the above-mentioned UV ashing under appropriate conditions, thus selectively forming the alignment control layer 15a in a prescribed pattern (e.g., stripe lines with spacing therebetween) and a thinner layer 17a occupying the spacings between the prescribed pattern (stripe lines) at the same time. In other words, the layers 15a and 17a may be regarded as a continuous single layer having an uneven stripe-shaped surface.

After the uniaxial aligning treatment, the surface region R1 of the alignment control layer 15a has a larger uniaxial alignment control force and the surface region R2 of the layer 17a has a smaller uniaxial alignment control force.

In the case of the insulating layer 17a, the resultant insulating layer 17a has a considerably small thickness, thus little affecting the liquid crystal as an electrically insulating layer. As a result, a liquid crystal portion supplied with a voltage is enlarged as a whole within the device, thus increasing an effective voltage applied to the liquid crystal particularly when driven by a pulse voltage.

In the case where the smectic liquid crystal having a spontaneous polarization is used and the surface region R2 corresponds to the effective drive regions, the thickness of the insulating layer 17a having the region R2 may desirably be set so as not to obstacle the switching of liquid crystal molecules due to reverse voltage caused by the spontaneous polarization of the liquid crystal between the substrates.

Specifically, a total thickness (including the insulating layer 17a) of an insulating layer portion of the pair of substrates corresponding to the region R2 may preferably be set to be below $d_1$ obtained according to the following equation (A1):

$$d_1 = Vth_1 \times \epsilon / 2Ps \tag{A1}$$

wherein $Vth_1$ represents a threshold voltage causing a partial inversion by a single-polarity pulse with a pulse width of 1 msec., $\epsilon$ represents a dielectric contrast of the insulating layer portion (of the substrates corr. to the region R2) obtained by (relative dielectric constant=3.3)×(electric constant=$8.85 \times 10^{-12}$), and Ps represents a spontaneous polarization per unit area.

The above equation (A1) is derived from a reverse voltage (Vrev) below (caused by the spontaneous polarization) by which the switching of the liquid crystal starts to be obstacled.

$$Vrev = Vth_1 = 2Ps \times S/C,$$

$$C = \epsilon \times S/d_1,$$

wherein C represents a capacitance of the liquid crystal corresponding to the R2 region and S represents an area of the region R2.

On the other hand, a total thickness (including the alignment control layer 15a) of an insulating layer portion corresponding the region R1 may preferably be set to be at least $d_1$ defined above, particularly at least $d_2$ defined by the following equation (A2):

$$d_2 = Vth_2 \times \epsilon / 2Ps,$$

wherein $Vth_2$, $\epsilon$ and Ps are the same as $Vth_1$, $\epsilon$ and Ps in the formula (A1) except that they concern the region R1.

The layer 17a is also effective in decrease a chemical influence, particularly that due to ion migration from the underlying layers (the layer 14a and the electrode 13a).

Herein, a degree of uniaxial alignment control force is defined as follows.

If a liquid crystal material is injected into a cell free from an uniaxial alignment control force, longer molecular axes of liquid crystal molecules are generally oriented or aligned randomly in the absence of a particular external field (e.g., magnetic field) or temperature gradient. On the other hand, if the liquid crystal material is injected into a cell having a sufficiently large uniaxial alignment control force, the longer molecular axes are generally orderly aligned in the uniaxial alignment axis direction. In the latter case, a nematic liquid crystal and a smectic liquid crystal show a similar alignment state. However, in the former case, the nematic liquid crystal and the smectic liquid crystal show different textures.

When the liquid crystal molecules are in an alignment state providing the longer molecular axes in random directions, the smectic liquid crystal having a layer structure forms a random layer structure while assuming a geometrical pattern generally called a focal conic texture.

In the present invention, when the smectic liquid crystal is injected into a cell having a uniaxial alignment control force, if the focal conic texture is developed at at least a part of the cell, such a uniaxial alignment control force is defined as "smaller uniaxial alignment force". If the focal conic texture is not developed at all and the ordered layer structure in one direction is formed, such a uniaxial alignment control force is defined as "larger uniaxial alignment control force". Further, a degree of uniaxial alignment control force may be determined by a proportion of the focal conic texture within the cell.

Generally, the degree of uniaxial alignment control force varies depending on an alignment characteristic of the liquid crystal material, i.e., the type of the liquid crystal material. Accordingly, it should be understood that the degree of uniaxial alignment control force is not determined unambigorously but is determined by a combination of the cell structure and the liquid crystal material used.

Figure 18:
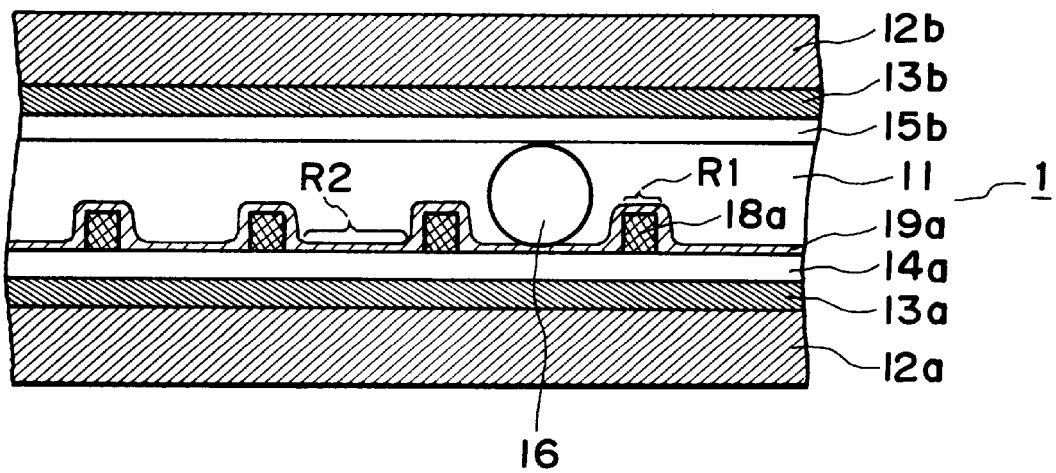

FIG. 18 shows an example of a third embodiment of the liquid crystal device of the present invention.

Referring to FIG. 18, on the layer 14a, a layer 18a comprising a material similar to that of the alignment control layer 15a (as in the first embodiment shown in FIG. 2) is selectively formed and further thereon, a thin layer 19a which is also usable as the alignment control layer 15a is formed so as to cover the layers 14a and 18a, followed by uniaxial aligning treatment over the entire resultant surface of the substrate 12a.

In this embodiment, similarly as in the above second embodiment, the surface region R1 of the lamination layer (composed of the layers 18a and 19a) has a larger uniaxial alignment control force and the surface region of the layer 19a has a smaller uniaxial alignment control force, whereby the region R2 is controlled to have a weak interaction with the liquid crystal 11, thus providing the effects similarly as in the second embodiment.

In the second and third embodiments (FIGS. 17 and 18), surface states of the regions R1 and R2 can be controlled by appropriately selecting and treating the material, thickness and treating conditions for the layers 14a, 15a, 17a, 18a and 19a similarly as in the case of the regions R21 and R22 show in FIG. 16, thus providing liquid crystal portions corresponding to the liquid crystal portions L1 and L2 shown in FIG. 16.

Figure 6:
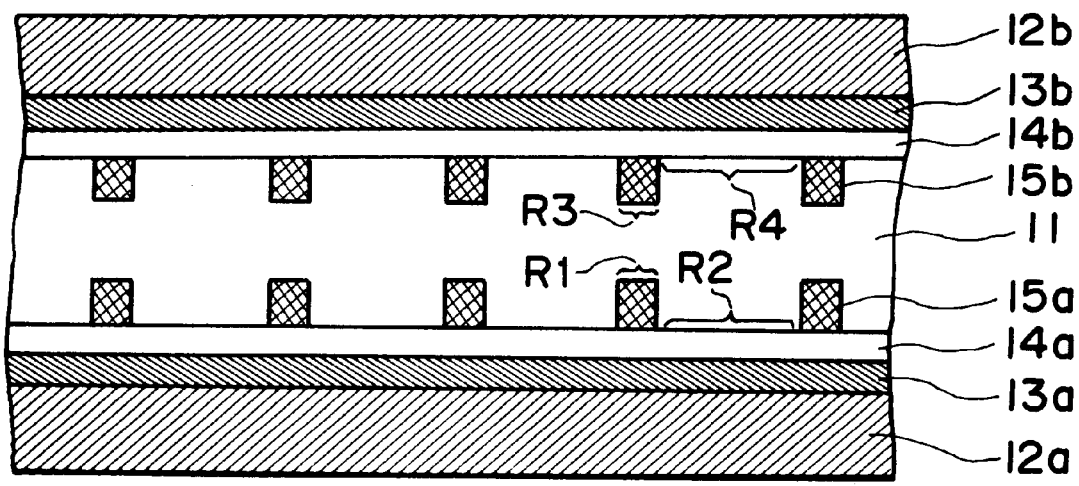
FIGS. 6, 7 and 9 are respectively a schematic sectional view of a liquid crystal device according to fourth, fifth and sixth embodiments of the present invention, respectively.

FIG. 6 shows an example of the liquid crystal device according to a fourth embodiment of the present invention.

Referring to FIG. 6, the liquid crystal device include a pair of substrates 12a and 12b provided with a patterned alignment control layers 15a and 15b at their inner surfaces, respectively. Surface regions R3 and R4 are disposed opposite to the regions R1 and R2 (as in the first embodiment shown in FIG. 2), respectively, and have similar functions as in the regions R1 and R2, respectively.

The layer 14b and the alignment control layer 15b may preferably be formed in the same manner as in the layer 14a and the alignment control layer 15a used in the first embodiment, respectively.

In this embodiment, both the alignment control layers 15a and 15b have an identical uniaxial alignment axis direction and an identical uniaxial aligning treatment direction, thus providing the alignment state-forming processes as shown in FIGS. 3–5 on both substrate sides.

In this embodiment, it is also possible to provide the opposing regions R1 and R2 with a difference in surface potential of at least 50 mV, preferably at least 100 mV by appropriately selecting the material and treating method, thus fixing the liquid crystal molecular position therebetween providing a dark state permanently thereby to prevent the light leakage.

In this embodiment, the substrate structure of either one or both of the substrate 12a and 12b may be modified into a substrate structure similar to those of the substrates 12a as shown in FIGS. 17 and 18, thus imparting a smaller uniaxial alignment control force to the regions R2 and/or R4.

Figure 7:
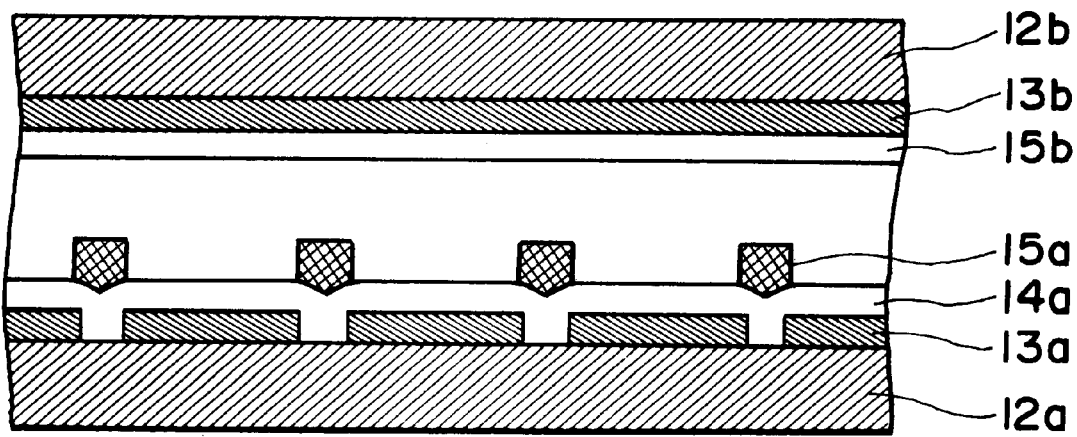

FIG. 7 shows an example of a liquid crystal device according to a fifth embodiment of the present invention, wherein a matrix electrode structure is formed.

Referring to FIG. 7, the electrodes 13a and 13b formed in stripe shape on the substrates 12a and 12b and arranged in an electrode matrix so that stripe electrodes 13a and 13b intersect each other to form a plurality of pixels or effective drive regions at each intersection with spacing therebetween.

Figure 8:
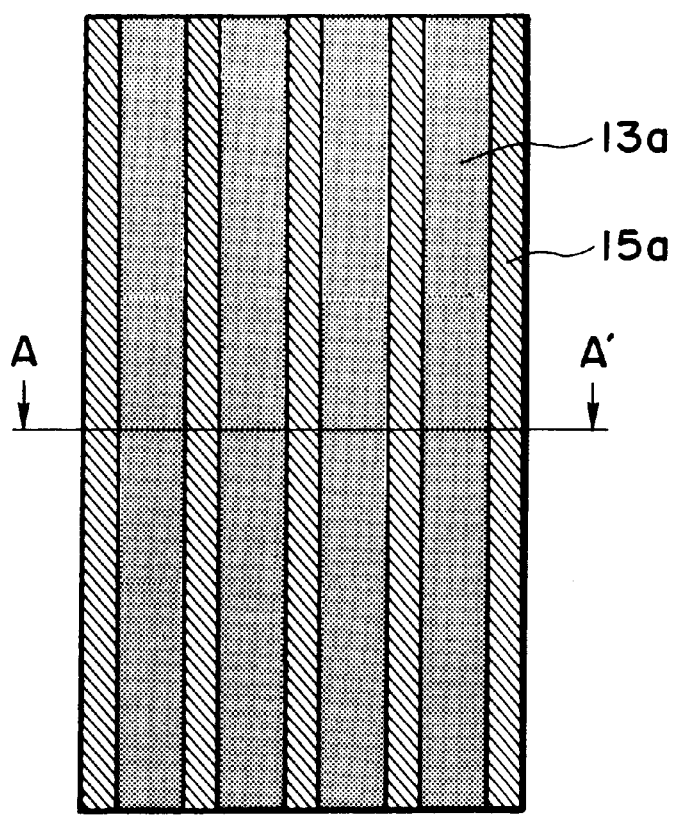
FIGS. 8 and 10 are respectively a plan view showing a positional relationship between alignment control layer and an electrode on one substrate (12a) side shown in FIGS. 7 and 9, respectively.

On the substrate 12a, the alignment control layer 15a is disposed on the layer 14a so as to cover the spacings of the stripe lines of the electrode 13a as shown in FIG. 8.

FIG. 8 is a plan view of the device (shown in FIG. 7) viewed from the upper substrate (12b) side. FIG. 7 is a sectional view of the device shown in FIG. 8 taken along A–A' line of FIG. 8.

In this embodiment, when the electrode 13a is provided with a metal layer (auxiliary electrode), the stripe lines of the alignment control layer 15a may also preferably cover the metal layer portion. Further, the alignment state-forming processes as shown in FIGS. 3–5 in this embodiment are performed similarly as in the first embodiment. In addition, as shown in FIG. 8, the alignment control layer 15a having the uniaxial alignment control force does not cover a portion corresponding to the pixels (effective drive regions), thus increasing an effective pulse voltage for driving the liquid crystal 11. As a result, a uniform alignment state and a high-speed liquid crystal driving (switching) can be realized simultaneously.

In this embodiment, it is also possible to provide an effective pixel area to increase an opening of the device. Further, similarly as in the first embodiment, by providing a certain surface potential difference between the surface of the alignment control layer 15a and the opposing surface (of the alignment control layer 15b), it is possible to fix a portion corresponding to the pixel spacings in a dark state, thus improving a contrast without using the lack matrix (e.g., metal layer).

In this regard, the stripe pattern of the alignment control layer 15a as shown in FIG. 8 may preferably be modified into a cross stripe pattern herein stripe lines in one direction are parallel to hose of the electrodes 13a and the other stripe lines in another direction are perpendicular to those of the electrodes 13a and overlap the spacings of stripe lines of the other electrode 13b.

In this embodiment, the substrate structure of the substrate (12a) side as in the second and third embodiment may be employed.

Figure 9:
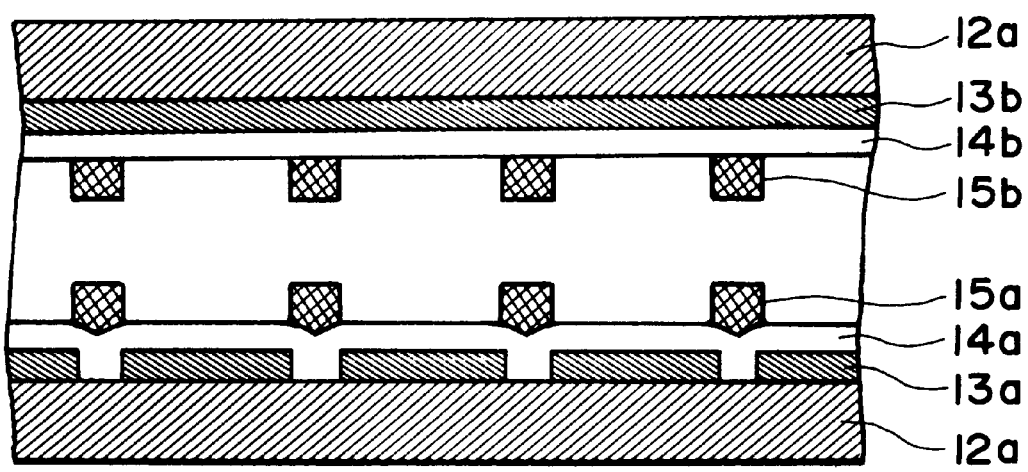

FIG. 9 shows an example of a liquid crystal device according to sixth embodiment of the present invention, wherein a matrix electrode structure is formed in the same manner as in the fifth embodiment except that the alignment control layer 15b is also formed in a stripe pattern similarly as in the alignment control layer 15a.

Figure 10:
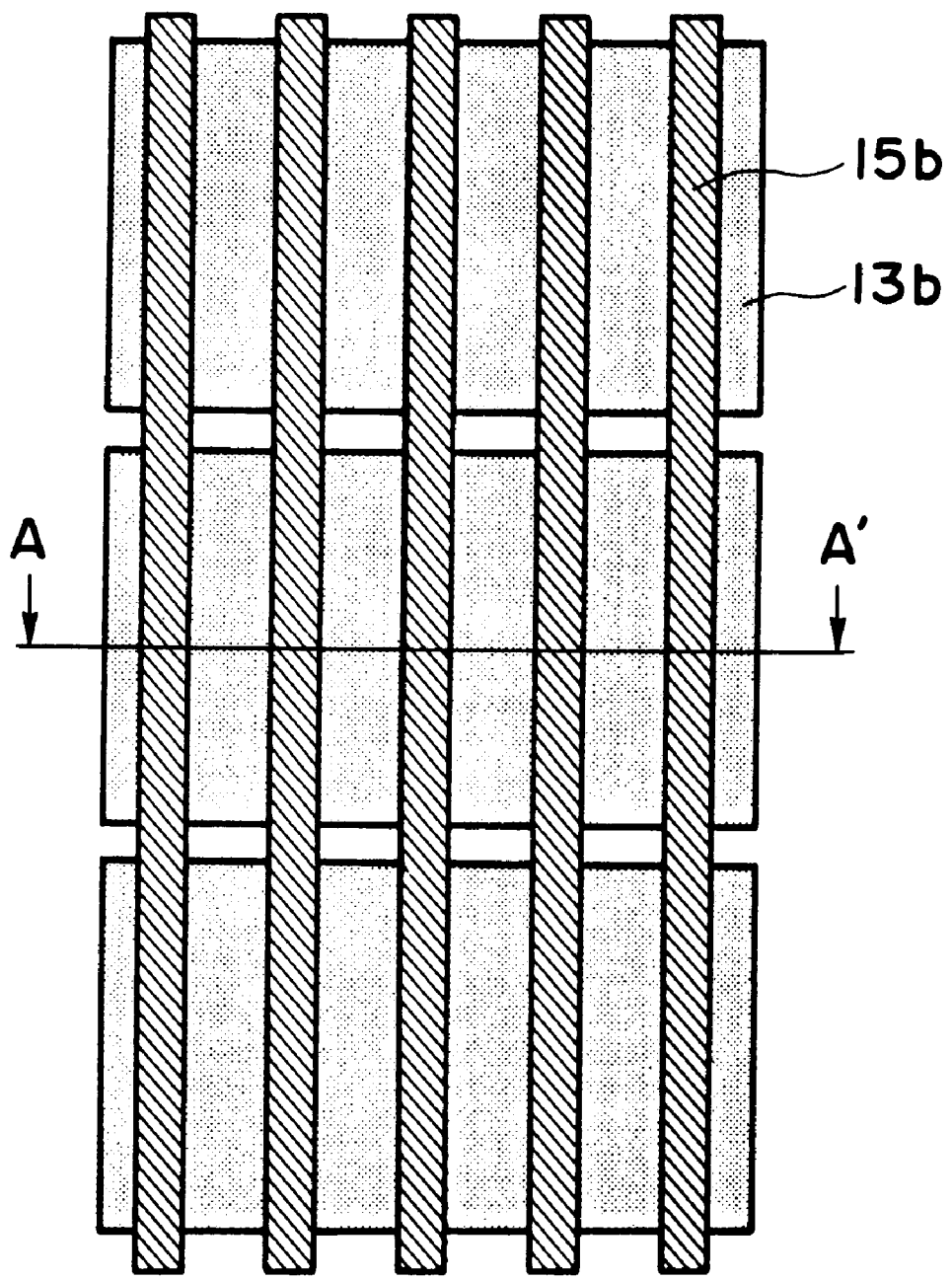

FIGS. 8 and 10 show plan views of the substrate (12a) side and the substrate (12b) side of the device of FIG. 9, respectively.

FIG. 9 also corresponds to a sectional view taken along A–A' lines of FIGS. 8 and 10.

In this embodiment, similarly as in the fourth embodiment, the alignment state-forming processes as shown in FIGS. 3–5 are observed with respect to both the substrates (12a and 12b).

In addition, the above-described modifications and treating conditions employed in the first to fifth embodiments may also be applicable to this embodiment, thus attaining the similar effects as descried above.

The liquid crystal devices according to the above fifth and sixth embodiments employing the matrix electrode structure can effect pattern display and pattern exposure, thus being suitably used as display portion of a personal computer and work station and a light valve for a printer, etc.

Further, also in the fifth and sixth embodiment, the (stripe-shaped) alignment control layers 15a and 15b may be disposed within the pixels (or effective drive regions) in order to improve an alignment state as a whole. Within the pixel portion, the alignment control layers 15a and/or 15b formed may preferably have a thickness of 50–5000 Å, more preferably at least 500 Å, thus suppressing a voltage applied to a liquid crystal portion corresponding to the alignment control layers concerned. As a result, the entire liquid crystal portion covered by the alignment control layers within the pixel portion is not driven, thus improving a drive characteristic of the liquid crystal at a portion where the stripe electrodes intersect each other as a whole.

In the present invention, respective specific embodiments and their modifications described in the above first to sixth embodiments are appropriately applicable to other embodiments each other in order to obtain the respective desired effects.

The liquid crystal device according to the present invention (particularly according to the fifth and sixth embodiments) may be driven by simple matrix-driving methods as disclosed in, e.g., JP-A 59-193426, JP-A 59-193427, JP-A 60-156046 and JP-A 60-156047.

Figure 11:
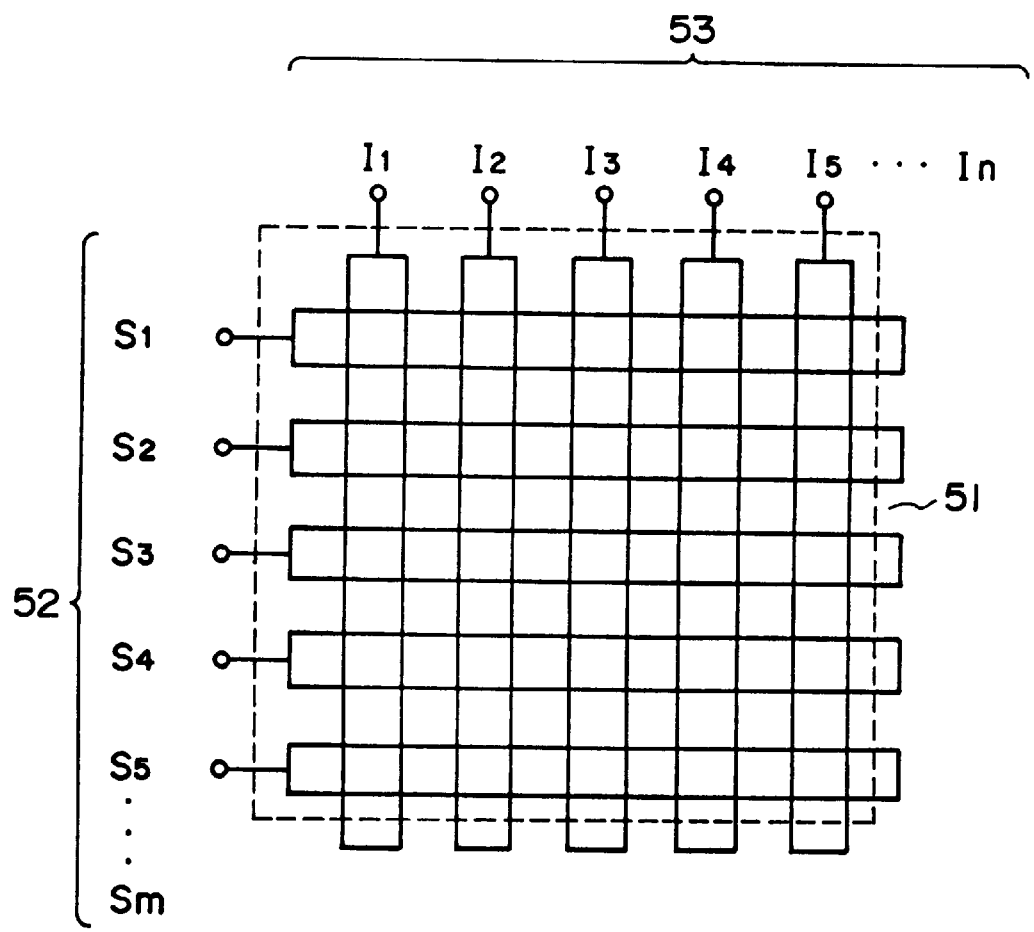
FIG. 11 is a plan view of a liquid crystal device provided with an electrode matrix.

FIG. 11 is a plan view showing such an electrode matrix used in a liquid crystal device (panel) 51 of a simple matrix-type. The liquid crystal device 51 includes scanning electrodes 62 ($S_1, S_2, S_3, \ldots S_m$) provided to one substrate and data electrodes 53 ($I_1, I_2, I_3, \ldots I_n$) provided to the other substrate intersecting each other so as to constitute a pixel (one display unit) at each intersection together with a liquid crystal disposed between the scanning electrodes 52 and data electrodes 53. The liquid crystal device is driven by applying voltages to the liquid crystal through the scanning and data electrodes 52 and 53. Particularly, in the above-described third and fourth embodiments, the electrodes 13a and 13b formed on the substrates 12a an 13a, respectively, correspond to any one of the above electrodes 52 and 53.

Figure 12:
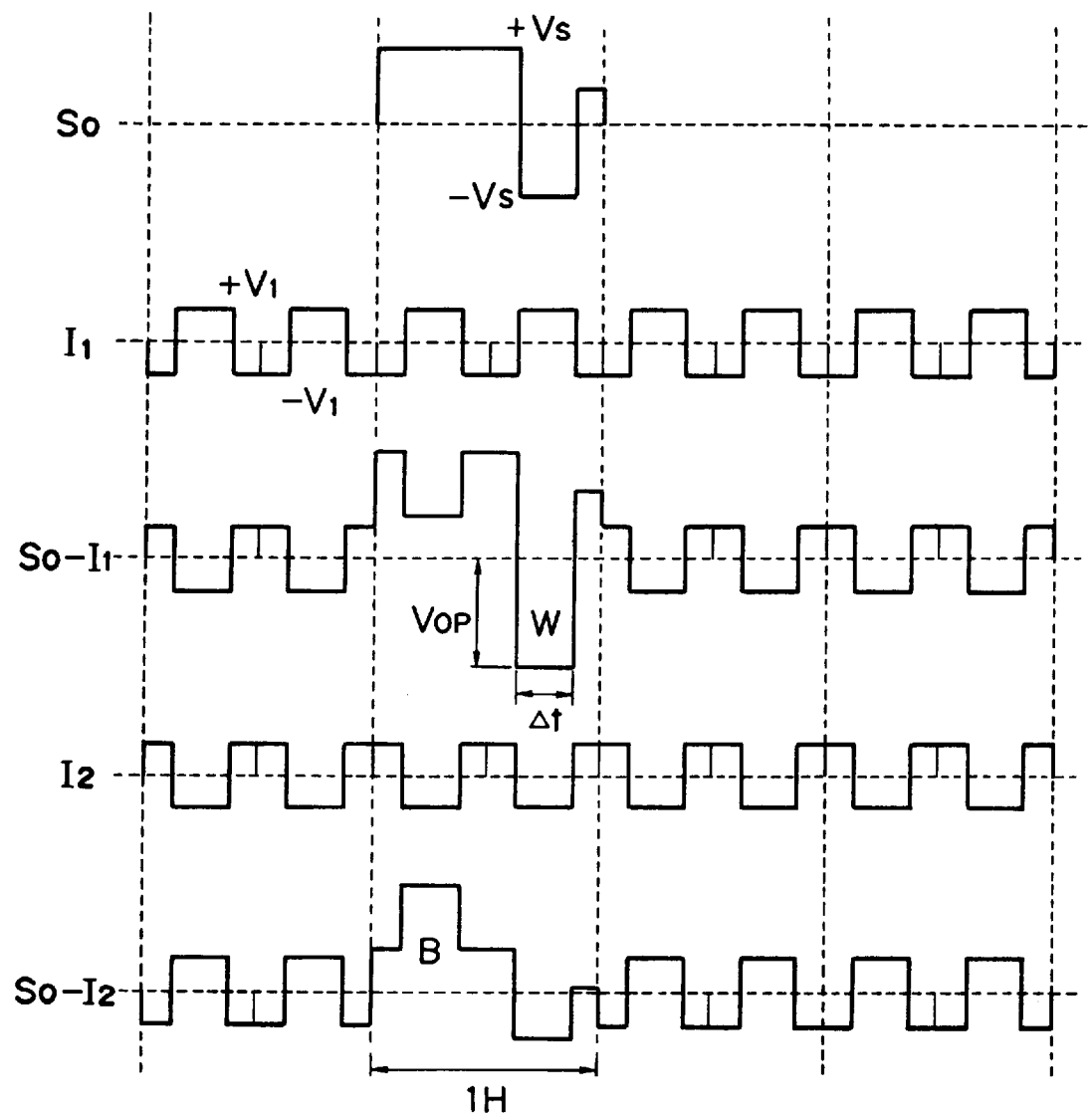
FIGS. 12 and 13 are respectively a set of drive waveforms used for driving a liquid crystal device according to the present invention of a simple matrix-type.
Figure 13:
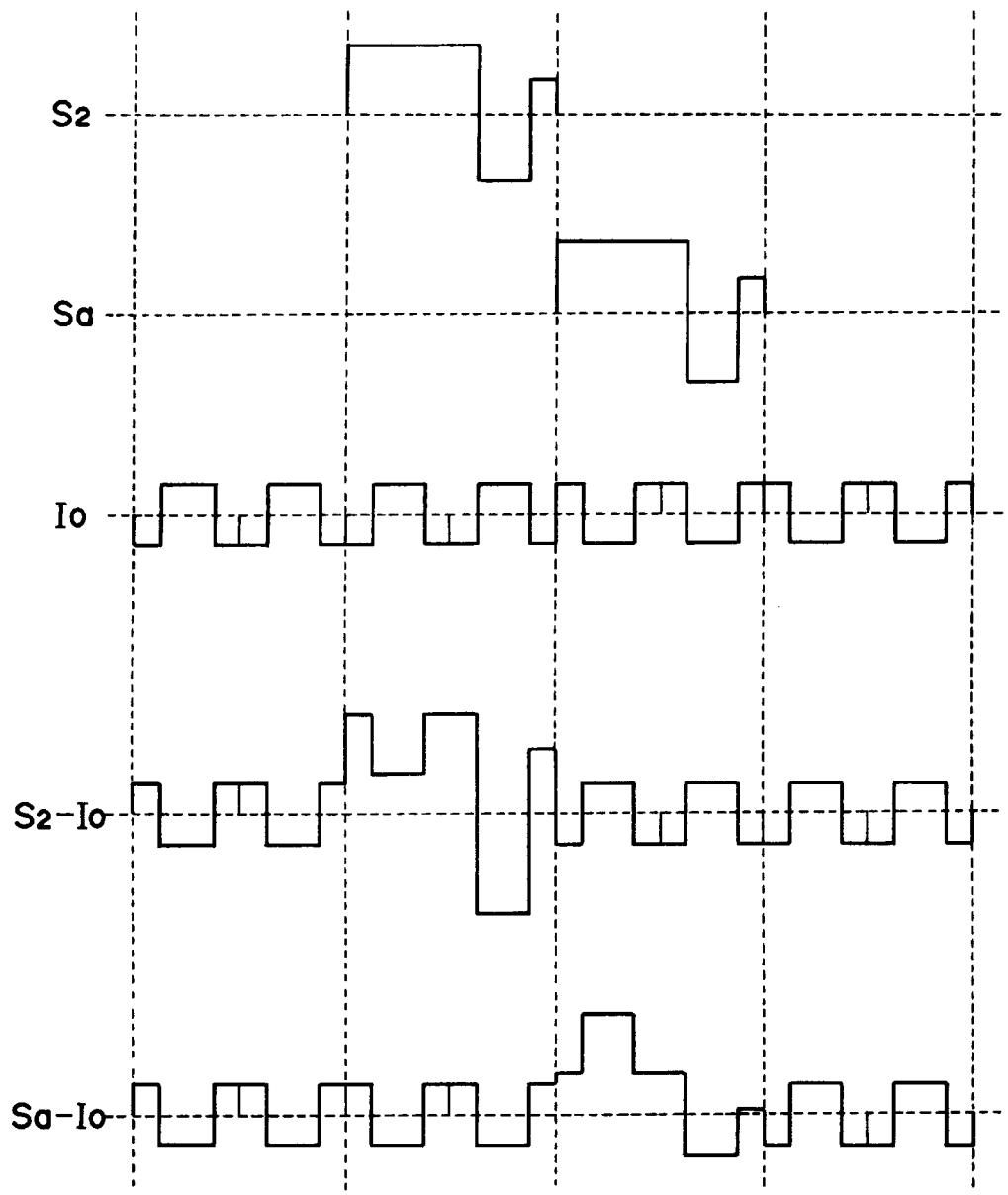

FIGS. 12 and 13 are an embodiment of a set of time-serial waveforms used in a (multiplexing) driving method for the electrode matrix structure shown in FIG. 11.

FIG. 12 shows reset writing-type waveforms wherein a black display state (B) is given by a positive (+) polarity based on a scanning line side and is also set as a reset state (reset direction).

Referring to FIG. 12, at $S_0$ is shown a scanning signal waveform applied to a scanning line, at $I_1$ is shown a data signal waveform (providing a white (W) display state) applied to a selected data line, and at $I_N$ is shown a data signal waveform (providing a black (B) display state) applied to a data line. Further, at ($S_0$–$I_1$) and ($S_0$–$I_2$) in the figure are shown voltage waveforms applied to pixels on a selected scanning line, whereby a pixel supplied with the voltage ($S_0$–$I_1$) assumes a white display state and a pixel supplied with the voltage ($S_0$–$I_2$) assumes a black display state. When four consecutive pixels on one data line are supplied with voltages to assume W, W, B and B display states, respectively, by using the waveforms shown in FIG. 7; the voltage (time-serial waveforms) ($S_2$–$I_0$) and ($S_3$–$I_0$) shown in FIG. 8 are applied to the second and third pixels, respectively.

In the driving embodiment shown in FIGS. 12 and 13 based on a writing pulse width or duration $\Delta t$ of a single polarity voltage applied to a pixel on a selected scanning line, a one-line clearing pulse width is set to $(5/2)\Delta t$.

Further, after the writing pulse $\Delta t$, an auxiliary pulse of an opposite polarity $(1/2)\Delta t$ (or the reset pulse side) is set. Accordingly, in the driving waveforms shown in FIGS. 12 and 13, one horizontal line scan period (1H) is set to 4 $\Delta t$.

Other than the driving waveforms shown in FIG. 8 wherein a sequential scanning is performed without providing a period in which adjacent scanning signal waveforms to be outputted overlap each other ("waveform-overlapping period"), it is practically possible to decrease a 1H (e.g., 2 $\Delta t$) by providing a waveform-overlapping period (e.g., 2 $\Delta t$) with respect to at least two scanning lines (e.g., adjacent two scanning lines).

The parameters including scanning signal voltage $V_S$, data signal voltage $V_I$, driving voltage $V_{op}=V_S+V_I$, bias ratio $V_I/(V_S+V_I)$, and pulse period $\Delta t$ in the driving waveforms shown in FIG. 12 are determined depending on switching characteristics of a liquid crystal material used.

Figure 14:
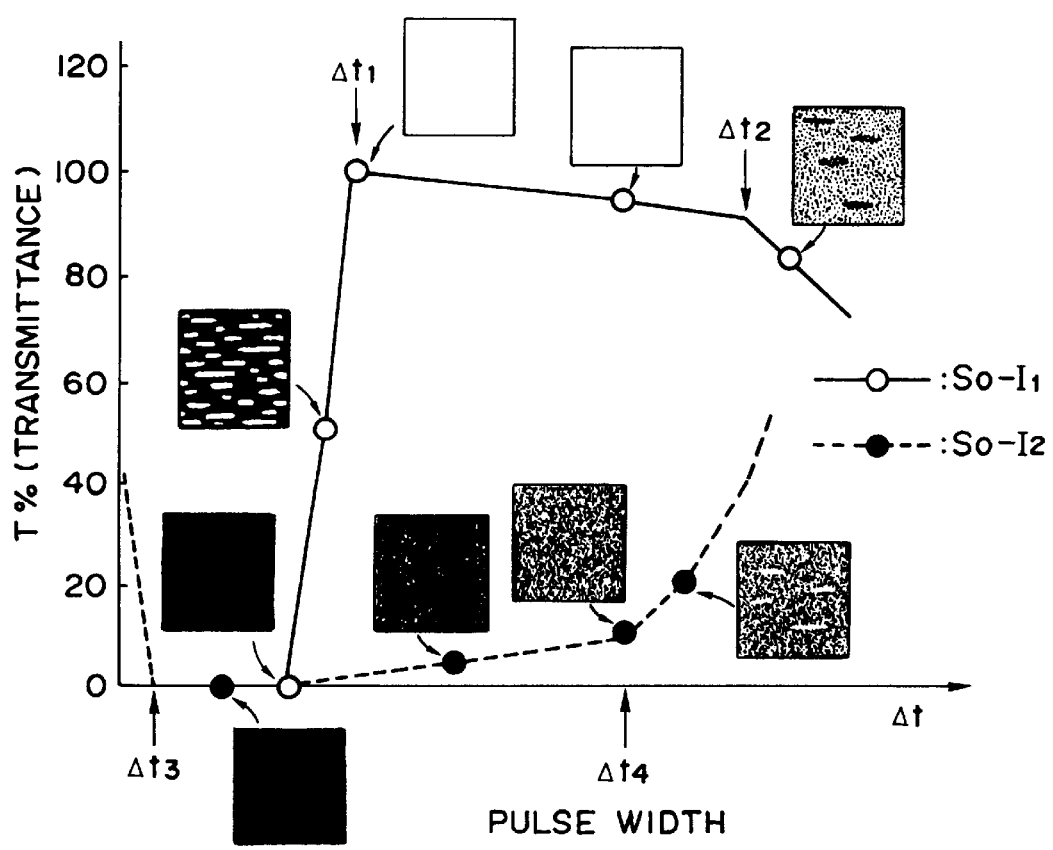
FIG. 14 is a graph showing a relationship between a pulse width ($\Delta t$) and a transmittance (T) when the drive waveforms shown in FIGS. 12 and 13 are used.

FIG. 14 shows a change in transmittance T (%) on a selected pixel concerned when a pulse width $\Delta t$ is changed after a driving waveform. In this embodiment, the parameters are fixed at constant values of a driving voltage $V_{op}=20$ volts and a bias ratio $V_I/(V_I+V_S)=1/3.4$. Referring to FIG. 14, a solid line (plotted with 0) when the voltage ($S_0$–$I_1$) (reset into B and W writing) shown in FIG. 12 is applied to a pixel concerned, and a broken line (plotted by) represents a transmittance change when the voltage ($S_0$–$I_2$) (reset into B and B holding) shown in FIG. 12 is applied to a pixel concerned, respectively.

In the case of applying the voltage waveform ($S_0$–$I_1$) for displaying a W (white) state, a previous display state is a B (black) state and is completely written into a W state with a writing pulse width of at least $\Delta t_1$. Further, when the writing pulse width ($\Delta t$) exceeds $\Delta t_2$, the writing into W state is little performed since the auxiliary pulse of the opposite polarity subsequent to the W writing pulse of the waveform ($S_0$–$I_1$) shown in FIG. 12 is applied for directing the pixel concerned toward B state.

In the case of applying the voltage waveform ($S_0$–$I_2$) for displaying a B state, a previous display state is a W state and is completely reset into and held at a B state with a pulse width of at least $\Delta t_3$. Further, when the pulse width ($\Delta t$) exceeds $\Delta t_4$, the holding at B state is little performed since the auxiliary pulse of the opposite polarity subsequent to the B pulse of the waveform ($S_0$–$I_2$) shown in FIG. 12 is applied for directing the pixel concerned toward W state.

Generally, the pulse width $\Delta t_1$ is larger than the pulse width $\Delta t_3$ ($\Delta t_1 > \Delta t_3$), so that the pulse width $\Delta t$ is referred to as a threshold pulse width. Further, the pulse width $\Delta t_2$ may be referred to as a white crosstalk pulse width and the pulse width $\Delta t_4$ may be referred to as a black crosstalk pulse width. In the embodiment shown in FIG. 14, the pulse width $\Delta t_4$ is smaller than the pulse width $\Delta t_2$ ($\Delta t_4 < \Delta t_2$), so that the pulse width $\Delta t_4$ is referred to as a crosstalk pulse width.

When a pulse width $\Delta t$ locating between $\Delta t_1$ (threshold pulse width) and $\Delta t_4$ (crosstalk pulse width) is employed for a driving waveform, it is possible to effect a matrix driving. As a result, the W displaying waveform ($S_0$–$I_1$) shown in FIG. 12 ensures a W display state and the B displaying waveform ($S_0$–$I_2$) shown in FIG. 12 ensures a B display state, so that it becomes possible to effect a good image display of W and B states by merely changing the polarity of the data signal waveform used.

It is of course possible to increase the values of the crosstalk pulse widths $\Delta t_2$ and $\Delta t_4$ by increasing the bias ratio (i.e., by causing the bias ratio to approach a unity). However, a large bias ratio corresponds to a large amplitude of a data signal and leads to an increase in flickering and a lower contrast, thus being undesirable in respect of image quality. According to our study, a bias ratio of about 1/3–1/5 was practical.

In the present invention, in order to effect a quantitative evaluation of a drive margin representing a degree of allowance for designing driving conditions, the above-mentioned threshold pulse width $\Delta t_1$ and the crosstalk pulse width $\Delta t_4$ (or $\Delta t_2$) are used to represent a driving margin parameter M2 (M2 margin) which is a parameter of a pulse width ratio on the basis of an average (central) value of these values. The M2 margin is obtained by the following equation:

($M2$ margin)=$(\Delta t_4 - \Delta t_1)/(\Delta t_4 + \Delta t_1)$.

The above-described drive margin by which selected pixels are written in two states of "black" and "white" depending on two opposite polarities of data signals and non-selected pixels can retain the written "black" and "white" states at a constant temperature as described above, vary depending on and are intrinsic to a liquid crystal material used and a cell structure employed. Further, the driving margin is changed according to a change in environmental temperature, so that optimum driving conditions should be required of an actual liquid crystal display apparatus in view of a liquid crystal material used, a cell (device) structure and an environmental temperature. The larger drive margin parameter M2 described above is advantageous to a practical display device or apparatus.

Incidentally, the driving characteristic shown in FIG. 14 may be evaluated by changing a driving voltage Vop (while fixing the pulse width $\Delta t$) or by changing both the Vop and $\Delta t$.

In the present invention, it is possible to use, as one electrode plate, an active matrix substrate provided with a plurality of switching elements (e.g., TFT (thin film transistor) or MIM (metal-insulator-metal)) in combination with a drive circuit (drive means), thus effecting an active matrix drive to allow a display of high-speed drive.

Hereinbelow, as a seventh embodiment of the present invention, a liquid crystal device provided with such an active matrix substrate will be explained with reference to FIGS. 19–22.

Figure 19:
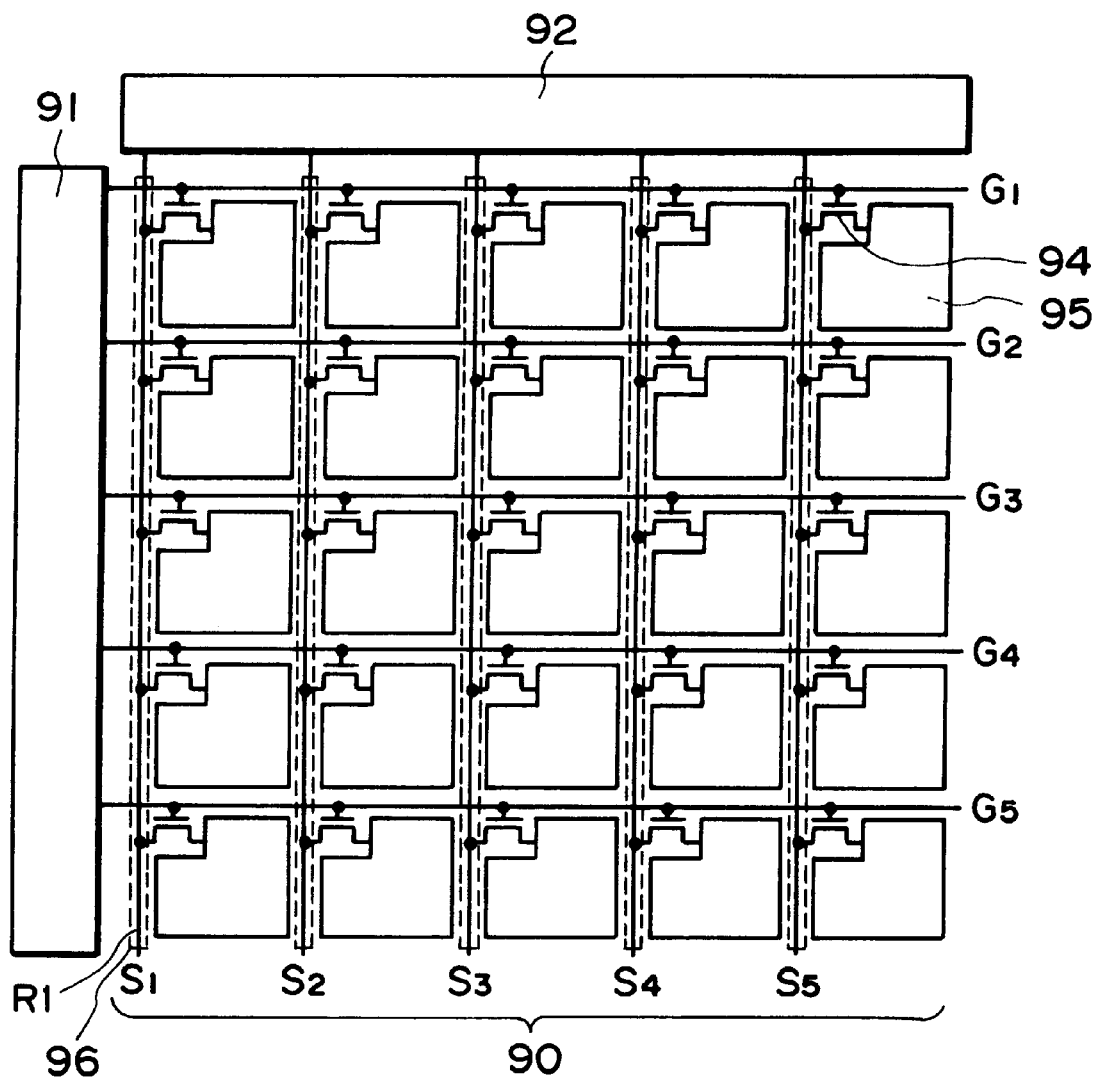
FIG. 19 is a schematic plan view of an embodiment of an active matrix-type liquid crystal device and a driving means therefor.

FIG. 19 shows a schematic plan view of such a liquid crystal device in combination with drive circuits and principally illustrates a structure of the active matrix substrate side.

Referring to FIG. 19, a liquid crystal device (panel) 90 includes a structure such that gate lines (G1, G2, G3, G4, G5, . . . ) corresponding to scanning lines connected to a scanning signal driver 91 (drive means) and source lines (S1, S2, S3, S4, S5, . . . ) corresponding to data signal lines connected to a data signal driver 92 (drive means) are disposed to intersect each other at right angles in an electrically isolated state, thus forming a plurality of pixels (5×5 in FIG. 19) each at intersection thereof. Each pixel is provided with a thin film transistor (TFT) 94 as a switching element and a pixel electrode 95 (as an effective drive region). The switching element may be a metal-insulator-metal (MIM) element. The gate lines (G1, G2, . . . ) are connected with gate electrodes (not shown) of the TFT 94, respectively, and the source lines (S1, S2, . . . ) are connected with source electrodes (not shown) of the TFT 94, respectively. The pixel electrodes 95 are connected with drain electrodes (not shown) of the TFT 94, respectively.

A gate voltage is supplied to the gate lines (G1, G2, . . . ) from the scanning signal driver 91 by effecting scanning selection in, e.g., a line-sequential manner. In synchronism with this scanning selection on the gate lines, the source lines (S1, S2, . . . ) are supplied with a data signal voltage depending on writing data for each pixel from the data signal driver 92. The thus-supplied gate and data signal voltages are applied to each pixel electrode 95 via the TFT 94.

At a portion other than the pixel electrodes 95 constituting the effective drive regions, e.g., in regions R1 (enclosed by broken lines) along the source lines (S1, S2, . . . ), an alignment control layer 96 having a uniaxial alignment control force acting on the liquid crystal is at least disposed. The alignment control region 96 may also be disposed along the gate lines (G1, G2, . . . ) or disposed along both the source and gate lines.

The active matrix substrate provided with the alignment control layer 96 as shown in FIG. 19 may be used as either one or both of a pair of oppositely disposed substrates constitution the liquid crystal device of the present invention.

Figure 20:
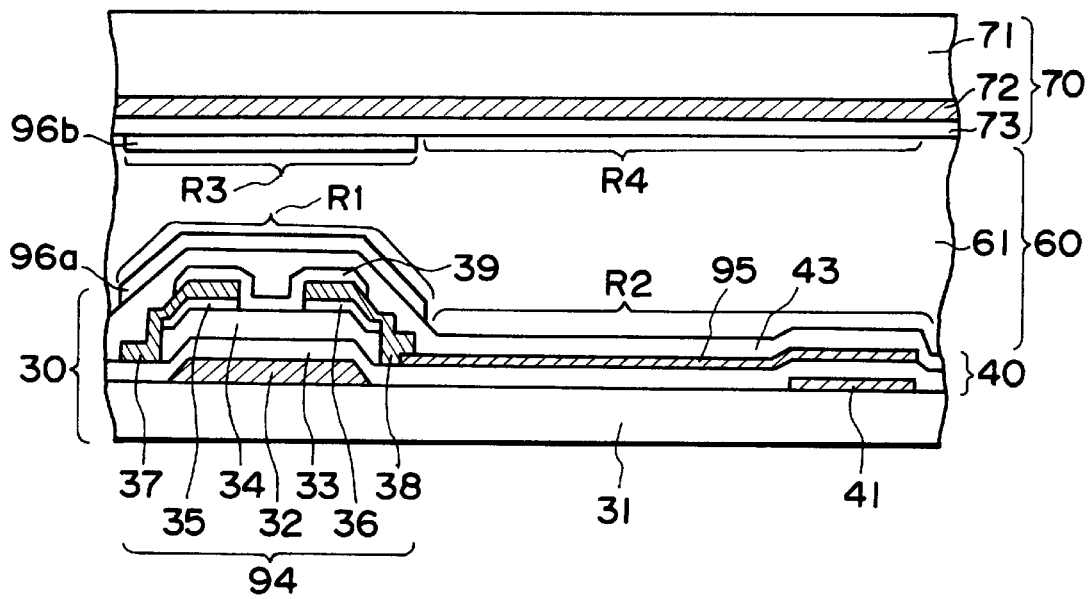
FIG. 20 is a schematic sectional view of an embodiment of each pixel of the active matrix-type liquid crystal device shown in FIG. 19.

FIG. 20 shows a sectional structure of each pixel portion (corr. to 1 bit) in the panel structure shown in FIG. 19.

Referring to FIG. 20, a layer of a liquid crystal material 61 having a spontaneous polarization are sandwiched between an active matrix substrate or plate (electrode plate) 30 provided with a TFT 94 and a pixel electrode 95 and an opposing substrate or plate (electrode plate) 70 provided with a common electrode 72, thus providing a (liquid crystal) capacitor (Clc) 60 of the liquid crystal layer 61.

In this embodiment, the active matrix substrate 30 includes an amorphous silicon (a-Si) TFT as the TFT 94. The TFT may be of a poly-Si type, i.e., (p-Si) TFT.

The TFT 94 is formed on a substrate 31 of, e.g., glass and includes: a gate electrode 32 connected with the gate lines (G1, G2, . . . shown in FIG. 19); an insulating film (gate insulating film) 33 of, e.g., silicon nitride (SiOx) formed on the gate electrode 32; an a-Si layer 34 formed on the insulating film 33; $n^+$a-Si layers 35 and 36 formed on the a-Si layer 34 and spaced apart from each other; a source electrode 37 formed on the $n^+$a-Si layer 35; a drain electrode 38 formed on the n⁺a-Si layer 36 and spaced apart from the source electrode 37; a channel protective film 39 partially covering the a-Si layer 34 and the source and drain electrodes 37 and 38. The source electrode 37 is connected with the source lines (S1, S2, . . . shown in FIG. 19) and the drain electrode 38 is connected with the pixel electrode 95 (FIG. 19) of a transparent conductor film (e.g., ITO film). The TFT 94 is placed in an "ON" state by applying a gate pulse to the gate electrode 32 during a scanning selection period of the corresponding gate line.

Further, on the active matrix substrate 30, a structure constituting a holding capacitor (Cs) 40 is formed by the pixel electrode 95, a holding capacitor electrode 41 disposed on the substrate 31. The structure (holding capacitor) (Cs) 40 is disposed in parallel with the liquid crystal layer 61. In the case where the holding capacitor electrode 41 has a large area, a resultant opening rate is decreased. In such a case, the holding capacitor electrode 41 is formed of a transparent conductor film (e.g., ITO film).

On the TFT 94 and the pixel electrode 15 of the active matrix substrate 30, a layer 43 for controlling an alignment state of the liquid crystal 61. The layer 43 is partially (selectively) coated with an alignment control layer 96a having a uniaxial alignment control force at a portion corresponding to the TFT portion.

On the other hand, the opposing substrate 70 includes a substrate (e.g., glass substrate) 71; a common electrode 72 having a uniform thickness disposed on the substrate 71; and a layer 73 having a uniform thickness, disposed on the common electrode 72, for controlling an alignment state of the liquid crystal 61.

The layer 73 is partially (selectively) coated with an alignment control layer 96b having a uniaxial alignment control force at a portion opposite to the alignment control layer 96a (corr. to the TFT portion).

The alignment control layers 96a and 96b may be formed in a similar manner as in the alignment control layer 15 (as shown in FIG. 9) comprising the uniaxial aligning-treated insulating film. The layers 43 and 73 may also be formed in a similar manner as in the layers 14a and 14b (as shown in FIG. 9).

As a result, in the liquid crystal device shown in FIG. 20, it is possible to provide regions R1 and R2 (corr. to the alignment control layers 96a and 96b) having a larger uniaxial alignment control force and regions R2 and R4 (corr. to the exposed portions of the layers 43 and 73 constituting each effective drive region of the device) having a smaller or substantially no uniaxial alignment control force, thus providing the liquid crystal 61 (particularly a smectic liquid crystal) with an alignment state-forming process as shown in FIGS. 3–5.

The panel structure (liquid crystal device) including a plurality of the pixels each having the structure shown in FIG. 20 is sandwiched between a pair of polarizers (not shown) with polarizing axes intersecting each other at right angles. Further, other elements or members (e.g., spacer beads, adhesive beads) constituting the cell (panel) structure may be those used for that shown in FIG. 2.

Next, an example of an ordinary active matrix driving method applicable to the liquid crystal device using the active matrix substrate (plate) and a chiral smectic liquid crystal having a bistability as described above will be described with reference to FIGS. 21 and 22 in combination with FIG. 20.

Figure 21:
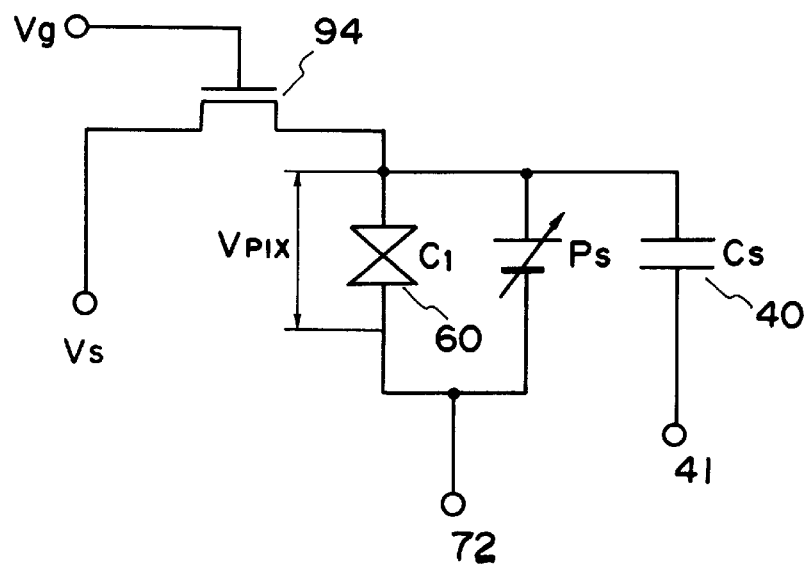
FIG. 21 is an embodiment of an equivalent circuit of each pixel portion shown in FIG. 20.

FIG. 21 shows an example of an equivalent circuit for each pixel portion of such a liquid crystal device shown in FIG. 20.

Figures 22A, 22B, 22C, 22D:
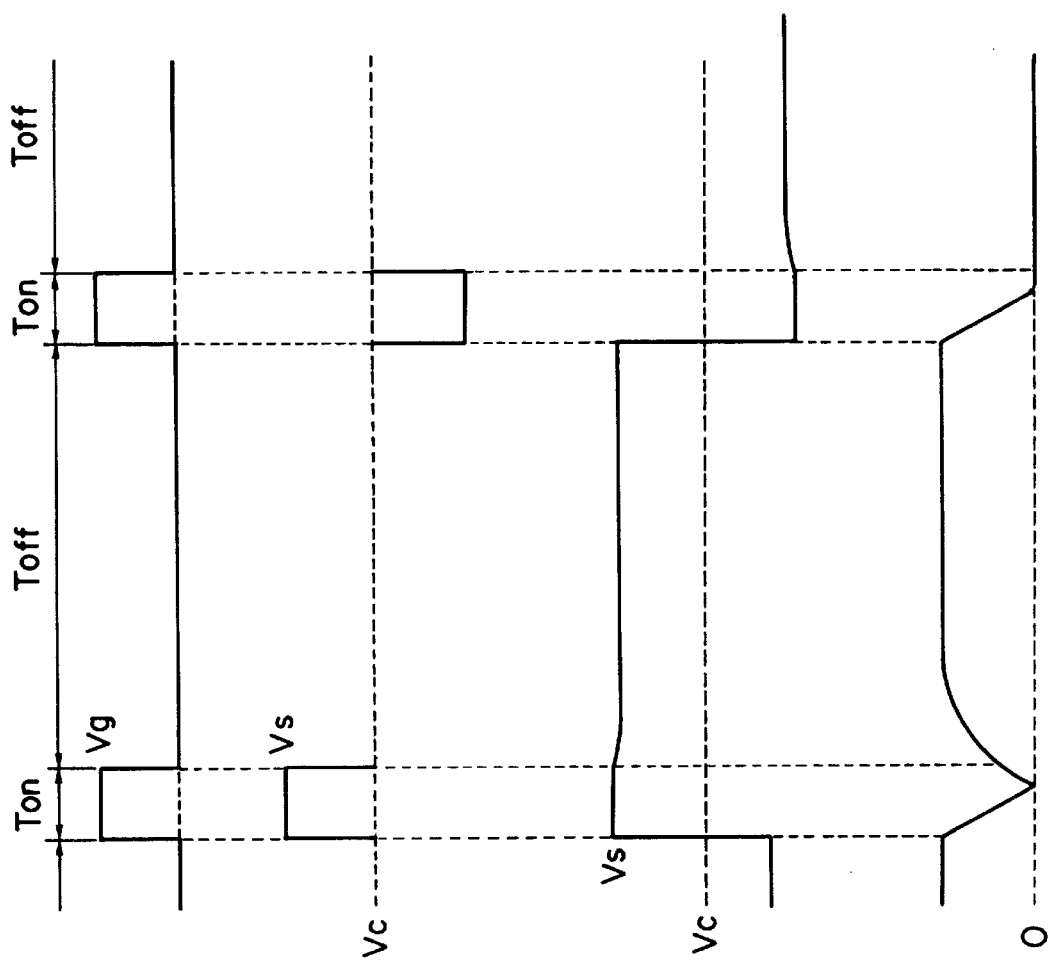
FIGS. 22A–22D includes a set of applied voltages (FIGS. 22A–22C) with respect to each pixel portion shown in FIG. 20 and an optical response (FIG. 22D) at the pixel portion.

FIG. 22A shows a voltage waveform applied to one gate line (e.g., G1 shown in FIG. 20) (as a scanning line) connected with each pixel.

In the liquid crystal device driven by the active matrix driving method, the gate lines G1, G2, . . . shown in FIG. 20 are selected in a line-sequential manner. At this time, each electrode 32 connected with a corresponding gate line is supplied with a prescribed gate voltage Vg in a selection period $T_{on}$, thus placing the TFT 94 in an "ON" state. In a non-selection period (frame period) $T_{off}$ corresponding to a period in which other gate lines are selected, the gate electrode 32 is not supplied with the gate voltage Vg, thus placing the TFT 94 in an "OFF" state (high-resistance state). In every non-selection period $T_{off}$, a prescribed and same gate line is selected and a corresponding gate electrode 32 is supplied with the gate voltage Vg.

FIG. 22B shows a voltage waveform applied to one source line (e.g., S1 shown in FIG. 20) (as a data signal line) connected to the pixel concerned.

When the gate electrode 32 is supplied with the gate voltage Vg in the selection period $T_{on}$, in synchronism with this voltage application, a prescribed source voltage (data signal voltage) Vs having a potential providing a writing data (pulse) to the pixel concerned is applied to a source electrode 37 through the source line connected with the pixel based on a potential Vc of a common electrode 72 as a reference potential.

At this time, the TFT 94 is in an "ON" state, whereby the source voltage Vs applied to the source electrode 37 is applied to a pixel electrode 15 via a drain electrode 38, thus charging a liquid crystal capacitor (Clc) 60 and a holding capacitor (Cs) 40. As a result, the potential of the pixel electrode 95 becomes a level equal to that of the source (data signal) voltage Vs.

On the other hand, in a non-selection period $T_{off}$ of the gate line on the pixel concerned, the TFT 94 is in an "OFF" (high-resistance) state. At this time, in the liquid crystal cell, ideally. The liquid crystal capacitor (Clc) 60 and the holding capacitor (Cs) 40 retain the electric charges therein, respectively, charged in the selection period $T_{on}$ to keep a prescribed voltage. As a result, the liquid crystal layer 61 of the pixel is supplied with the voltage of an opposite polarity through a frame period to provide a desired optical state (black state) by switching based on the voltage.

FIG. 22C shows a waveform of a pixel voltage Vpix actually held by the liquid crystal capacitor (Clc) 60 and the holding capacitor (Cs) 40 of the pixel concerned and also applied to the liquid crystal layer 61, and FIG. 22D shows an example of an actual optical response (in the case of a liquid crystal device of a transmission-type) at the pixel concerned.

As shown in FIG. 22C, an applied voltage through two frame periods comprises a positive voltage Vs in a first frame period and a negative voltage –Vs (having the same amplitude as Vs). In the first frame period, as shown in FIG. 22D, an optical state is obtained depending on Vs, and in the second frame period, depending on –Vs, an optical state is obtained.

Hereinbelow, the present invention will be described more specifically based on Experimental Examples.

Experimental Example 1

A liquid crystal composition (LC-1) used in this experimental example was prepared by mixing the following compounds (a)–(e) in indicated weight ratios.

| Compound No. | Structural formula |
|---|---|
| (a) | $C_8H_{17}$—[pyrimidine]—[phenyl]—$OCH_2CF_2OC_2F_4OC_4F_9$ |
| (b) | $C_8H_{17}$—[pyrimidine]—[phenyl]—$OCH_2CF_2OC_2F_4OC_2F_4OCF_3$ |
| (c) | $C_8H_{17}$—[pyrimidine]—[phenyl]—$OCH_2C_3F_6OC_4F_9$ |
| (d) | $C_6H_{13}O$—[biphenyl]—COO—[cyclohexyl with CF$_3$, O]—$OC_6H_{13}$ |
| (e) | $C_8H_{17}O$—[pyrimidine]—[phenyl]—$OCH_2$—[lactone with 2 CH$_3$] |

<LC-1>
(components)     (wt. parts)
(a):(b):(c):(d):(e) =    45:30:15:5:2
Phase transition (° C.):

Iso $\underset{77}{\rightleftarrows}$ SmA $\underset{41}{\rightleftarrows}$ SmC* $\underset{3}{\rightarrow}$ Cry.

Tilt angle (H) (30° C.) = 24.4 degrees
Spontaneous polarization Ps (30° C.) = −31.1 nC/cm$^2$ In this experimental example, respective (blank) cells of a simple matrix-type were prepared in the following manner.

Cell 1-A

A pair of 1.1 mm-thick glass substrates was coated with a ca. 70 nm-thick ITO (indium tin oxide) film (as a transparent electrode) in a stripe shape (width (for each line)=16 μm, spacing (between adjacent lines)=4 μm).

One of the glass substrate was coated with an ethanol solution of a sol-gel (process) silica binder by spin coating, followed by pre-drying for 5 min. at 80° C. and hot drying for 1 hour at 200° C. to form a 3 nm-thick silica binder layer.

The silica binder layer was coated by spin coating with a solution of a polyimide precursor having a recurring unit represented by the following formula and was pre-dried for 5 min. at 80° C., followed by hot curing for 1 hour at 200° C. to obtain a 5 nm-thick polyimide film.

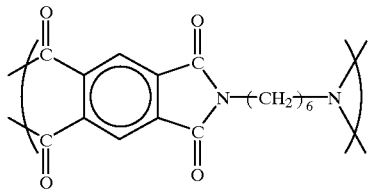

Then, the polyimide film was subjected to rubbing treatment (uniaxial aligning treatment) with a rubbing roller (including a 10 cm-dia. roller and a nylon cloth ("NF-77", mfd. by Teijin K.K.) wound about the roller) in one direction (perpendicular to the stripe-shaped polyimide film pattern) under rubbing conditions including: pressing depth=0.3 mm, substrate feed rate=10 cm/sec, roller rotation speed=1000 rpm, and substrate feed=four times.

On the other hand, the other glass substrate was coated with an ethanol solution of a sol-gel silica binder by spin coating, followed by pre-drying for 5 min. at 80° C. and hold drying for 1 hour at 200° C. to obtain a 3 nm-thick silica binder layer.

After silica beads (as a spacer) having an average diameter of 2.0 μm were dispersed on the substrate having thereon the polyimide film, the other substrate (having thereon the silica binder layer) was superposed on the above substrate so that the respective stripe-shaped ITO film patterns were arranged in an electrode matrix (as shown in FIG. 11) to prepare a blank cell.

The thus-prepared blank cell had an insulating film portion (the silica binder layer and the polyimide film) having a total thickness of 11 nm in an effective drive region (where the ITO electrodes intersected each other) of the cell.

Cell 1-B

A blank cell was prepared in the same manner as in the case of the Cell 1-A except that the thickness of the polyimide film was changed to 2 nm, which had an insulating film portion (the silica binder) layer and the polyimide film) having a total thickness of 8 nm in an effective drive regions of the cell.

Cell 1-C

A blank cell having a sectional structure as shown in FIG. 7 was prepared in the following manner.

A pair of 1.1 mm-thick glass substrates each coated with a ca. 70 nm-thick stripe-shaped ITO film (width=16 μm, spacing=4 μm) was prepared.

One of the glass substrates was coated with a solution of a sol-gel (process) silica binder in ethanol by spin coating, followed by pre-drying for 5 min. at 80° C. and hot drying for 1 hour at 200° C. to form a 3 nm-thick silica binder layer. The silica binder layer was coated with a solution of a polyimide precursor (the same as in the Cell 1-A) by spin coating, followed by pre-drying for 5 min. at 80° C. and hot drying for 1 hour at 200° C. to obtain a 50 nm-thick polyimide film.

The polyimide film was then subjected to UV (ultraviolet) ashing treatment.

More specifically, the polyimide film was coated with a ca. 2 μm-thick positive-type resist ("OFPR-800", mfd. by Tokyo Ohka K.K.) by spin coating. Thereafter, the polyimide film was pre-dried for 30 min. at 80° C. and was exposed to a UV light (λ=365 nm) for 16 sec. while using a stripe-shaped mask pattern (width=4 μm, spacing=16 μm) disposed so as to mask a spacing between the stripe-shaped ITO film pattern. The resultant polyimide film was developed with an organic developer ("MFCD-26", mfd. by Zyplay Co.) and was washed with flowing water for 3 min., followed by drying for 10 min. at 100° C. to obtain a resist pattern corresponding to the spacing between the ITO film pattern. The thus-treated polyimide film was subjected to a UV ashing with a low-pressure mercury lamp under conditions including a substrate temperature of 60° C. and a UV light energy (λ=254 nm) of 10 J/cm$^2$, thus effecting a removal of the polyimide film not masked with the resist pattern. After the resist pattern wa removed with a remover ("Resist Strip N-320", mfd. by Nagase Sangyo K.K.), the resultant substrate was washed with flowing water and was then dried to obtain a 50 nm-thick stripe-shaped polyimide film pattern (corresponding to the spacing of the ITO film pattern) having a width of 4 µm and a spacing of 16 µm (where the ITO film was not coated with the polyimide film).

After the UV ashing treatment described above, the resultant polyimide film pattern was subjected to the rubbing treatment (uniaxial alignment treatment) in the same manner as in the case of the Cell 1-A so that a rubbing treatment direction was perpendicular to an extension direction of the stripe-shaped polyimide film.

On the other hand, the other substrate was coated with an ethanol solution of a sol-gel (process) silica binder by spin coating, followed by pre-drying for 5 min. at 80° C. and hot drying for 1 hour at 200° C. to form a 3 nm-thick silica layer.

On the substrate provided with the polyimide film, silica beads having an average particle size of 2.0 µm (as a spacer) were dispersed and the other substrate provided with the silica layer was superposed so that the respective ITO film patterns were arranged in an electrode matrix (as shown in FIG. 11), thus preparing a blank cell having a sectional structure as shown in FIG. 7.

The thus-prepared cell had an insulating film portion (silica layers) having a total thickness of 6 nm in an effective drive regions of the cell.

Cell 1-D

A blank cell having a sectional structure as shown in FIG. 7 was prepared in the same manner as in the case of the Cell 1-C except that the thickness of the polyimide film (pattern) was changed to 30 nm, which had an insulating film portion (the silica layers) having a-total thickness of 6 nm in an effective drive region of the cell.

Cell 1-E

A blank cell having a sectional structure as shown in FIG. 9 was prepared in the following manner.

A pair of 1.1 mm-thick glass substrates each coated with a ca. 70 nm-thick stripe-shaped ITO film (width=16 µm, spacing=4 µm) was prepared.

Each of the glass substrates was coated with a solution of a sol-gel silica binder in ethanol by spin coating, followed by pre-drying for 5 min. at 80° C. and hot drying for 1 hour at 200° C. to form a 3 nm-thick silica layer. The silica layer was coated with a solution of a polyimide precursor (the same as in the Cell 1-A) by spin coating, followed by pre-drying for 5 min. at 80° C. and hot drying for 1 hour at 200° C. to obtain a 50 nm-thick polyimide film.

The thus formed polyimide film were then subjected to UV (ultraviolet) ashing treatment, respectively, in the same manner as in the case of the Cell 1-C except that one of the mask patterns on one glass substrate was disposed so as to mask a spacing between the stripe-shaped ITO film pattern., and the other mask-pattern on the other substrate was disposed perpendicular to the stripe-shaped ITO film pattern.

After the UV ashing treatment described above, each of the resultant polyimide film pattern was subjected to the rubbing treatment (uniaxial alignment treatment) in the same manner as in the case of the Cell 1-A so that a rubbing treatment direction was perpendicular to an extension direction of the stripe-shaped polyimide film.

On one of the substrates each provided with the polyimide film, silica beads having an average particle size of 2.0 µm (as a spacer) were dispersed and the other substrate was superposed so that the respective ITO film patterns were arranged in an electrode matrix (as shown in FIG. 11) and the respective polyimide film patterns were disposed opposite to each other while retaining their rubbing directions identical to each other, thus preparing a blank cell having a sectional structure as shown in FIG. 9.

The thus-prepared cell had an insulating film portion (silica layers) having a total thickness of 6 nm in effective drive regions of the cell.

Cell 1-F

A pair of 1.1 mm-thick glass substrates was coated with a ca. 70 nm-thick ITO (indium tin oxide) film (as a transparent electrode) in a stripe shape (width (for each line)=16 µm, spacing (between adjacent lines)=4 µm).

Each of the glass substrate was coated with an ethanol solution of a sol-gel silica binder by spin coating, followed by pre-drying for 5 min. at 80° C. and hot drying for 1 hour at 200° C. to form a 3 nm-thick silica layer.

Then, each of the silica layers was subjected to rubbing treatment (uniaxial aligning treatment) in the same manner as in the case of the Cell 1-A.

After silica beads (as a spacer having an average diameter of 2.0 µm were dispersed on one of the substrates, the other substrate was superposed on the above substrate so that the respective stripe-shaped ITO film patterns were arranged in an electrode matrix (as shown in FIG. 11) and the respective rubbing treatment axes on the substrates were in the same direction and in parallel with each other, thus preparing to prepare a blank cell.

The thus-prepared blank cell had an insulating film portion (the silica layers) having a total thickness of 6 nm in an effective drive region of the cell.

Each of the thus-prepared Cells 1-A to 1-F had a rectangular shape (2.5 cm×3.5 cm). In this regard, each of the Cells 1-C, 1-D and 1-E was designed to have a pair of parallel sides each having a length of 2.5 cm in an extension direction of the stripe-shaped ITO film pattern in parallel with the stripe-shaped polyimide film pattern.

In each of the Cells 1-A to 1-F, the above-prepared liquid crystal composition LC-1 was injected at its isotropic phase temperature, followed by gradual cooling to a temperature assuming chiral smectic (SmC*) phase, thus preparing chiral smectic liquid crystal devices (Devices 1-A to 1-F), respectively.

When a process of formation of an alignment (orientation) state of liquid crystal molecules in the cooling step (from isotropic phase to SmC* phase) was observed with a polarizing microscope (magnification=100) for the respective Devices 1-A to 1-F, the formation of an alignment state through the generation and growth of batonnets from a temperature in the vicinity of the phase transition temperature to SmA phase as shown in FIGS. 3A–3C was observed with respect to the Devices 1-C, 1-D and 1-E.

The liquid crystal devices (Devices 1-A to 1-F) were then subjected to evaluation of 1) uniformity in alignment and 2) drive margin parameter M2 (M2 margin) in the following manner.

1) Alignment Uniformity

Each of the liquid crystal devices wherein the liquid crystal was in SmC* phase was supplied with a (driving) voltage sufficient to cause switching of chiral smectic liquid crystal molecules to one display (stable) state and was subjected to observation with a polarizing microscope (magnification=100) to evaluate a resultant alignment state.

The results are shown in Table 1 below.

TABLE 1

| Device No. | Alignment state** |
|---|---|
| 1-A | Uniform |
| 1-B | Half focal conic |
| 1-C | Uniform |
| 1-D | " |
| 1-E | " |
| 1-F | Random |

**"Uniform" represents a uniform alignment state in the entire visible region. "Half focal conic" represents a focal conic texture in a half of the entire visible region. "Random" represents a random alignment state in the entire visible region.

2) M2 Margin

Each liquid crystal device was sandwiched between a pair of polarizers arranged in cross nicols and was then supplied with a drive waveform shown in FIGS. 12 and 13 under conditions including Vop=20 volts, bias ratio=1/3.3 and duty ratio=1/1000.

Figure 15:
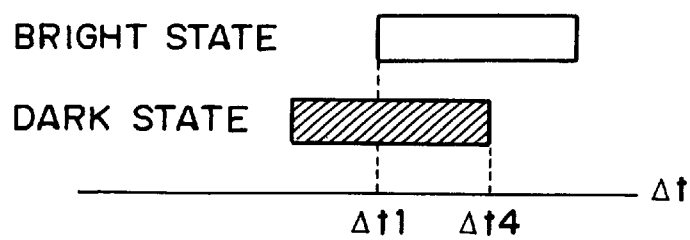
FIG. 15 is a schematic view for illustrating a drive margin for a liquid crystal device showing the relationship shown in FIG. 14.

For measurement of pulse widths for determining M2 margin, dark (black) and bright (white) states were written in, respectively, while varying a pulse width (Δt) of the applied pulse waveform, whereby a range of the pulse width allowing the writing of the bright and dark display states at the same time as shown in FIG. 15 between the threshold pulse width ($\Delta t_1$ for the bright state) and the crosstalk pulse width ($\Delta t_4$ for the dark state) was obtained.

Based on these values ($\Delta t_1$ and $\Delta t_4$), M2 margin was obtained according to the following equation:

$$M2=(\Delta t_4 - \Delta t_1)/(\Delta t_4 + \Delta t_1).$$

The measurement of M2 margin was performed at 40° C., 25° C. and 10° C., respectively, for the Devices 1-A to 1-E since the drive margin was not measurable in the Device 1-F due to the random alignment state of the liquid crystal. Further, the measurement of M2 margin was performed with respect to the Device 1-B only in a region providing a good alignment state (allowing a normal switching operation) and was performed with respect to the Devices 1-C, 1-D and 1-E in a region where the stripe-shaped polyimide film pattern was not disposed.

The results are shown in Table 2.

TABLE 2

| | Temperature (° C.) | | |
|---|---|---|---|
| Device No. | 40 | 25 | 10 |
| 1-A | 0.23 | 0.16 | 0.00 |
| 1-B | 0.15 | 0.14 | 0.10 |
| 1-C | 0.23 | 0.22 | 0.20 |
| 1-D | 0.23 | 0.21 | 0.20 |
| 1-E | 0.23 | 0.22 | 0.20 |

As apparent from the above results, the Device 1-A provided relatively larger M2 margins at 40° C. and 25° C. (room temperature or above) but failed to provide substantially no M2 margin at 10° C. (low temperature side). This may be attributable to an influence of the reverse electric field as described hereinabove. The Device 1-B showing an inferior alignment characteristic had a relatively large capacitance (electric capacity) of the alignment control layer (polyimide film) due to a thinner alignment control layer compared with the Device 1-A although it provided relatively low M2 margins at measuring temperatures, thus resulting in a relatively small degree of a decrease in M2 margin at low temperature (10° C.).

On the other hand, the Devices 1-C, 1-D and 1-E had a large capacitance of the alignment control layer in an effective drive regions (effective switching regions) between the oppositely disposed substrates due to the absence of the polyimide film, thus leading to a less decrease in M2 margin at low temperature to provide a small temperature-dependence of M2 margin compared with the Devices 1-A and 1-B.

As described above, a good drive margin characteristic was found to be realized by providing the substrate with a portion where the alignment control layer having a uniaxial alignment control force is disposed in a region other than the effective drive regions and also a portion having no alignment control layer in combination, thereby to obtain a uniform alignment characteristic through the formation of an alignment state from a liquid crystal region contacting the alignment control layer portion.

Experimental Example 2

In this experimental example, a commercially available antiferroelectric liquid crystal ("CS-4000", mfd. by Chisso K.K.) was used as a liquid crystal material.

Three (blank) cells were prepared in the following manner.

Cell 2-G

A pair of 1.1 mm-thick glass substrates was coated with a ca. 70 nm-thick ITO (indium tin oxide) film (as a transparent electrode) in a stripe shape (width (for each line)=16 μm, spacing (between adjacent lines)=4 μm).

Each of the glass substrate was coated with an ethanol solution of a sol-gel silica binder by spin coating, followed by pre-drying for 5 min. at 80° C. and hot drying for 1 hour at 200° C. to form a 3 nm-thick silica layer.

The silica layer was coated by spin coating with a solution of polyimide precursor ("SP-710", mfd. by Toray K.K.) in a mixture solvent of dimethyl-acetoamide/isopropyl alcohol (1/1) and was pre-dried for 5 min. at 80° C., followed by hot curing for 1 hour at 200° C. to obtain a 50 nm-thick polyimide film.

Then, each of the polyimide films was subjected to rubbing treatment (uniaxial aligning treatment) in the same manner as in the case of the Device 1-A so that their rubbing treatment axes satisfied a prescribed relationship described below when oppositely disposed each other.

After silica beads (as a spacer) having an average diameter of 1.4 μm were dispersed on one of the substrates, the other substrate was superposed on the above substrate so that the respective stripe-shaped ITO film patterns were arranged in an electrode matrix (as shown in FIG. 11) and the rubbing treatment axis of one substrate (upper substrate) formed an angle of 16 degrees in a counterclockwise direction from that of the other substrate (lower substrate) to prepare a blank cell.

<Cell 2-H>

A blank cell was prepared in the same manner as in the case of the Cell 2-G except that the thickness of the polyimide films were changed to 5 nm.

<Cell 2-I>

A blank cell was prepared in the same manner as in the case of the Cell 1-E (prepared in Experimental Example 1) except that a polyimide material (SP-710) and silica beads (average particle size=1.4 μm) used in the Cell 2-G were used, and the UV ashing treatment was performed at a UV light energy of 13 J/cm².

In each of the thus-prepared Cells 2-G, 2-H and 2-I, the above-mentioned antiferroelectric liquid crystal material (CS-4000) was injected at its isotropic phase temperature, followed by gradual cooling to a temperature assuming chiral smectic phase, thus preparing chiral smectic liquid crystal devices (Devices 2-G, 2-H and 2-I), respectively.

When a process of formation of an alignment (orientation) state of liquid crystal molecules in the cooling step (from isotropic phase to chiral smectic phase) was observed with a polarizing microscope for the respective Devices, the formation of an alignment state through the generation and growth of batonnets from a temperature in the vicinity of the phase transition temperature to SmA phase as shown in FIGS. 3A–3C was observed with respect to the Device 2-I.

The liquid crystal devices (Devices 2-G to 2-I) were then subjected to evaluation of 1) uniformity in alignment (similarly as in Experimental Example 1) and 2) response voltage in the following manner.

1) Alignment Uniformity

The observation results are shown in Table 3 below.

TABLE 3

| Device No. | Alignment state** |
|---|---|
| 2-G | Uniform |
| 2-H | Partial focal conic |
| 2-I | Uniform |

**"Uniform" represents a uniform alignment state in the entire visible region. "Partial focal conic" represents a focal conic texture in a part of the entire visible region.

2) Response Voltage

Each liquid crystal device was sandwiched between a pair of polarizers arranged in cross nicols and was then supplied with a DC voltage (DC offset voltage) of 18 volts at 30° C. (where the liquid crystal molecules were in an antiferroelectric state). Thereafter, the device was supplied with a pulse of a single polarity having a pulse width of 100 psec while gradually increasing its voltage value to obtain a response voltage required to cause switching from the antiferroelectric state to a ferroelectric state. With respect to the Cell 2-H, the response voltage was measured only in a normal switching region.

The results are shown in Table 4.

TABLE 4

| Device No. | Response voltage (at 30° C.) |
|---|---|
| 2-G | 42 volts |
| 2-H | 40 volts |
| 2-I | 39 volts |

As apparent from the above results, in the liquid crystal device using the antiferroelectric liquid crystal material, an effective voltage value applied to the liquid crystal layer is increased with a decreasing thickness of the alignment control layer used. As a result, the Device 2-H or 2-I showed a lower applied voltage.

As described above, in the liquid crystal device using the antiferroelectric liquid crystal, a lowering in drive voltage, i.e., high-speed responsiveness based on an identical applied voltage was found to be realized by providing the substrate with a portion where the alignment control layer having a uniaxial alignment control force is disposed in a region other than the effective drive regions and also a portion having no alignment control layer in combination, thereby to obtain a uniform alignment characteristic through the formation of an alignment state from a liquid crystal region contacting the alignment control layer portion.

Experimental Example 3

In this experimental example, respective blank cells (of a simple matrix-type) were prepared in the following manner.

<Cell 3-B>

A pair of 1.1 mm-thick glass substrates was coated with a ca. 70 nm-thick ITO (indium tin oxide) film (as a transparent electrode) in a stripe shape (width (for each line)=16 μm, spacing (between adjacent lines)=4 μm).

One of the glass substrate was coated with an ethanol solution of a sol-gel silica binder containing ca. 100 Å-dia. Sb-doped SnOx ultra-fine particles (solid matter content=10 wt. %, particle/binder weight ratio=50/50) by spin coating, followed by pre-drying for 5 min. at 80° C. and hot drying for 1 hour at 200° C. to form a 200 nm-thick dispersed particle-containing silica (binder) layer.

The silica (binder) layer was coated by spin coating with a solution of a polyimide precursor (the same as in the Cell 1-A prepared in Experimental Example 1) and was pre-dried for 5 min. at 80° C., followed by hot curing for 1 hour at 200° C. to obtain a 5 nm-thick polyimide film.

Then, the polyimide film was subjected to rubbing treatment (uniaxial aligning treatment) in the same manner as in the case of the Cell 1-A.

On the other hand, the other glass substrate was coated with an ethanol solution of a sol-gel silica binder containing ca. 100 Å-dia. Sb-doped SnOx ultra-fine particles (solid matter content=10 wt. %, particle/binder weight ratio=50/50) by spin coating, followed by pre-drying for 5 min. at 80° C. and hold drying for 1 hour at 200° C. to obtain a 200 nm-thick dispersed particle-containing silica layer.

After silica beads (as a spacer) having an average diameter of 2.0 μm were dispersed on the substrate having thereon the polyimide film, the other substrate (having thereon the silica layer) was superposed on the above substrate so that the respective stripe-shaped ITO film patterns were arranged in an electrode matrix (as shown in FIG. 11) to prepare a blank cell.

<Cell 3-C>

A pair of 1.1 mm-thick glass substrates was coated with a ca. 70 nm-thick ITO (indium tin oxide) film (as a transparent electrode) in a stripe shape (width (for each line)=16 μm, spacing (between adjacent lines)=4 μm).

One of the glass substrate was coated with an ethanol solution of a sol-gel silica binder containing ca. 100 Å-dia. Sb-doped SnOx ultra-fine particles (solid matter content=10 wt. %, particle/binder weight ratio=30/70) by spin coating, followed by pre-drying for 5 min. at 80° C. and hot drying for 1 hour at 200° C. to form a 200 nm-thick dispersed particle-containing silica layer.

The silica layer was coated by spin coating with a solution of a polyimide precursor (the same as in the Cell 1-A prepared in Experimental Example 1) and was pre-dried for 5 min. at 80° C., followed by hot curing for 1 hour at 200° C. to obtain a 50 nm-thick polyimide film.

Then, the polyimide film was subjected to a UV ashing treatment in the same manner as in the Cell 1-C and then was subjected to rubbing treatment (uniaxial aligning treatment) in the same manner as in the case of the Cell 1-A.

On the other hand, the other glass substrate was coated with an ethanol solution of a sol-gel silica binder containing ca. 100 Å-dia. Sb-doped SnOx ultra-fine particles (solid matter content=10 wt. %, particle/binder weight ratio=30/70) by spin coating, followed by pre-drying for 5 min. at 80° C. and hold drying for 1 hour at 200° C. to obtain a 200 nm-thick dispersed particle-containing silica layer.

On the substrate provided with the polyimide film, silica beads having an average particle size of 2.0 μm (as a spacer) were dispersed and the other substrate provided with only the silica layer was superposed so that the respective ITO film patterns were arranged in an electrode matrix (as shown in FIG. 11), thus preparing a blank cell having a sectional structure as shown in FIG. 7.

<Cell 3-D>

A pair of 1.1 mm-thick glass substrates was coated with a ca. 70 nm-thick ITO (indium tin oxide) film (as a transparent electrode) in a stripe shape (width (for each line)=16 μm, spacing (between adjacent lines)=4 μm).

One of the glass substrate was coated with an ethanol solution of a sol-gel silica binder containing ca. 100 Å-dia. Sb-doped SnOx ultra-fine particles (solid matter content=10 wt. %, particle/binder weight ratio=50/50) by spin coating, followed by pre-drying for 5 min. at 80° C. and hot drying for 1 hour at 200° C. to form a 200 nm-thick dispersed particle-containing silica layer.

The silica layer was coated by spin coating with a solution of a polyimide precursor (the same as in the Cell 1-A prepared in Experimental Example 1) and was pre-dried for 5 min. at 80° C., followed by hot curing for 1 hour at 200° C. to obtain a 50 nm-thick polyimide film.

Then, the polyimide film was subjected to a UV ashing treatment in the same manner as in the Cell 1-C and then was subjected to rubbing treatment (uniaxial aligning treatment) in the same manner as in the case of the Cell 1-A.

On the other hand, the other glass substrate was coated with an ethanol solution of a ladder-type polysiloxane binder containing ca. 100 Å-dia. Sb-doped SnOx ultra-fine particles (solid matter content=10 wt. %, particle/binder weight ratio=50/50) by spin coating, followed by pre-drying for 5 min. at 80° C. and hold drying for 1 hour at 200° C. to obtain a 200 nm-thick dispersed particle-containing silica layer.

On the substrate provided with the polyimide film, silica beads having an average particle size of 2.0 μm (as a spacer) were dispersed and the other substrate provided with only the silica layer was superposed so that the respective ITO film patterns were arranged in an electrode matrix (as shown in FIG. 11), thus preparing a blank cell having a sectional structure as shown in FIG. 7.

<Cell 3-E>

A pair of 1.1 mm-thick glass substrates was coated with a ca. 70 nm-thick ITO (indium tin oxide) film (as a transparent electrode) in a stripe shape (width (for each line)=16 μm, spacing (between adjacent lines)=4 μm).

Each of the glass substrate was coated with an ethanol solution of a sol-gel silica binder containing ca. 100 Å-dia. Sb-doped SnOx ultra-fine particles (solid matter content=10 wt. %, particle/binder weight ratio=30/70) by spin coating, followed by pre-drying for 5 min. at 80° C. and hot drying for 1 hour at 200° C. to form a 200 nm-thick dispersed particle-containing silica layer.

Then, each of the silica layers was subjected to rubbing treatment (uniaxial aligning treatment) in the same manner as in the case of the Cell 1-A.

After silica beads (as a spacer having an average diameter of 2.0 μm were dispersed on one of the substrates, the other substrate was superposed on the above substrate so that the respective stripe-shaped ITO film patterns were arranged in an electrode matrix (as shown in FIG. 11) and the respective rubbing treatment axes on the substrates were in the same direction and in parallel with each other, thus preparing to prepare a blank cell.

<Cell 3-F>

A pair of 1.1 mm-thick glass substrates was coated with a ca. 70 nm-thick ITO (indium tin oxide) film (as a transparent electrode) in a stripe shape (width (for each line)=16 μm, spacing (between adjacent lines)=4 μm).

Each of the glass substrate was coated with an ethanol solution of a sol-gel silica binder containing ca. 100 Å-dia. Sb-doped SnOx ultra-fine particles (solid matter content=10 wt. %, particle/binder weight ratio=50/50) by spin coating followed by pre-drying for 5 min. at 80° C. and hot drying for 1 hour at 200° C. to form a 200 nm-thick dispersed particle-containing polysiloxane layer.

Then, each of the silica layers was subjected to rubbing treatment (uniaxial aligning treatment) in the same manner as in the case of the Cell 1-A.

After silica beads (as a spacer having an average diameter of 2.0 μm were dispersed on one of the substrates, the other substrate was superposed on the above substrate so that the respective stripe-shaped ITO film patterns were arranged in an electrode matrix (as shown in FIG. 11) and the respective rubbing treatment axes on the substrates were in the same direction and in parallel with each other, thus preparing to prepare a blank cell.

<Cell 3-G>

A blank cell having a sectional structure as shown in FIG. 9 was prepared in the following manner.

A pair of 1.1 mm-thick glass substrates each coated with a ca. 70 nm-thick stripe-shaped ITO film (width=16 μm, spacing=4 μm) was prepared.

Each of the glass substrates was coated with an ethanol solution of a sol-gel silica binder containing ca. 100 Å-ia. Sb-doped SnOx ultra-fine particles (solid matter content=10 wt. %, particle/binder weight ratio=30/70) by spin coating, followed by pre-drying for 5 min. at 80° C. and hot drying for 1 hour at 200° C. to form a 200 nm-thick dispersed particle-containing silica layer. The silica layer was coated with a solution of a polyimide precursor (the same as in the Cell 1-A) by spin coating, followed by pre-drying for 5 min. at 80° C. and hot drying for 1 hour at 200° C. to obtain a 50 nm-thick polyimide film.

The thus formed polyimide film were then subjected to UV (ultraviolet) ashing treatment, respectively, in the same manner as in the case of the Cell 1-C except that one of the mask patterns on one glass substrate was disposed so as a to mask a spacing between the stripe-shaped ITO film pattern, and the other mask-pattern on the other substrate was disposed perpendicular to the stripe-shaped ITO film pattern.

After the UV ashing treatment described above, each of the resultant polyimide film pattern was subjected to the rubbing treatment (uniaxial alignment treatment) in the same manner as in the case of the Cell 1-A so that a rubbing treatment direction was perpendicular to an extension direction of the stripe-shaped polyimide film.

On one of the substrates each provided with the polyimide film, silica beads having an average particle size of 2.0 μm (as a spacer) were dispersed and the other substrate was superposed so that the respective ITO film patterns were arranged in an electrode matrix (as shown in FIG. 11) and the respective polyimide film patterns were disposed opposite to each other while retaining their rubbing directions identical to each other, thus preparing a blank cell having a sectional structure as shown in FIG. 9.

<Cell 3-H>

A blank cell having a sectional structure as shown in FIG. 9 was prepared in the following manner.

A pair of 1.1 mm-thick glass substrates each coated with a ca. 70 nm-thick stripe-shaped ITO film (width=16 µm, spacing=4 µm) was prepared.

Each of the glass substrates was coated with an ethanol solution of a sol-gel silica binder containing ca. 100 Å-ia. Sb-doped SnOx ultra-fine particles (solid matter content=10 wt. %, particle/binder weight ratio=50/50) by spin coating, followed by pre-drying for 5 min. at 80° C. and hot drying for 1 hour at 200° C. to form a 200 nm-thick dispersed particle-containing silica layer. The silica layer was coated with absolution of a polyimide precursor (the same as in the Cell 1-A) by spin coating, followed by pre-drying for 5 min. at 80° C. and hot drying for 1 hour at 200° C. to obtain a 50.nm-thick polyimide film.

The thus formed polyimide film were then subjected to UV (ultraviolet) ashing treatment, respectively, in the same manner as in the case of the Cell 1-C except that one of the mask patterns on one glass substrate was disposed so as to mask a spacing between the stripe-shaped ITO film pattern, and the other mask-pattern on the other substrate was disposed perpendicular to the stripe-shaped ITO film pattern.

After the UV ashing treatment described above, each of the resultant polyimide film pattern was subjected to the rubbing treatment (uniaxial alignment treatment) in the same manner as in the case of the Cell 1-A so that a rubbing treatment direction was perpendicular to an extension direction of the stripe-shaped polyimide film.

On one of the substrates each provided with the polyimide film, silica beads having an average particle size of 2.0 µm (as a spacer) were dispersed and the other substrate was superposed so that the respective ITO film patterns were arranged in an electrode matrix (as shown in FIG. 11) and the respective polyimide film patterns were disposed opposite to each other while retaining their rubbing directions identical to each other, thus preparing a blank cell having a sectional structure as shown in FIG. 9.

Each of the thus-prepared blank cells (the Cells 3-B to 3-H) had a total thickness of the dispersed particle-containing silica (binder) layers of 400 nm in an effective drive region of the cell.

Each of the thus-prepared Cells 3-B to 3-H had a rectangular shape (2.5 cm×3.5 cm). In this regard, each of the Cells 3-C, 3-D and 3-H was designed to have a pair of parallel sides each having a length of 2.5 cm in an extension direction of the stripe-shaped ITO film pattern in parallel with the stripe-shaped polyimide film pattern.

With respect to the Cells 3-B to 3-H and the Cell 1-A (prepared in Experimental Example 1), the respective layer (contacting the liquid crystal layer in each effective drive region (each intersection of the matrix electrode structure) were subjected to measurement of surface roughness in terms of an average (arithmetic mean) surface roughness (Ra), a mean square surface roughness (Rms) and a degree of surface roughness (Rd) each as defined hereinabove in the following manner.

Each sample layer having a thickness of 1800 Å was formed on a glass substrate or an ITO film in the same manner as in the cases of the Cell 1-A and Cells 3-B to 3-H, respectively, and was subjected to measurement of the surface roughness by using an atomic force microscope ("Nano Scope IIIa AFM Dimension 3000 Unit", mfd. by Digital Instrument Co.) in combination with an Si cantilever (mfd. by Olympus Optical Co., Ltd.) as a probe under scanning conditions including: scanning area=3.0×3.0 µm, scanning rate=0.8 Hz, and at room temperature in atmospheric condition.

The results are shown in Table 5.

TABLE 5

| Layer surface | Ra (nm) | Rms (nm) | Rd (%) |
|---|---|---|---|
| PS*[1] | 0.48 | 0.64 | 0.178 |
| PS-SnOx(50)*[2] | 4.28 | 5.38 | 6.911 |
| PI/PS*[3] | 0.39 | 0.49 | 0.165 |
| PI/PS-SnOx(50)*[4] | 1.61 | 2.22 | 3.53 |
| PS-SnOx(30)*[5] | 2.57 | 3.30 | 5.514 |

*[1]The surface of the silica layer (Cell 1-A),
*[2]The surface of the dispersed particle-containing (50 wt. %) silica layer (Cells 3-D, 3-F and 3-H),
*[3]The surface of the polyimide film (5 nm) formed on the silica layer,
*[4]The surface of the polyimide film (5 nm) formed on the dispersed particle-containing (50 wt. %) silica layer, and
*[5]The (exposed) surface of the dispersed particle-containing (30 wt. %) silica layer (Cells 3-C, 3-E and 3-G).

In each of the Cells 1-A and 3-B to 3-H, the above-prepared liquid crystal composition LC-1 was injected at its isotropic phase temperature, followed by gradual cooling to a temperature assuming chiral smectic (SmC*) phase, thus preparing chiral smectic liquid crystal devices (Devices 1-A and 3-B to 3-H), respectively.

When a process of formation of an alignment (orientation) state of liquid crystal molecules in the cooling step (from isotropic phase to SmC* phase) was observed with a polarizing microscope (magnification=100) for the respective Devices 1-A and 3-B to 3-H, the formation of an alignment state through the generation and growth of batonnets from a temperature in the vicinity of the phase transition temperature to SmA phase as shown in FIGS. 3A–3C was observed with respect to the Devices 3-C, 3-D, 3-G and 3-H.

The liquid crystal devices (Devices 1-A, 3-B to 3-H) were then subjected to evaluation of 1) uniformity in alignment (similarly as in Experimental Example 1), 2) drive margin parameter M2 (M2 margin) (similarly as in Experimental Example 1) and 3) degree of M2 margin retention in the following manner.

1) Alignment Uniformity

The observation results are shown in Table 6 below.

TABLE 6

| Device No. | Alignment state** |
|---|---|
| 1-A | Uniform |
| 3-B | " |
| 3-D | " |
| 3-E | Random |
| 3-F | " |
| 3-G | Uniform |
| 3-H | " |

**"Uniform" represents a uniform alignment state in the entire visible region. "Random" represents a random alignment state in the entire visible region.

2) M2 Margin

The measurement of M2 margin was performed at 40° C., 25° C. and 10° C., respectively, for the Devices 1-A, 3-B, 3-C, 3-D, 3-G and 3-H since the drive margins were not measurable in the Devices 3-E and 3-F due to the random alignment state of the liquid crystal.

The results are shown in Table 7.

TABLE 7

| Device No. | Temperature (° C.) | | |
|---|---|---|---|
| | 40 | 25 | 10 |
| 1-A | 0.23 | 0.16 | 0.00 |
| 3-B | 0.23 | 0.17 | 0.00 |
| 3-C | 0.23 | 0.23 | 0.19 |
| 3-D | 0.25 | 0.23 | 0.21 |
| 3-G | 0.23 | 0.23 | 0.19 |
| 3-H | 0.25 | 0.23 | 0.21 |

As apparent from the above results, the Devices 1-A and 3-B provided relatively larger M2 margins at 40° C. and 25° C. (room temperature or above) but failed to provide substantially no M2 margin at 10° C. (low temperature side). This may be attributable to an influence of the reverse electric field as described hereinabove.

On the other hand, the Devices 3-C, 3-D, 3-G and 3-H had a large capacitance of the alignment control layer in an effective drive region between the oppositely disposed substrates due to the absence of the polyimide film, thus leading to a less decrease in M2 margin at low temperature to provide a small temperature-dependence of M2 margin compared with the Devices 1-A and 3-B.

As described above, a good drive margin characteristic was found to be realized by providing the substrate with a portion where the alignment control layer having a uniaxial alignment control force is disposed in a region other than the effective drive regions and also a portion having no alignment control layer in combination, thereby to obtain a uniform alignment characteristic through the formation of an alignment state from a liquid crystal region contacting the alignment control layer portion.

3) M2 Margin Retention Degree

The measurement of pulse widths for determining M2 margin was performed at 30° C. in the same manner as in the evaluation of M2 margin described above before and after continuously displaying an alternating black and white stripe pattern for 1000 hours, thus obtaining an M2 margin ($M2_0$) before the continuous display and an M2 margin ($M2_{1000}$) after the continuous display.

An M2 margin retention degree (M2 retention) was obtained from the following equation:

$$M2 \text{ retention } (\%) = (M2_{1000}/M2_0) \times 100.$$

The results are shown in Table 8.

TABLE 8

| Device No. | M2 retention (%) (at 30° C.) |
|---|---|
| 1-A | 10 |
| 3-B | 40 |
| 3-C | 70 |
| 3-D | 90 |
| 3-G | 70 |
| 3-H | 90 |

As apparent from the above results, the M2 margin retention degree was in reverse proportion to the thickness of the polyimide film used. Particularly, the Devices 3-C, 3-D, 3-G and 3-H having the effective drive region with no polyimide films provided higher M2 margins retention degrees (70% and 90%), thus being effective in a lowering or suppression of burning or after-images to prevent a deterioration in drive characteristics. Further, it was also found that the devices having a liquid crystal-contacting layer containing electrically conductive ultra-fine oxide particles in the effective drive regions provided higher M2 retention values due to the effect of minute surface unevenness resulting from the oxide particles. In this regard, the Device 3-B provided a higher M2 retention value than the Device 1-A since the Device 3-B had the liquid crystal-contacting layer with the minute surface unevenness although the Devices 3-B and 1-A had an identical thickness (5 nm) of the polyimide film.

Experimental Example 4

In this experimental example, respectively blank cells of a simple matrix-type were prepared in the following manner.

<Cell 4-B>

A pair of 1.1 mm-thick glass substrates was coated with a ca. 70 nm-thick ITO (indium tin oxide) film (as a transparent electrode) in a stripe shape (width (for each line)=16 μm, spacing (between adjacent lines)=4 μm).

One of the glass substrate was coated with an ethanol solution of a sol-gel silica binder by spin coating, followed by pre-drying for 5 min. at 80° C. and hot drying for 1 hour at 200° C. to form a 3 nm-thick silica layer.

The silica layer was coated by spin coating with a solution of a polyimide precursor ("LP-64", mfd. by Toray K.K.) in a mixture solvent of NMP (N-methylpyrrolidone)/nBC (n-butyl cellosolve) (1/2) and was pre-dried for 5 min. at 80° C., followed by hot curing for 1 hour at 300° C. to obtain a 5 nm-thick polyimide film.

Then, the polyimide film was subjected to rubbing treatment (uniaxial aligning treatment) in the same manner as in the case of the Cell 1-A.

On the other hand, the other glass substrate was coated with an ethanol solution of a sol-gel silica binder by spin coating, followed by pre-drying for 5 min. at 80° C. and hold drying for 1 hour at 200° C. to obtain a 3 nm-thick silica layer.

After silica beads (as a spacer) having an average diameter of 2.0 μm were dispersed on the substrate having thereon the polyimide film, the other substrate (having thereon the silica layer) was superposed on the above substrate so that the respective stripe-shaped ITO film patterns were arranged in an electrode matrix (as shown in FIG. 11) to prepare a blank cell.

The thus-prepared blank cell had an insulating film portion (the silica layer and the polyimide film) having a total thickness of 11 nm in an effective drive region (where the ITO electrodes intersected each other) of the cell.

<Cell 4-C>

A blank cell having a sectional structure as shown in FIG. 7 was prepared in the following manner.

A pair of 1.1 mm-thick glass substrates each coated with a ca. 70 nm-thick stripe-shaped ITO film (width=16 μm, spacing=4 μm) was prepared.

One of the glass substrates was coated with a solution of a sol-gel silica binder in ethanol by spin coating, followed by pre-drying for 5 min. at 80° C. and hot drying for 1 hour at 200° C. to form a 3 nm-thick silica layer. The silica layer was coated with a solution of a polyimide precursor (the same as in the Cell 1-A) by spin coating, followed by pre-drying for 5 min. at 80° C. and hot drying for 1 hour at 200° C. to obtain a 50 nm-thick polyimide film.

The polyimide film was then subjected to UV (ultraviolet) ashing treatment in the same manner as in the case of the Cell 1-C except for using a cross stripe-shaped mask pattern (width=4 μm, opening=16×16 μm) disposed so as to mask a spacing between the stripe-shaped ITO film pattern in one direction, thus obtaining a 50 nm-thick cross stripe-shaped polyimide film pattern (one side of which being corresponding to the spacing of the ITO film pattern) having a width of 4 μm and openings each of 16×16 μm (where the ITO film was not coated with the polyimide film).

After the UV ashing treatment described above, the resultant polyimide film pattern was subjected to the rubbing treatment (uniaxial alignment treatment) in the same manner as in the case of the Cell 1-A so that a rubbing treatment direction was perpendicular to an extension direction of the stripe-shaped polyimide film.

On the other hand, the other substrate was coated with an ethanol solution of a sol-gel silica binder by spin coating, followed by pre-drying for 5 min. at 80° C. and hot drying for 1 hour at 200° C. to form a 3 nm-thick silica layer.

On the substrate provided with the polyimide film, silica beads having an average particle size of 2.0 μm (as a spacer) were dispersed and the other substrate provided with the silica layer was superposed so that the respective ITO film patterns were arranged in an electrode matrix (as shown in FIG. 11), thus preparing a blank cell having a sectional structure as shown in FIG. 7.

The thus-prepared cell had an insulating film portion (silica layers) having a total thickness of 6 nm in effective drive regions of the cell.

<Cell 4-D>

A blank cell having a sectional structure as shown in FIG. 7 was prepared in the same manner as in the case of the Cell 4-C except that the solution of the polyimide precursor was changed to that ("LP-64") used in the Cell 4-B and the UV ashing treatment was performed at a UV light energy of 12 J/cm², which had an insulating film portion (the silica layers) having a total thickness of 6 nm in an effective drive regions of the cell.

<Cell 4-F>

A blank cell having a sectional structure as shown in FIG. 9 was prepared in the following manner.

A pair of 1.1 mm-thick glass substrates each coated with a ca. 70 nm-thick stripe-shaped ITO film (width=16 μm, spacing=4 μm) was prepared.

Each of the glass substrates was coated with a solution of a sol-gel silica binder in ethanol by spin coating, followed by pre-drying for 5 min. at 80° C. and hot drying for 1 hour at 290° C. to form a 3 nm-thick silica layer. The silica layer was coated with a solution of a polyimide precursor (the same as in the Cell 4-B) by spin coating, followed by pre-drying for 5 min. at 80° C. and hot baking for 1 hour at 300° C. to obtain a 50 nm-thick polyimide film.

The thus formed polyimide film were then subjected to UV (ultraviolet) ashing treatment, respectively, in the same manner as in the case of the Cell 1-C except that one of the mask patterns on one glass substrate was disposed so as to mask a spacing between the stripe-shaped ITO film pattern, and the other mask-pattern on the other substrate was disposed perpendicular to the stripe-shaped ITO film pattern.

Further, the UV ashing treatment was performed at a UV light energy of 12 J/cm².

After the UV ashing treatment described above, each of the resultant polyimide film pattern was subjected to the rubbing treatment (uniaxial alignment treatment) in the same manner as in the case of the Cell 1-A so that a rubbing treatment direction was perpendicular to an extension direction of the stripe-shaped polyimide film.

On one of the substrates each provided with the polyimide film, silica beads having an average particle size of 2.0 μm (as a spacer) were dispersed and the other substrate was superposed so that the respective ITO film patterns were arranged in an electrode matrix (as shown in FIG. 11) and the respective polyimide film patterns were disposed opposite to each other while retaining their rubbing directions identical to each other, thus preparing a blank cell having a sectional structure as shown in FIG. 9.

The thus-prepared cell had an insulating film portion (silica layers) having a total thickness of 6 nm in effective drive regions of the cell.

<Cell 4-G>

A blank cell having a sectional structure shown in FIG. 9 was prepared in the same manner as in the case of the Cell 4-F except that the polyimide film formed on one of the substrates was changed to that of the Cell 1-A (Experimental Example 1), and formed and treated in the same manner as in the case of the Cell 1-A.

The thus-prepared cell had an insulating film portion (silica layers) having a total thickness of 6 nm in effective drive regions of the cell.

Each of the thus-prepared Cells 4-B, 4-C, 4-D, 4-F and 4-G had a rectangular shape (2.5 cm×3.5 cm). In this regard, each of the Cells 4-C, 4-D, 4-F and 4-G was designed to have a pair of parallel sides each having a length of 2.5 cm in an extension direction of the stripe-shaped polyimide film pattern.

In each of the Cells 4-B, 4-C, 4-D, 4-F and 4-G and also the Cells 1-A and 1-F (prepared in Experimental Example 1), the liquid crystal composition LC-1 (prepared in Experimental Example 1) was injected at its isotropic phase temperature, followed by gradual cooling to a temperature assuming chiral smectic (SmC*) phase, thus preparing chiral smectic liquid crystal devices (Devices 4-B, 4-C, 4-D, 4-F, 4-G, 1-A and 1-F), respectively.

When a process of formation of an alignment (orientation) state of liquid crystal molecules in the cooling step (from isotropic phase to SmC* phase) was observed with a polarizing microscope (magnification=100) for the respective devices, the formation of an alignment state through the generation and growth of batonnets from a temperature in the vicinity of the phase transition temperature to SmA phase as shown in FIGS. 3A–3C was observed with respect to the Devices 4-C, 4-D, 4-F and 4-G.

With respect to the above-prepared liquid crystal devices, surface potentials of respective layers (of the polyimides and/or the silica) contacting the liquid crystal were measured by using a surface potentiometer ("Model 320B" of vibrating capacitor-type, mfd. by Treck Co.) according to the method described in JP-A 8-262447.

For measurement, sample films were prepared and optionally rubbing-treated as desired in the same manner as in the above cells, respectively. With respect to the thus-prepared sample films, a pre-treatment was performed for 15–120 min. at 80–100° C. under reduced pressure of $1.0 \times 10^{-1}$–$1.0 \times 10^{-3}$ torr.

The results of measurement of the surface potential are shown below.

Silica binder film (rubbed or not rubbed): –80 mV
Polyimide film of Cell 1-A: –100 mV
Polyimide film of Cell 4-B: –210 mV The liquid crystal devices (Devices 4-B to 4-D, 4-F, 4-G, 1-A and 1-F) were then subjected to evaluation of 1) uniformity in alignment (similarly as in Experimental Example 1), 2) initial alignment state, 3) drive margin parameter M2 (M2 margin) (similarly as in Experimental Example 1), and 4) contrast ratio (C/R) in the following manner.

1) Alignment Uniformity

As a result of the observation, all the liquid crystal devices except for the Device 1-F (random alignment) showed a uniform alignment state over the entire visible region.

2) Initial Alignment State

Each of the devices (Devices 1-A, 4-B to 4-D, 4-F and 4-G) were subjected to observation through a polarizing microscope immediately after a phase transition from SmA phase to SmC* phase (in the gradual cooling step). In this regard, a molecular position where liquid crystal molecules were inclined or tilted counterclockwise from a layer normal direction (rubbing direction) was referred to as a "first stable state (S1)" and a molecular position where liquid crystal molecules were inclined clockwise from a layer normal direction was referred to as a "second stable state (S2)". Further, in the Cells 1-C and 1-D, the substrate provided with the polyimide film was disposed on a viewer (upper) side.

The results are shown in Table 9 below.

TABLE 9

| Device No. | Initial alignment** |
|---|---|
| 1-A | S1/S2 (50/50) |
| 4-B | S1 (100) |
| 4-C | S1/S2 (50/50) |
| 4-D | S1 (100) + S1/S2 (50/50) |
| 4-F | S1/S2 (50/50) |
| 4-G | S1 (100) + S1/S2 (50/50) |

**"S1/S2 (50/50)" represents a state where an S1 state (50%) and an S2 state (50%) are observed in the entire visible region. "S1 (100)" represents an S1 state (100%) in the entire visible region. "S1 (100) + S1/S2 (50/50)" represents a state where the S1 (100) state is observed at the entire polyimide film portion and the S1/S2 (50/50) state is observed at a remaining portion (other than the polyimide portion) in the entire visible region.

3) M2 Margin

The results are shown in Table 10.

TABLE 10

| Device No. | Temperature (° C.) | | |
|---|---|---|---|
| | 40 | 25 | 10 |
| 1-A | 0.23 | 0.16 | 0.00 |
| 4-B | — | — | — |
| 4-C | 0.23 | 0.22 | 0.20 |
| 4-D | 0.22 | 0.22 | 0.19 |
| 4-F | 0.24 | 0.21 | 0.20 |
| 4-G | 0.23 | 0.21 | 0.20 |

In the above, the Device 4-B failed to provide a bistability over the entire visible region since the liquid crystal molecules were placed in a monostabilized state (where the liquid crystal molecules were stabilized only in one of the two stable state providing a dark state in cross nicols).

As apparent from the above results, the Device 1-A provided relatively larger M2 margins at 40° C. and 25° C. (room temperature or above) but failed to provide substantially no M2 margin at 10° C. (low temperature side). This may be attributable to an influence of the reverse electric field as described hereinabove.

On the other hand, the Devices 4-C, 4-D and 4-F and 4-G had a large capacitance of the alignment control layer in effective drive regions (effective switching regions) between the oppositely disposed substrates due to the absence of the polyimide film, thus leading to a less decrease in M2 margin at low temperature to provide a small temperature-dependence of M2 margin compared with the Device 1-A.

4) Contrast Ratio

Each liquid crystal device was sandwiched between a pair of polarizers arranged in cross nicols and was then supplied with a drive waveform shown in FIGS. 12 and 13 under conditions including Vop=20 volts, bias ratio=1/3.3 and duty ratio=1/1000.

For measurement of pulse widths for determining M2 margin, dark (black) and bright (white) states were written in, respectively, while varying a pulse width ($\Delta t$) of the applied pulse waveform, whereby a range of the pulse width allowing the writing of the bright and dark display states at the same time as shown in FIG. 15 between the threshold pulse width ($\Delta t_1$ for the bright state) and the crosstalk pulse width ($\Delta t_4$ for the dark state) was obtained.

At the threshold pulse width ($\Delta t_1$), measurement of the transmitted light intensity (transmittance) at the brightest state and the darkest state, respectively, was performed under a condition that the cell position relative to the polarizer was fixed to provide the darkest state in an effective drive region of the cell under no electric field application. For measurement, the measuring range was set to ca. 100 $\mu$m×ca. 100 $\mu$m including spacing between the stripe-shaped ITO electrodes.

The results are shown in Table 11.

TABLE 11

| Device No. | Contrast ratio (C/R) (at 30° C.) |
|---|---|
| 1-A | 20 |
| 4-B | —* |
| 4-C | 40 |
| 4-D | 120 |
| 4-F | 46 |
| 4-G | 110 |

*Not measurable due to the monostabilized state.

In the Devices 1-A, 4-C and 4-F, the liquid crystal composition (LC-1) substantially showed a bistability also in a portion (spacing) between the pixels (effective drive regions), thus resulting in a white domain (providing a white (bright) state) occupying a half of the entire visible region and a black domain (providing a black (dark) state) occupying a remaining half of the entire visible region. The white domain portion was also present at the spacing between the pixels and did not respond to an external electric field, thus causing light leakage thereat thereby to remarkably lower the contrast ratio (C/R).

On the other hand, at the pixel spacing portion each in the Devices 4-D and 4-G, a difference in surface potential between the two (upper and lower) substrates was large, thus resulting in a monostabilized (S1) state of liquid crystal molecules at the pixel spacing portion. The Devices 4-D and 4-G were arranged to provide a light-interrupting state to the S1 state in combination with the cross nicol polarizers, thus ensuring a high contrast ratio (C/S) with no leakage of light from the pixel spacing portion.

As described above, a good drive margin characteristic was found to be realized by providing the substrate with a portion where the alignment control layer having a uniaxial alignment control force is disposed in a region other than the effective drive regions and also a portion having no alignment control layer in combination, thereby to obtain a uniform alignment characteristic through the formation of an alignment state from a liquid crystal region contacting the alignment control layer portion. Further, by stabilizing the liquid crystal constantly in the dark state at the spacings between the pixels (effective drive region), a display contrast of the entire device was improved.

Experimental Example 5

Four blank cells were prepared in the following manner.

<Cell 5-H>

A blank cell having a matrix electrode structure and a sectional structure shown in FIG. 7 was prepared in the same manner as in the case of the Cell 4-C except that a cross stripe-shaped polyimide film pattern (width for each line)=5 μm, opening (for each rectangular portion)=45×45 μm) was formed on ca. 70 nm-thick stripe-shaped ITO film (electrode) pattern (width (for each line)=45 μm, spacing (between adjacent lines)=5 μm) so as to mask the spacing of the ITO film pattern in one extension direction of the cross stripes of the polyimide film pattern.

<Cell 5-I>

A blank cell having a matrix electrode structure and a sectional structure shown in FIG. 7 was prepared in the same manner as in the case of the Cell 1-D except that a cross stripe-shaped polyimide film pattern (width for each line)=5 μm, opening (for each rectangular portion)=45×45 μm) was formed on ca. 70 nm-thick stripe-shaped ITO film (electrode) pattern (width (for each line)=45 μm, spacing (between adjacent lines)=5 μm) so as to mask the spacing of the ITO film pattern in one extension direction of the cross stripes of the polyimide film pattern.

<Cell 5-J>

A blank cell having a matrix electrode structure and a sectional structure shown in FIG. 7 was prepared in the same manner as in the case of the Cell 5-H except that a cross stripe-shaped polyimide film pattern (width for each line)=5 μm, opening (for each rectangular portion)=20×20 μm) was formed on ca. 70 nm-thick stripe-shaped ITO film (electrode) pattern (width (for each line)=45 μm, spacing (between adjacent lines)=5 μm) so as to mask the spacing of the ITO film pattern every two lines in one extension direction of the cross stripes of the polyimide film pattern. The thus prepared cell was designed to have a part of the polyimide film pattern in the effective drive regions (i.e., pixel portion at each intersection of the matrix electrode).

<Cell 5-K>

A blank cell having a matrix electrode structure and a sectional structure shown in FIG. 7 was prepared in the same manner as in the case of the Cell 5-I except that a cross stripe-shaped polyimide film pattern (width for each line)=5 μm, opening (for each rectangular portion)=20×20 μm) was formed on ca. 70 nm-thick stripe-shaped ITO film (electrode) pattern (width (for each line)=45 μm, spacing (between adjacent lines)=5 μm) so as to mask the spacing of the ITO film pattern every two lines in one extension direction of the cross stripes of the polyimide film pattern. The thus prepared cell was designed to have a part of the polyimide film pattern in the effective drive regions (i.e., pixel portion at each intersection of the matrix electrode).

In each of the thus-prepared Cells 5-H to 5-K, the above-prepared liquid crystal composition LC-1 (prepared in Experimental Example 1) was injected at its isotropic phase temperature, followed by gradual cooling to a temperature assuming chiral smectic (SmC*) phase, thus preparing chiral smectic liquid crystal devices (Devices 5-H to 5-K), respectively.

When a process of formation of an alignment (orientation) state of liquid crystal molecules in the cooling step (from isotropic phase to SmC* phase) was observed with a polarizing microscope (magnification=100) for the respective Devices 5-H to 5-K, the formation of an alignment state through the generation and growth of batonnets from a temperature in the vicinity of the phase transition temperature to SmA phase as shown in FIGS. 3A–3C was observed with respect to all the Devices 5-H to 5-K.

The liquid crystal devices (Devices 5-H to 5-K) were then subjected to evaluation of 1) uniformity in alignment (similarly as in Experimental Example 1) and 2) contrast ratio (C/R) (similarly as in Experimental Example 4) in the following manner.

1) Alignment Uniformity

The observation results are shown in Table 12 below.

TABLE 12

| Device No. | Alignment state** |
|---|---|
| 5-H | Partial focal conic |
| 5-I | " |
| 5-J | Uniform |
| 5-K | " |

**"Uniform" represents a uniform alignment state in the entire visible region. "Partial focal conic" represents a focal conic texture in a central portion for each pixel (each intersection of the matrix electrode structure).

The Devices 5-H and 5-I had a relative large distance between adjacent polyimide lines, thus leading to a relatively large area providing substantially no uniaxial alignment control force. As a result, a disordered alignment portion occurred at a central portion of each pixel being apart from the polyimide film pattern.

2) Contrast Ratio (C/R)

The measurement results for the Devices 5-J and 5-K are shown in Table 13.

TABLE 13

| Device No. | Contrast ratio (C/R) (at 30° C.) |
|---|---|
| 5-J | 45 |
| 5-K | 115 |

Compared with the Device 5-J, at the pixel spacing portion in the Device 5-K, a difference in surface potential between the two (upper and lower) substrates was large, thus resulting in a monostabilized (S1) state of liquid crystal molecules at the pixel spacing portion. The Device 5-K was arranged to provide a light-interrupting state to the S1 state in combination with the cross nicol polarizers, thus ensuring a high contrast ratio (C/S) with no leakage of light from the pixel spacing portion.

Experimental Example 5

Two blank cells (of a simple matrix-type) were prepared in the following manner.

<Cell 6-C>

A blank cell having a sectional structure as roughly shown in FIG. 17 was prepared in the following manner.

A pair of 1.1 mm-thick glass substrates each coated with a ca. 70 nm-thick stripe-shaped ITO film (width=16 μm, spacing=4 μm) was prepared.

One of the glass substrates was coated with a solution of a sol-gel silica binder in ethanol by spin coating, followed by pre-drying for 5 min. at 80° C. and hot drying for 1 hour at 200° C. to form a 3 nm-thick silica layer. The silica layer was coated with a solution of a polyimide precursor (the same as in the Cell 1-A) by spin coating, followed by pre-drying for 5 min. at 80° C. and hot drying for 1 hour at 200° C. to obtain a 50 nm-thick polyimide film.

The polyimide film was then subjected to UV ashing treatment.

More specifically, the polyimide film was coated with a ca. 2 µm-thick positive-type resist ("OFPR-800", mfd. by Tokyo Ohka K.K.) by spin coating. Thereafter, the polyimide film was pre-dried for 30 min. at 80° C. and was exposed to a UV light (λ=365 nm) for 16 sec. while using a stripe-shaped mask pattern (width=4 µm, spacing=16 µm) disposed so as to mask a spacing between the stripe-shaped ITO film pattern. The resultant polyimide film was developed with an organic developer ("MFCD-26", mfd. by Zyplay Co.) and was washed with flowing water for 3 min., followed by drying for 10 min. at 100° C. to obtain a resist pattern corresponding to the spacing between the ITO film pattern. The thus-treated polyimide film was subjected to a UV ashing with a low-temperature mercury lamp under conditions including a substrate temperature of 60° C. and a UV light energy (λ=254 nm) of 6 J/cm$^2$, thus effecting a partial removal of the polyimide film not masked with the resist pattern. After the resist pattern wa removed with a remover ("Resist Strip N-320", mfd. by Nagase Sangyo K.K.), the resultant substrate was washed with flowing water and was then dried to obtain a 50 nm-thick stripe-shaped polyimide film pattern (corresponding to the spacing of the ITO film pattern) having a width of 4 µm (e.g., at the layer portion 15a shown in FIG. 17) and a spacing of 16 µm (where the ITO film was partially coated with a 2 nm-thick polyimide film) (e.g., at the layer portion 17a shown in FIG. 17).

After the UV ashing treatment described above, the resultant polyimide film pattern was subjected to the rubbing treatment (uniaxial alignment treatment) in the same manner as in the case of the Cell 1-A so that a rubbing treatment direction was perpendicular to an extension direction of the stripe-shaped polyimide film.

On the other hand, the other substrate was coated with an ethanol solution of a sol-gel silica binder by spin coating, followed by pre-drying for 5 min. at 80° C. and hot drying for 1 hour at 200° C. to form a 3 nm-thick silica layer.

On the substrate provided with the polyimide film, silica beads having an average particle size of 2.0 µm (as a spacer) were dispersed and the other substrate provided with the silica layer was superposed so that the respective ITO film patterns were arranged in an electrode matrix (as shown in FIG. 11), thus preparing a blank cell having a sectional structure as shown in FIG. 17.

The thus-prepared cell had an insulating film portion (silica layers) having a total thickness of 8 nm in an effective drive regions of the cell.

<Cell 6-D>

A blank cell having a sectional structure as roughly shown in FIG. 18 was prepared in the same manner as in the case of the Cell 1-C (Experimental Example 1) except that, between the UV ashing treatment and the rubbing treatment, a 2 nm-thick polyimide film was formed over the entire surface of the substrate in the same manner as in the case of the Cell 1-A, whereby the resultant cell had an insulating film portion (the polyimide and silica layers) having a total thickness of 8 nm in effective drive regions of the cell. More specifically, the substrate provided with the two polyimide (layers had a 52 nm-thick stripe-shaped polyimide film pattern (corresponding to the spacing of the ITO film pattern) having a width of 4 µm (e.g., in the region R1 shown in FIG. 18) and a spacing of 16 µm (where the ITO film was partially coated with a 2 nm-thick polyimide film) (e.g., at the layer portion 19a shown in FIG. 18).

Each of the thus-prepared Cells 6-C and 6-D had a rectangular shape (2.5 cm×3.5 cm). In this regard, each of the Cells 6-C and 6-D was designed to have a pair of parallel sides each having a length of 2.5 cm in an extension direction of the stripe-shaped ITO film pattern in parallel with the stripe-shaped polyimide film pattern.

In each of the Cells 6-C and 6-D and also the Cells 1-A and 1-B, the above-prepared liquid crystal composition LC-1 was injected at its isotropic phase temperature, followed by gradual cooling to a temperature assuming chiral smectic (SmC*) phase, thus preparing chiral smectic liquid crystal devices (Devices 6-C, 6-D 1-A and 1-B), respectively.

When a process of formation of an alignment (orientation) state of liquid crystal molecules in the cooling step (from isotropic phase to SmC* phase) was observed with a polarizing microscope for the respective devices, the formation of an alignment state through the generation and growth of batonnets from a temperature in the vicinity of the phase transition temperature to SmA phase as shown in FIGS. 3A–3C was observed with respect to the Devices 6-C and 6-D.

The liquid crystal composition (LC-1) used in this experimental example showed the following properties at 40° C., 25° C. and 10° C. (shown in Table 14).

TABLE 14

| Property | at 40° C. | at 25° C. | at 10° C. |
|---|---|---|---|
| Ps (C/m$^2$) | 1.1 × 10$^{-4}$ | 3.6 × 10$^{-4}$ | 4.6 × 10$^{-4}$ |
| Vth$_1$ (volt) | 1.0 × 10$^{-1}$ | 2.4 × 10$^{-1}$ | 2.0 × 10$^{-1}$ |
| Vth$_2$ (volt) | 2.0 × 10$^{-1}$ | 4.0 × 10$^{-1}$ | 6.0 × 10$^{-1}$ |
| d$_1$ (nm) | 13.2 | 9.7 | 6.3 |
| d$_2$ (nm) | 26.5 | 16.2 | 19.0 |

In the above, "Vth$_1$" represents a threshold voltage for causing a partial inversion in one frame and "Vth$_2$" represents a threshold voltage for causing a whole inversion in one frame when measured in a manner described below.

Further, "d1" and "d2" correspond to a total thickness of insulating films provided to a pair of substrates of a sample cell prepared in a manner shown below when "Vth$_1$" and "Vth$_2$" are employed, respectively.

Specifically, the Vth$_1$ and Vth$_2$ were based on values measured in a sample cell including the liquid crystal composition (LC-1) disposed between a pair of substrates each provided with an ITO film of an insulating film and having a cell thickness of 2 µm. The liquid crystal composition was aligned according to the temperature gradient method.

The thickness d$_1$ and d$_2$ were obtained according to the following equations, respectively:

$$d_1 = Vth_1 \times \epsilon / 2Ps,$$

$$d_2 = Vth_2 \times \epsilon / 2Ps,$$

wherein ε denoted a dielectric constant and was obtained by 3.3 (relative dielectric constant)×8.85×10$^{-12}$ (electric constant) in this instance.

For measurement, respective pulse widths were determined in the following manner.

When a temperature-dependence characteristic of the threshold pulse width at a drive voltage of 2 volts (used for measuring M2 margin in this experimental example), the following results were obtained.

| Temperature (° C.) | Threshold pulse width (μsec) |
|---|---|
| 40 | 6.1 |
| 25 | 27 |
| 10 | 100 |

Since the M2 margin measurement employed a waveform (for simple matrix drive) applied at a duty ratio of 1/1000, the value $Vth_1$ and $Vth_2$ were measured by using a rectangular waveform having pulse widths each 1000 times the above threshold pulse widths, respectively.

As apparent from Table 14, it is possible to prevent switching failure due to a reverse voltage at the time of effecting switching of the liquid crystal having a spontaneous polarization if a total thickness of the insulating film portion (for the pair of substrates) in the effective drive regions is below about 9.5 nm at room temperature (25° C.) (referring to the $d_1$ value in Table 14) for the Devices 6-C and 6-D. Both the Devices 6-C and 6-D have a total thickness of 8 nm, thus satisfying a suitable condition for preventing the switching failure, as described hereinabove with reference to FIG. 17 in the second embodiment.

On the other hand, both the Devices 6-C and 6-D has a total thickness of an insulating film portion (the stripe-shaped polyimide films provided to the pair of substrates) much above about 16.5 nm at 25° C. (referring to the $d_2$ value in Table 14) in a region where the stripe-shaped polyimide patterns are formed, thus also being suitable for preventing the switching failure.

The liquid crystal devices (Devices 1-A, 1-B, 6-C and 6-D) were then subjected to evaluation of 1) uniformity in alignment (similarly as in Experimental Example 1), 2) change in ion density with time, and 3) drive margin parameter M2 (similarly as in Experimental Example 1) in the following manner.

1) Alignment Uniformity

The observation results are shown in Table 15 below.

TABLE 15

| Device No. | Alignment state** |
|---|---|
| 1-A | Uniform |
| 1-B | Half focal conic |
| 6-C | Uniform |
| 6-D | " |

**"Uniform" represents a uniform alignment state in the entire visible region. "Half focal conic" represents a focal conic texture in a half of the entire visible region.

2) Ion density Charge With Time

An ion density within each of the Devices 1-A, 1-B, 6-C and 6-D was measured at room temperature at an initial stage (immediately after the liquid crystal injection step) and after the device was left standing for 30 days at room temperature (from the liquid crystal injection step) by using an ion density-measuring system ("MTR-1", mfd. by Toyo Technica K.K.).

As a result, all the devices showed an ion density of 2.0 ($nC/cm^2$) at the initial stage and also after 30 days, thus causing no ion density change with time.

For comparison, a comparative device including the liquid crystal composition LC-1 disposed between a pair of glass substrates each provided with an ITO film but not provided with any insulating film was prepared in the same manner as in this experimental example. In this comparative device, the substrate surface and the ITO film surface were exposed and contacted the liquid crystal composition.

As a result, the comparative device showed an ion density of 2.0 ($nC/cm^2$) at the initial stage and an ion density of 10.0 ($nC/cm^2$), thus showing a remarkable increase in ion density with time (after 30 days).

This may be attributable to a migration of impurities from the ITO films and/or the glass substrates.

As described above, it has been found that the coating of the entire surface of the substrate with at least an insulating layer was effective in suppressing an increase in ion density with time in the cell due to the ion migration from the substrate surface.

3) M2 Margin

The measurement of M2 margin was performed with respect to the Device 1-B only in a region providing a good alignment state (allowing a normal switching operation).

The results are shown in Table 16.

TABLE 16

| | Temperature (° C.) | | |
|---|---|---|---|
| Device No. | 40 | 25 | 10 |
| 1-A | 0.23 | 0.16 | 0.00 |
| 1-B | 0.15 | 0.14 | 0.10 |
| 6-C | 0.23 | 0.21 | 0.15 |
| 6-D | 0.23 | 0.21 | 0.15 |

As apparent from the above results, the Device 1-A provided relatively larger M2 margins at 40° C. and 25° C. (room temperature or above) but failed to provide substantially no M2 margin at 10° C. (low temperature side). This may be attributable to an influence of the reverse electric field as described hereinabove. The Device 1-B showing an inferior alignment characteristic had a relatively large capacitance (electric capacity) of the alignment control layer (polyimide film) due to a thinner alignment control layer compared with the Device 1-A although it provided relatively low M2 margins at measuring temperatures, thus resulting in a relatively small degree of a decrease in M2 margin at low temperature (10° C.).

On the other hand, the Devices 6-C and 6-D had a large capacitance of the alignment control layer in effective drive regions (effective switching regions) between the oppositely disposed substrates due to the thin polyimide film in the effective drive region effective in decrease the influence of the reverse electric field, thus leading to a less decrease in M2 margin at low temperature to provide a small temperature-dependence of M2 margin compared with the Devices 1-A and 1-B.

As described above, a uniform alignment characteristic and a good drive margin characteristic were found to be realized in combination by providing the substrate with a film portion where the alignment control layer having a relatively large uniaxial alignment control force is disposed in a region other than the effective drive regions and also a thin film portion having a relatively small uniaxial alignment control force in combination, thereby to minimize the adverse affect of the reverse electric field.

Experimental Example 7

Two blank cell (of a simple matrix-type) were prepared in the following manner.

<Cell 7-D>

A blank cell having a sectional structure as roughly shown in FIG. 17 was prepared in the same manner as in the case of the Cell 6-C (prepared in Experimental Example 6) except that each of the glass substrates each provided with a stripe-shaped ITO film was coated with an ethanol solution of a sol-gel silica binder containing ca. 100 Å-dia. Sb-doped SnOx ultrafine particles (solid matter content=10 wt. %, particle/binder weight ratio=50/50) by spin coating, followed by pre-drying for 5 min. at 80° C. and hot drying for 1 hour at 200° C. to form a 200 nm-thick dispersed particle-containing silica (binder) layer.

The thus-prepared Cell 7-D had a rectangular shape (2.5 cm×3.5 cm) and was designed to have a pair of parallel sides each having a length of 2.5 cm in an extension direction of the stripe-shaped ITO film pattern in parallel with the stripe-shaped polyimide film pattern 1.

With respect to the Cell 7-D, the respective layer (contacting the liquid crystal layer in each effective drive region (each intersection of the matrix electrode structure) were subjected to measurement of surface roughness in terms of an average (arithmetic mean) surface roughness (Ra), a mean square surface roughness (Rms) and a degree of surface roughness (Rd) in the same manner as in Experimental Example 3.

The results are shown below.

| Layer surface | Ra (nm) | Rms (nm) | Rd (%) |
|---|---|---|---|
| PS-SnOx(50)*[1] | 4.28 | 5.38 | 6.911 |
| PI/PS-SnOx(50)*[2] | 3.53 | 4.21 | 5.32 |

*[1]The exposed surface of the dispersed particle-containing (50 wt. %) silica layer, and
*[2]The surface of the polyimide film (2 nm) formed on the dispersed particle-containing (50 wt. %) silica in the effective drive region.

In each of the Cells 7-D and also the Cells 1-A and 1-B (Experimental Example 1) and the Cell 6-C, the above-prepared liquid crystal composition LC-1 was injected at its isotropic phase temperature, followed by gradual cooling to a temperature assuming chiral smectic (SmC*) phase, thus preparing chiral smectic liquid crystal devices (Devices 1-A, 1-B, 6-C and 7-D), respectively.

When a process of formation of an alignment (orientation) state of liquid crystal molecules in the cooling step (from isotropic phase to SmC* phase) was observed with a polarizing microscope for the respective device, the formation of an alignment state through the generation and growth of batonnets from a temperature in the vicinity of the phase transition temperature to SmA phase as shown in FIGS. 3A–3C was observed with respect to the Devices 6-C and 7-D.

The liquid crystal devices (Devices 1-A, 1-B, 6-C and 7-D) were then subjected to evaluation of 1) uniformity in alignment (similarly as in Experimental Example 1), 2) drive margin parameter M2 (M2 margin) (similarly as in Experimental Example 1) and 3) degree of M2 margin retention (similar as in Experimental Example 3) in the following manner.

1) Alignment Uniformity

The observation results are shown in Table 17 below.

TABLE 17

| Device No. | Alignment state** |
|---|---|
| 1-A | Uniform |
| 1-B | Half focal conic |

TABLE 17-continued

| Device No. | Alignment state** |
|---|---|
| 6-C | Uniform |
| 7-D | " |

**"Uniform" represents a uniform alignment state in the entire visible region. "Half focal conic" represents a focal conic texture in a half of the entire visible region.

2) M2 Margin

The measurement of M2 margin was performed at 40° C., 25° C. and 10° C., respectively, for the Devices 1-A, 1-B, 6-C and 7-D.

The measurement of M2 margin was performed with respect to the Device 1-B only in a region providing a good alignment state (allowing a normal switching operation).

The results are shown in Table 18.

TABLE 18

| | Temperature (° C.) | | |
|---|---|---|---|
| Device No. | 40 | 25 | 10 |
| 1-A | 0.23 | 0.16 | 0.00 |
| 1-B | 0.15 | 0.14 | 0.10 |
| 6-C | 0.23 | 0.21 | 0.15 |
| 7-D | 0.23 | 0.21 | 0.15 |

As apparent from the above results, the Device 1-A provided relatively larger M2 margins at 40° C. and 25° C. (room temperature or above) but failed to provide substantially no M2 margin at 10° C. (low temperature side). This may be attributable to an influence of the reverse electric field as described hereinabove. The Device 1-B showing an inferior alignment characteristic had a relatively large capacitance (electric capacity) of the alignment control layer (polyimide film) due to a thinner alignment control layer compared with the Device 1-A although it provided relatively low M2 margins at measuring temperatures, thus resulting in a relatively small degree of a decrease in M2 margin at low temperature (10° C.).

On the other hand, the Devices 6-C and 6-D had a large capacitance of the alignment control layer in effective drive regions (effective switching regions) between the oppositely disposed substrates due to the thin polyimide film in the effective drive regions effective in decrease the influence of the reverse electric field, thus leading to a less decrease in M2 margin at low temperature to provide a small temperature-dependence of M2 margin compared with the Devices 1-A and 1-B.

3) M2 Margin Retention Degree

The results are shown in Table 19.

TABLE 19

| Device No. | M2 retention (%) (at 30° C.) |
|---|---|
| 1-A | 10 |
| 1-B | 40 |
| 6-C | 40 |
| 7-D | 70 |

As apparent from the above results, the M2 margin retention degree was increased with a decreasing thickness of the polyimide film used. Further, it was also found that the device (Device 7-D) having a liquid crystal-contacting layer containing electrically conductive ultra-fine oxide particles in the effective drive regions provided higher M2 retention values due to the effect of minute surface unevenness resulting from the oxide particles.

As described above, a uniform alignment characteristic and a good drive margin characteristic were found to be realized in combination by providing the substrate with a film portion where the alignment control layer having a relatively large uniaxial alignment control force is disposed in a region other than the effective drive regions and also a thin film portion having a relatively small uniaxial alignment control force in combination, thereby to minimize the adverse affect of the reverse electric field.

Experimental Example 8

Three blank cells (of a simple matrix-type) were prepared in the following manner.

<Cell 8-D>

A blank cell was prepared in the same manner as in the case of the Cell 4-B (prepared in Experimental Example) except that the thickness of the polyimide film (pattern) was changed to 2 nm, which had an insulating film portion (the silica and polyimide layers) having a total thickness of 8 nm in effective drive regions of the cell.

<Cell 8-F>

A blank cell having a sectional structure as roughly shown in FIG. 17 was prepared in the following manner.

A pair of 1.1 mm-thick glass substrates each coated with a ca. 70 nm-thick stripe-shaped ITO film (width=16 $\mu$m, spacing=4 $\mu$m) was prepared.

One of the glass substrates was coated with a solution of a sol-gel silica binder in ethanol by spin coating, followed by pre-drying for 5 min. at 80° C. and hot drying for 1 hour at 200° C. to form a 3 nm-thick silica layer. The silica layer was coated with a solution of a polyimide precursor (the same as in the Cell 4-B) by spin coating, followed by pre-drying for 5 min. at 80° C. and hot drying for 1 hour at 200° C. to obtain a 50 nm-thick polyimide film.

The polyimide film was then subjected to UV ashing treatment.

More specifically, the polyimide film was coated with a ca. 2 $\mu$m-thick positive-type resist ("OFPR-800", mfd. by Tokyo Ohka K.K.) by spin coating. Thereafter, the polyimide film was pre-dried for 30 min. at 80° C. and was exposed to a UV light ($\lambda$=365 nm) for 16 sec. while using a stripe-shaped mask pattern (width=4 $\mu$m, spacing=16 $\mu$m) disposed so as to mask a spacing between the stripe-shaped ITO film pattern. The resultant polyimide film was developed with an organic developer ("MFCD-26", mfd. by Zyplay Co.) and was washed with flowing water for 3 min., followed by drying for 10 min. at 100° C. to obtain a resist pattern corresponding to the spacing between the ITO film pattern. The thus-treated polyimide film was subjected to a UV ashing with a low-pressure mercury lamp under conditions including a substrate temperature of 60° C. and a UV light energy ($\lambda$=254 nm) of 8 J/cm$^2$, thus effecting a partial removal of the polyimide film not masked with the resist pattern. After the resist pattern wa removed with a remover ("Resist Strip N-320", mfd. by Nagase Sangyo K.K.), the resultant substrate was washed with flowing water and was then dried to obtain a 50 nm-thick stripe-shaped polyimide film pattern (corresponding to the spacing of the ITO film pattern) having a width of 4 $\mu$m (e.g., at the layer portion 15$a$ shown in FIG. 17) and a spacing of 16 $\mu$m (where the ITO film was partially coated with a 2 nm-thick polyimide film) (e.g., at the layer portion 17$a$ shown in FIG. 17).

After the UV ashing treatment described above, the resultant polyimide film pattern was subjected to the rubbing treatment (uniaxial alignment treatment) in the same manner as in the case of the Cell 1-A so that a rubbing treatment direction was perpendicular to an extension direction of the stripe-shaped polyimide film.

On the other hand, the other substrate was coated with an ethanol solution of a sol-gel silica binder by spin coating, followed by pre-drying for 5 min. at 80° C. and hot drying for 1 hour at 200° C. to form a 3 nm-thick silica layer.

On the substrate provided with the polyimide film, silica beads having an average particle size of 2.0 $\mu$m (as a spacer) were dispersed and the other substrate provided with the silica layer was superposed so that the respective ITO film patterns were arranged in an electrode matrix (as shown in FIG. 11), thus preparing a blank cell having a sectional structure as shown in FIG. 17.

The thus-prepared cell had an insulating film portion (polysiloxane layers) having a total thickness of 8 nm in an effective drive regions of the cell.

<Cell 8-G>

A blank cell was prepared in the following manner.

A pair of 1.1 mm-thick glass substrates each coated with a ca. 70 nm-thick stripe-shaped ITO film (width=16 $\mu$m, spacing=4 $\mu$m) was prepared.

One of the glass substrates was coated with a solution of a sol-gel silica binder in ethanol by spin coating, followed by pre-drying for 5 min. at 80° C. and hot drying for 1 hour at 200° C. to form a 3 nm-thick silica layer. The silica layer was coated with a solution of a polyimide precursor (the same as in the Cell 4-B) by spin coating, followed by pre-drying for 5 min. at 80° C. and hot drying for 1 hour at 200° C. to obtain a 50 nm-thick polyimide film.

The polyimide film was then subjected to UV ashing treatment.

More specifically, the polyimide film was coated with a ca. 2 $\mu$m-thick positive-type resist ("OFPR-800", mfd. by Tokyo Ohka K.K.) by spin coating. Thereafter, the polyimide film was pre-dried for 30 min. at 80° C. and was exposed to a UV light ($\lambda$=365 nm) for 16 sec. while using a stripe-shaped mask pattern (width=4 $\mu$m, spacing=16 $\mu$m) disposed so as to mask a spacing between the stripe-shaped ITO film pattern. The resultant polyimide film was developed with an organic developer ("MFCD-26", mfd. by Zyplay Co.) and was washed with flowing water for 3 min., followed by drying for 10 min. at 100° C. to obtain a resist pattern corresponding to the spacing between the ITO film pattern. The thus-treated polyimide film was subjected to a UV ashing with a low-pressure mercury lamp under conditions including a substrate temperature of 60° C. and a UV light energy ($\lambda$=254 nm) of 12 J/cm$^2$, thus effecting a partial removal of the polyimide film not masked with the resist pattern. After the resist pattern wa removed with a remover ("Resist Strip N-320", mfd. by Nagase Sangyo K.K.), the resultant substrate was washed with flowing water and was then dried to obtain a 50 nm-thick stripe-shaped polyimide film pattern (corresponding to the spacing of the ITO film pattern) having a width of 4 $\mu$m and a spacing of 16 $\mu$m (where the ITO film was not coated with the polyimide film).

After the UV ashing treatment described above, the resultant polyimide film pattern was subjected to the rubbing treatment (uniaxial alignment treatment) in the same manner as in the case of the Cell 1-A so that a rubbing treatment direction was perpendicular to an extension direction of the stripe-shaped polyimide film.

On the other hand, the other substrate was coated with an ethanol solution of a sol-gel silica binder by spin coating, followed by pre-drying for 5 min. at 80° C. and hot drying for 1 hour at 200° C. to form a 3 nm-thick silica layer.

The silica layer was coated with a solution of a polyimide precursor (the same as in the Cell 1-A) by spin coating, followed by pre-drying for 5 min. at 80° C. and hot drying for 1 hour at 300° C. to obtain a 50 nm-thick polyimide film.

The polyimide film was then subjected to UV ashing treatment.

More specifically, the polyimide film was coated with a ca. 2 μm-thick positive-type resist ("OFPR-800", mfd. by Tokyo Ohka K.K.) by spin coating. Thereafter, the polyimide film was pre-dried for 30 min. at 80° C. and was exposed to a UV light ($\lambda$=365 nm) for 16 sec. while using a stripe-shaped mask pattern (width=4 μm, spacing=16 μm) disposed so as to mask a spacing between the stripe-shaped ITO film pattern. The resultant polyimide film was developed with an organic developer ("MFCD-26", mfd. by Zyplay Co.) and was washed with flowing water for 3 min., followed by drying for 10 min. at 100° C. to obtain a resist pattern corresponding to the spacing between the ITO film pattern. The thus-treated polyimide film was subjected to a UV ashing with a low-pressure mercury lamp under conditions including a substrate temperature of 60° C. and a UV light energy ($\lambda$=254 nm) of 6 J/cm$^2$, thus effecting a partial removal of the polyimide film not masked with the resist pattern. After the resist pattern wa removed with a remover ("Resist Strip N-320", mfd. by Nagase Sangyo K.K.), the resultant substrate was washed with flowing water and was then dried to obtain a 50 nm-thick stripe-shaped polyimide film pattern (corresponding to the spacing of the ITO film pattern) having a width of 4 μm (e.g., at the layer portion 15a shown in FIG. 17) and a spacing of 16 μm (where the ITO film was partially coated with a 2 nm-thick polyimide film) (e.g., at the layer portion 17a shown in FIG. 17).

After the UV ashing treatment described above, the resultant polyimide film pattern was subjected to the rubbing treatment (uniaxial alignment treatment) in the same manner as in the case of the Cell 1-A so that a rubbing treatment direction was in parallel with an extension direction of the stripe-shaped polyimide film.

On one of the substrate, silica beads having an average particle size of 2.0 μm (as a spacer) were dispersed and the other substrate was superposed so that the respective ITO film patterns were arranged in an electrode matrix (as shown in FIG. 11), thus preparing a blank cell having a sectional structure as shown in FIG. 9, wherein one of the substrates had a sectional structure corresponding to that of the lower substrate shown in FIG. 17.

The thus-prepared cell had an insulating film portion (silica layers) having a total thickness of 8 nm in an effective drive region of the cell.

Each of the thus-prepared Cells 8-D, 8-F and 8-G had a rectangular shape (2.5 cm×3.5 cm). In this regard, the Cell 8-F was designed to have a pair of parallel sides each having a length of 2.5 cm in an extension direction of the stripe-shaped polyimide film pattern.

In each of the Cells 8-D, 8-F and 8-G and also the Cells 1-A, 1-B, 4-B and 6-C, the liquid crystal composition LC-1 (prepared in Experimental Example 1) was injected at its isotropic phase temperature, followed by gradual cooling to a temperature assuming chiral smectic (SmC*) phase, thus preparing chiral smectic liquid crystal devices (Devices 8-D, 8-F, 8-G, 1-A, 1-B, 4-B and 6-C), respectively.

When a process of formation of an alignment (orientation) state of liquid crystal molecules in the cooling step (from isotropic phase to SmC* phase) was observed with a polarizing microscope for the respective devices, the formation of an alignment state through the generation and growth of batonnets from a temperature in the vicinity of the phase transition temperature to SmA phase as shown in FIGS. 3A–3C was observed with respect to the Devices 6-C, 8-F and 8-G.

With respect to the above-prepared liquid crystal devices, surface potentials of respective layers (of the polyimides and/or the polysiloxane) contacting the liquid crystal were measured in the same manner as in Experimental Example 4.

The results of measurement of the surface potential were equivalent to those measured in Experimental Example 4.

The liquid crystal devices were then subjected to evaluation of 1) uniformity in alignment, 2) initial alignment state, 3) drive margin parameter M2 (M2 margin), and 4) contrast ratio (C/R) in the same manner as in Experimental Example 4.

1) Alignment Uniformity

As a result of the observation, all the liquid crystal devices except for the Devices 1-B and 8-D (Half focal conic) showed a uniform alignment state over the entire visible region.

2) Initial Alignment State

With respect to the Cells 6-C and 8-F, the substrate provided with the polyimide film was disposed on a viewer (upper) side.

The results are shown in Table 20 below.

TABLE 20

| Device No. | Initial alignment** |
|---|---|
| 1-A | S1/S2 (50/50) |
| 1-B | Not observable |
| 4-B | S1 (100) |
| 6-C | S1/S2 (50/50) |
| 8-D | Not observable |
| 8-F | S1 (100) |
| 8-G | S1 (100) + S1/S2 (50/50) |

**"S1/S2 (50/50)" represents a state where an S1 state (50%) and an S2 state (50%) are observed in the entire visible region. "S1 (100)" represents an S1 state (100%) in the entire visible region. "S1 (100) + S1/S2 (50/50)" represents a state where the S1 (100) state is observed at the entire polyimide film portion and the S1/S2 (50/50) state is observed at a remaining portion (other than the polyimide portion) in the entire visible region.

3) M2 Margin

The results are shown in Table 21.

TABLE 21

| | Temperature (° C.) | | |
|---|---|---|---|
| Device No. | 40 | 25 | 10 |
| 1-A | 0.23 | 0.16 | 0.00 |
| 1-B | 0.15 | 0.14 | 0.10 |
| 6-C | 0.23 | 0.21 | 0.15 |
| 8-G | 0.23 | 0.21 | 0.15 |

In the above, the Devices 4-B, 8-D and 8-F using the polyimide film ("LP-64") in the effective drive regions failed to provide a bistability over the entire visible region since the liquid crystal molecules were placed in a mono-stabilized state (where the liquid crystal molecules were stabilized only in one of the two stable state providing a dark state in cross nicols).

As apparent from the above results, the Device 1-A provided relatively larger M2 margins at 40° C. and 25° C. (room temperature or above) but failed to provide substantially no M2 margin at 10° C. (low temperature side). This may be attributable to an influence of the reverse electric field as described hereinabove. The Device 1-B showing an inferior alignment characteristic had a relatively large capacitance (electric capacity) of the alignment control layer (polyimide film) due to a thinner alignment control layer compared with the Device 1-A although it provided relatively low M2 margins at measuring temperatures, thus resulting in a relatively small degree of a decrease in M2 margin at low temperature (10° C.).

On the other hand, the Devices 6-C and 8-G had a large capacitance of the alignment control layer in effective drive regions (effective switching regions) between the oppositely disposed substrates due to the thin polyimide film in the effective drive region effective in decrease the influence of the reverse electric field, thus leading to a less decrease in M2 margin at low temperature to provide a small temperature-dependence of M2 margin compared with the Devices 1-A and 1-B.

The contrast ratio (C/R) was measurable only with respect to the Devices 1-B, 6-C and 8-G due to their alignment characteristics.

The results are shown in Table 22.

TABLE 22

| Device No. | Contrast ratio (C/R) (at 30° C.) |
|---|---|
| 1-A | 20 |
| 6-C | 8 |
| 8-G | 60 |

In the Devices 1-A and 6-C, the liquid crystal composition (LC-1) substantially showed a bistability also in a portion (spacing) between the pixels (effective drive regions), thus resulting in a white domain (providing a white (bright) state) occupying a half of the entire visible region and a black domain (providing a black (dark) state) occupying a remaining half of the entire visible region. The white domain portion was also present at the spacing between the pixels and did not respond to an external electric field, thus causing light leakage thereat thereby to remarkably lower the contrast ratio (C/R).

On the other hand, at the pixel spacing portion each in the Device 8-G, a difference in surface potential between the two (upper and lower) substrates was large, thus resulting in a monostabilized (S1) state of liquid crystal molecules (i.e., asymmetrical surface potential state) at the pixel spacing portion. The Device 8-G were arranged to provide a light-interrupting state to the S1 state in combination with the cross nicol polarizers, thus ensuring a high contrast ratio (C/S) with no leakage of light from the pixel spacing portion.

What is claimed is:

1. A liquid crystal device, comprising:
a pair of substrates and a liquid crystal disposed in an alignment state between the substrates so as to form a plurality of pixels which in combination form an optical modulation region together with spacings between adjacent pixels,
at least one of the substrate having a surface contacting the liquid crystal and including a first region having a larger uniaxial alignment control force and a second region having a smaller or substantially no uniaxial alignment control force and providing the plurality of pixels, said first and second regions being both disposed in the optical modulation region and respectively acting on the liquid crystal in the optical modulation region,
whereby phase transition from isotropic phase to mesomorphic phase on temperature decrease has been initiated from a portion of the liquid crystal contacting the first region and enlarged toward the second region to place the liquid crystal in the alignment state.

2. A device according to claim 1, wherein said portion of the liquid crystal contacts a planar surface of said first region parallel to the substrate and shows a phase transition temperature from isotropic phase to mesomorphic phase higher than that at a portion contacting said second region.

3. A device according to claim 1, wherein said mesomorphic phase is smectic phase and said portion of the liquid crystal contacts a planar surface of said first region parallel to the substrate.

4. A device according to claim 3, wherein the liquid crystal is a chiral smectic liquid crystal showing a phase transition from isotropic phase to smectic phase.

5. A device according to claim 4, wherein only one of the substrates is provided with said first and second regions.

6. A device according to any one of claims 3–5, wherein said first region continuously extends in a longitudinal direction of smectic layers of the liquid crystal.

7. A device according to any one of claims 3–5, wherein said first region comprises an alignment control layer having a pattern consisting of a plurality of stripes extending in a longitudinal direction of smectic layers of the liquid crystal.

8. A device according to claim 7, wherein each of the stripes has a length in a direction of a normal to the smectic layer shorter than a spacing between adjacent stripes.

9. A device according to any one of claims 3–5, wherein the liquid crystal is a chiral smectic liquid crystal composition comprising at least one species of a fluorine-containing mesomorphic compound having a fluorocarbon terminal portion and a hydrocarbon terminal portion, said terminal portions being connected with a central core, and having a smectic phase or a latent smectic phase.

10. A device according to claim 1, wherein said at least one of the substrates has an entire planar area of said first region smaller than an entire planar area of said second region.

11. A device according to claim 1, wherein said first region comprises an alignment control layer comprising a rubbing-treated organic insulating film.

12. A device according to claim 1, wherein said first and second regions comprises different materials.

13. A device according to claim 1, wherein said second region comprises a layer having substantially no alignment control force and comprising a homeotropic alignment material.

14. A device according to claim 13, wherein said second region comprises at least one species of a material selected from the group consisting of a silane coupling agent, a fluorine-containing film and an organic modified silica.

15. A device according to claim 1, wherein one of the substrates is provided with an alignment control layer having substantially no alignment control force and contacting the liquid crystal at its entire surface.

16. A device according to claim 15, wherein a layer constituting said second region is formed on an entire surface of said at least one of the substrates and is selectively coated with an alignment control layer constituting said first region.

17. A device according to claim 1, wherein a layer constituting said second region is formed on an entire surface of said at least one of the substrates and is selectively coated with an alignment control layer constituting said first region.

18. A device according to claim 1, wherein each of the substrates is provided with a plurality of stripe-shaped electrodes, said stripe-shaped electrodes of the substrates intersect each other to form an electrode matrix structure; and said first region is disposed at least a portion other than each intersection of the electrodes on each substrate.

19. A device according to claim 1, wherein the liquid crystal comprises a first liquid crystal portion where first liquid crystal molecules in the vicinity of a boundary between the liquid crystal and said substrate surface in the first region and second liquid crystal molecules in a bulk state between the substrates form a substantially continuous alignment state and comprises a second liquid crystal portion where first liquid crystal molecules in the second region and corresponding second liquid crystal molecules form a substantially discontinuous alignment state.

20. A device according to claim 19, wherein a portion of said substrate surface corresponding to said second liquid crystal portion has substantially no uniaxial alignment control force.

21. A device according to claim 19, wherein the second region of said substrate surface corresponding to said second liquid crystal portion has an average surface roughness of at least 2 nm.

22. A device according to claim 21, where the second region has an average surface roughness of at least 2.5 nm.

23. A device according to claim 19, wherein the second region of said substrate surface corresponding to said second liquid crystal portion has a degree of surface roughness of at least 5%.

24. A device according to claim 19, wherein the liquid crystal comprising a plurality of effective drive regions and spacings therebetween, said effective drive regions corresponding to said second liquid crystal portion and said spacings corresponding to said first liquid crystal portion.

25. A device according to claim 19, wherein said portion of the liquid crystal contacts a planar surface of aid first region parallel to the substrate and shows a phase transition temperature from liquid phase to mesomorphic phase higher than that at a portion contacting said second region.

26. A device according to claim 19, wherein said mesomorphic phase is smectic phase and said portion of the liquid crystal contacts a planar surface of said first region parallel to the substrate.

27. A device according to claim 26, wherein the liquid crystal is a chiral smectic liquid crystal showing a phase transition from isotropic phase to smectic phase.

28. A device according to claim 27, wherein only one of the substrates is provided with said first and second regions.

29. A device according to any one of claims 26–28, wherein said first region continuously extends in a longitudinal direction of smectic layers of the liquid crystal.

30. A device according to any one of claims 26–28, wherein said first region comprises an alignment control layer having a pattern consisting of a plurality of stripes extending in a longitudinal direction of smectic layers of the liquid crystal.

31. A device according to claim 30, wherein each of the stripes has a length in a direction of a normal to the smectic layer shorter than a spacing between adjacent stripes.

32. A device according to any one of claims 26–28, wherein the liquid crystal is a chiral smectic liquid crystal composition comprising at least one species of a fluorine-containing mesomorphic compound having a fluorocarbon terminal portion and a hydrocarbon terminal portion, said terminal portions being connected with a central core, and having a smectic phase or a latent smectic phase.

33. A device according to claim 19, herein said at least one of the substrates has an entire planar area of said first region smaller than that of said second region.

34. A device according to claim 19, wherein said first region comprises an alignment control layer comprising a rubbing-treated organic insulating film.

35. A device according to claim 34, wherein said organic insulating film comprises a film of polyimide.

36. A device according to claim 19, wherein said second region corresponding to said second liquid crystal portion comprises a layer having a volume resistivity of $1.0 \times 10^4$–$1.0 \times 10^{10}$ ohm.cm.

37. A device according to claim 19, wherein said second region corresponding to said second liquid crystal portion comprises a polycrystalline or amorphous metal oxide film, a polycrystalline or amorphous semiconductor film or a film comprising an insulating binder and electroconductivity-imparted fine particles dispersed in the binder.

38. A device according to claim 19, wherein said second region contacting said second liquid crystal portion comprises a layer having substantially no uniaxial alignment control force, and an alignment control layer having a uniaxial alignment control force and comprising a material identical to that constituting the first region is disposed on said layer.

39. A device according to claim 38, wherein said layer has a volume resistivity of $1.0 \times 10^4$–$1.0 \times 10^{10}$ ohm.cm.

40. A device according to claim 38, wherein said layer comprises a polycrystalline or amorphous metal oxide film, a polycrystalline or amorphous semiconductor film or a film comprising an insulating binder and electroconductivity-imparted fine particles dispersed in the binder.

41. A device according to claim 19, wherein each of the substrates is provided with a plurality of stripe-shaped electrodes, said stripe-shaped electrodes of the substrates intersect each other to form an electrode matrix structure; and said first region is disposed at least a portion other than each intersection of the electrodes on each substrate.

42. A device according to claim 1, wherein the substrates are sandwiched between a pair of polarizing plates so as to modulate light passing through the device to provide a bright state and a dark state, and liquid crystal molecules corresponding to the first region are placed in an alignment state providing the dark state.

43. A device according to claim 42, wherein the liquid crystal comprising a plurality of effective drive regions and spacings therebetween corresponding to said first liquid crystal portion.

44. A device according to claim 42, wherein each of the substrates is provided with a plurality of stripe-shaped electrodes, said stripe-shaped electrodes of the substrates intersect each other to form an electrode matrix structure; and said first region is disposed at least a portion other than each intersection of the electrodes on each substrate.

45. A device according to claim 42, wherein said portion of the liquid crystal contacts a planar surface of said first region parallel to the substrate and shows a phase transition temperature from isotropic phase to mesomorphic phase higher than that at a portion contacting said second region.

46. A device according to claim 42, wherein said mesomorphic phase is smectic phase and said portion of the liquid crystal contacts a planar surface of said first region parallel to the substrate.

47. A device according to claim 46, wherein the liquid crystal is a chiral smectic liquid crystal showing a phase transition from isotropic phase to smectic phase.

48. A device according to claim 47, wherein only one of the substrates is provided with said first and second regions.

49. A device according to any one of claims 46–48, wherein said first region continuously extends in a longitudinal direction of smectic layers of the liquid crystal.

50. A device according to any one of claims 46–48, wherein said first region comprises an alignment control layer having a pattern consisting of a plurality of stripes extending in a longitudinal direction of smectic layers of the liquid crystal.

51. A device according to claim 50, wherein each of the stripes has a length in a direction of a normal to the smectic layer shorter than a spacing between adjacent stripes.

52. A device according to claim 42, wherein said at least one of the substrates has an entire planar area of said first region smaller than an entire planar area of said second region.

53. A device according to claim 42, wherein said first region comprises an alignment control layer comprising a rubbing-treated organic insulating film.

54. A device according to claim 42, wherein said first and second regions comprises different materials.

55. A device according to claim 54, wherein said second region comprises a layer having substantially no alignment control force and comprising a binder and electroconductive fine particles dispersed in the binder.

56. A device according to claim 42, wherein one of the substrates is provided with an alignment control layer having substantially no alignment control force and contacting the liquid crystal at its entire surface.

57. A device according to claim 56, wherein a layer constituting said second region is formed on an entire surface of said at least one of the substrates and is selectively coated with an alignment control layer constituting said first region.

58. A device according to claim 42, wherein a layer constituting said second region is formed on an entire surface of said at least one of the substrates and is selectively coated with an alignment control layer constituting said first region.

59. A device according to claim 42, wherein the liquid crystal is a chiral smectic liquid crystal composition comprising at least one species of a fluorine-containing mesomorphic compound having a fluorocarbon terminal portion and a hydrocarbon terminal portion, said terminal portions being connected with a central core, and having a smectic phase or a latent smectic phase.

60. A device according to claim 1, wherein each of the stripe-shaped electrodes comprises a transparent conductive film provided with a metal layer.

61. A device according to claim 1, wherein said first region comprises a first layer comprising a material identical to that for a second layer constituting said second region.

62. A device according to claim 61, wherein said first layer has a thickness larger than that of said second layer.

63. A device according to claim 61, wherein said first and second layers are provided by forming a layer having a uniform thickness and effecting selective patterning so as to impart said first and second layers to functions of said first and second regions, respectively.

64. A device according to any one of claims 61–63, wherein the liquid crystal comprises a first liquid crystal portion where first liquid crystal molecules in the vicinity of a boundary between the liquid crystal and said substrate surface in the first region and second liquid crystal molecules in a bulk state between the substrates form a substantially continuous alignment state and comprises a second liquid crystal portion where first liquid crystal molecules in the second region and corresponding second liquid crystal molecules form a substantially discontinuous alignment state.

65. A device according to claim 64, wherein the liquid crystal comprising a plurality of effective drive regions and spacings therebetween, said effective drive regions corresponding to said second liquid crystal portion and said spacings corresponding to said first liquid crystal portion.

66. A device according to claim 64, wherein said first and second regions comprise first and second layers, respectively, and said first and second layers are disposed on a layer comprising a binder and electroconductive fine particles dispersed in the binder.

67. A device according to any one of claims 61–63, wherein the substrates are sandwiched between a pair of polarizing plates so as to modulate light passing through the device to provide a bright state and a dark state, and liquid crystal molecules corresponding to the first region are placed in an alignment state providing the dark state.

68. A device according to claim 67, wherein the liquid crystal comprising a plurality of effective drive regions and spacings therebetween corresponding to said first liquid crystal portion.

69. A device according to claim 67, wherein each of the substrates is provided with a plurality of stripe-shaped electrodes, said stripe-shaped electrodes of the substrates intersect each other to form an electrode matrix structure; and said first region is disposed at least a portion other than each intersection of the electrodes on each substrate.

70. A device according to claim 1, wherein at least one of the substrates comprises an active matrix substrate provided with a plurality of pixel electrodes and a plurality of switching elements each corresponding to each pixel electrode, and said first region is disposed at least along an arrangement of the switching elements.

71. An method of aligning a liquid crystal, comprising:
providing a liquid crystal device including a pair of substrates and a liquid crystal disposed between the substrates so as to form a plurality of pixels which in combination form an optical modulation region together with spacings between adjacent pixels, at least one of the substrate having a surface contacting the liquid crystal and including a first region having a larger uniaxial alignment control force and a second region having a smaller or substantially no uniaxial alignment control force and providing the plurality of pixels, said first and second regions being both disposed in the optical modulation region and respectively acting on the liquid crystal in the optical modulation region, and
gradually cooling the liquid crystal from isotropic phase, whereby phase transition from isotropic phase to mesomorphic phase is initiated from a portion of the liquid crystal contacting the first region and enlarges toward the second region to place the liquid crystal in a prescribed alignment state.

72. A process for producing a liquid crystal device, comprising:
forming a cell comprising a pair of substrates disposed opposite to each other,
injecting a liquid crystal into the cell so as to form a plurality of pixels which in combination form an optical modulation region together with spacings between adjacent pixels, at least one of the substrates having a surface contacting the liquid crystal and including a first region having a larger uniaxial alignment control force and a second region having a smaller or substantially no uniaxial alignment control force and providing the plurality of pixels, said first and second regions being both disposed in the optical modulation region and respectively acting on the liquid crystal in the optical modulation region, and gradually cooling the liquid crystal from isotropic phase, whereby phase transition from isotropic phase to mesomorphic phase is initiated from a portion of the liquid crystal contacting the first region and enlarges toward the second region to place the liquid crystal in the alignment state.

73. A process according to claim 72, wherein said first and second regions are provided by successively forming a layer comprising a material constituting said second region on said at least one of the substrates and a layer comprising a material constituting said first region on said layer constituting said second region and by selectively removing and patterning said layer constituting said first region to expose said second region at a removal portion.

74. A process according to claim 73, wherein said material constituting said first region comprises an organic insulating material and said layer constituting said first region is patterned by ultraviolet ashing.

75. A process according to claim 72, wherein said first and second regions comprise an identical material and are provided by successively forming a layer comprising said material on said at least one of the substrates and partially removing and patterning said layer to form said second region at a partial removal portion and said first region at a non-removal portion.

76. A process according to claim 75, wherein said material comprises an organic insulating material and said layer constituting said first region is patterned by ultraviolet ashing.

* * * * *

UNITED STATES PATENT AND TRADEMARK OFFICE
CERTIFICATE OF CORRECTION

PATENT NO. : 6,195,147 B1
DATED : February 27, 2001
INVENTOR(S) : Yasufumi Asao et al.

It is certified that error appears in the above-identified patent and that said Letters Patent is hereby corrected as shown below:

<u>Title page,</u>
Item [57], ABSTRACT,
Line 63, "substrate" should read -- substrates --.

<u>Column 1,</u>
Line 29, "be" should read -- been --;
Line 36, "miliseconds" should read -- milliseconds --;
Line 63, "each" should read -- with each --.

<u>Column 2,</u>
Line 67, "device:" should read -- device --; and "comprising" should read
-- comprising: --.

<u>Column 4,</u>
Line 41, "crystal" should read -- crystal device --;
Line 62, "may" should read -- may be --.

<u>Column 5,</u>
Line 1, "an" should read -- and --;
Line 56, "show" should read -- shown --;
Line 67, "15a,i.e.," should read -- 15a, i.e., --; and "of a" should read -- a --.

<u>Column 6,</u>
Line 2, "such a" should read -- such --;
Line 7, "batonuets" should read -- batonnets' --;
Line 15, "direction(the" should read -- direction (the --.

<u>Column 7,</u>
Line 6, "drive of" should read -- driving --;
Line 42, "et al." should read -- et al., --.

UNITED STATES PATENT AND TRADEMARK OFFICE
CERTIFICATE OF CORRECTION

PATENT NO. : 6,195,147 B1
DATED : February 27, 2001
INVENTOR(S) : Yasufumi Asao et al.

It is certified that error appears in the above-identified patent and that said Letters Patent is hereby corrected as shown below:

Column 8,
Line 16, "phase a larger" should read -- phase with a larger --;
Line 18, "is" should read -- are --;
Line 42, "and" (1st occurrence) should be deleted;
Line 48, "sate" should read -- state --;
Line 58, "a film an" should read -- a film of an --;
Line 65, "Example" should read -- Examples --.

Column 9,
Line 23, "is" should read -- a --.

Column 10,
Line 24, "hating" should read -- having --.

Column 11,
Line 61, "ai" should read -- a --.

Column 14,
Line 4, "in" should be deleted;
Line 21, "a." should be deleted;
Line 37, "a" (1st occurrence) should be deleted.

Column 15,
Line 2, "ladder- type" should read -- ladder-type --;
Line 43, "case" should read -- a case --;
Line 46, "case" should read -- a case --;
Line 56, "0.01x 1%" should read -- 0.01 - 1% --.

Column 16,
Line 29, "encounted" should read -- encountered --;
Line 39, "device,localization" should read -- device, localization --;
Line 66, "changes" should read -- change --.

UNITED STATES PATENT AND TRADEMARK OFFICE
CERTIFICATE OF CORRECTION

PATENT NO.   : 6,195,147 B1
DATED        : February 27, 2001
INVENTOR(S)  : Yasufumi Asao et al.

It is certified that error appears in the above-identified patent and that said Letters Patent is hereby corrected as shown below:

Column 17,
Line 20, "from" should read -- form --; and "state" should read -- state, --;
Line 44, "state" should read -- state, --;
Line 67, "have" should read -- to have --.

Column 18,
Line 46, "1 the" should read -- In the --.

Column 19,
Line 19, "fist" should read -- first --;
Line 42, "provide" should read -- provides --.

Column 20,
Line 67, "an" should read -- and --.

Column 21,
Line 2, "50," should read -- 50 --;
Line 65, "has" should read -- have --.

Column 22,
Line 34, "obstacles" should read -- obstruct --;
Equation (A2): "$d_2=Vth_2x\varepsilon/2Ps.$" should read -- $d_2=Vth_2x\varepsilon/2Ps.$     (A2), --.

Column 23,
Line 3, "decrease" should read -- decreasing --;
Line 40, "bigorously" should read -- biguously --.

Column 24,
Line 3, "include" should read -- includes --;
Line 4, "a" should read -- a pair of --;
Line 33, "formed" should read -- are formed --;
Line 34, "arranged" should read -- are arranged --;
Line 66, "lack" should read -- black --.

UNITED STATES PATENT AND TRADEMARK OFFICE
CERTIFICATE OF CORRECTION

PATENT NO.    : 6,195,147 B1
DATED         : February 27, 2001
INVENTOR(S)   : Yasufumi Asao et al.

It is certified that error appears in the above-identified patent and that said Letters Patent is hereby corrected as shown below:

Column 25,
Line 3, "herein" should read -- wherein --
Line 4, "hose" should read -- those --;
Line 12, "sixth" should read -- fifth --;
Line 29, "descried" should read -- described --;
Line 35, "embodiment," should read -- embodiments, --;
Line 51, "each other" should be deleted.

Column 26,
Line 3, "an" should read -- and --;
Line 24, "7;" should read -- 7, --;
Line 55, "(plotted by)" should be deleted.

Column 27,
Line 17, "locating" should read -- located --.

Column 28,
Line 16, "intersection" should read -- intersections --;
Line 46, "constitution" should read -- constituting --;
Line 51, "are" should read -- is --.

Column 30,
Line 38, "ideally. The" should read -- the --;
Line 39, "40 retain" should read -- 40 ideally retain --.

Column 31,
Line 47, "substrate" should read -- substrates --.

Column 32,
Line 30, "regions" should read -- region --.

Column 33,
Line 32, "a-total" should read -- a total --;
Line 57, "pattern" should read -- patterns --.

UNITED STATES PATENT AND TRADEMARK OFFICE
CERTIFICATE OF CORRECTION

PATENT NO. : 6,195,147 B1
DATED : February 27, 2001
INVENTOR(S) : Yasufumi Asao et al.

It is certified that error appears in the above-identified patent and that said Letters Patent is hereby corrected as shown below:

Column 34,
Line 36, "1C, 1D and 1E" should read -- 1C to 1E --;
Line 55, "1C, 1D and 1E." should read -- 1C to 1E. --.

Column 35,
Line 41, "1C, 1D and 1E" should read -- 1C to 1E --;
Line 59, "failed to provide" should read -- provided --.

Column 36,
Line 3, "1C, 1D and 1E" should read -- 1C to 1E --;
Line 4, "in an" should read -- in --;
Line 59, "were" should read -- was --.

Column 37,
Line 1, "2-G, 2-H and 2-I," should read -- 2-G to 2-I, --;
Line 6, "2-G, 2-H and 2-I," should read -- 2-G to 2-I, --;
Line 38, "psec" should read -- μsec --.

Column 38,
Line 14, "substrate" should read -- substrates --.

Column 39,
Line 65, "spacer" should read -- spacer) --.

Column 40,
Line 11, "substrate" should read -- substrates --;
Line 22, "spacer" should read -- spacer) --;
Line 44, "were" should read -- was --;
Line 50, "as a" should read -- as --;
Line 56, "pattern" should read -- patterns --.

UNITED STATES PATENT AND TRADEMARK OFFICE
CERTIFICATE OF CORRECTION

PATENT NO.   : 6,195,147 B1
DATED        : February 27, 2001
INVENTOR(S)  : Yasufumi Asao et al.

It is certified that error appears in the above-identified patent and that said Letters Patent is hereby corrected as shown below:

Column 41,
Line 17, "absolution" should read -- a solution --;
Line 20, "50.nm-thick" should read -- 50 nm-thick --;
Line 22, "were" should read -- was --;
Line 31, "pattern" should read -- patterns --.

Column 43,
Line 26, "a less decrease" should read -- a smaller decrease --.

Column 45,
Line 34, "regions" should read -- region --;
Line 45, "290º" should read -- 200º --;
Line 50, "were" should read -- was --;
Line 61, "pattern" should read -- patterns --.

Column 47,
Line 54, "state" (first occurrence) should read -- states --;
Line 65, "a less decrease" should read -- a smaller decrease --.

Column 51,
Line 20, "wa" should read -- was --;
Line 48, "in an" should read -- in --;
Line 62, "(layers" should read -- layers --.

Column 52,
Line 12, "6-D" should read -- 6-D, --;
Line 45, "Vth," should read -- voltages Vth, --;
Line 52, "were" should read -- was --;
Line 64, "characteristic" should read -- is characteristic --.

Column 53,
Line 11, "value" should read -- values of --;
Line 24, "has" should read -- have --;
Line 44, "decrease" should read -- decreasing --;

UNITED STATES PATENT AND TRADEMARK OFFICE
CERTIFICATE OF CORRECTION

PATENT NO. : 6,195,147 B1
DATED : February 27, 2001
INVENTOR(S) : Yasufumi Asao et al.

It is certified that error appears in the above-identified patent and that said Letters Patent is hereby corrected as shown below:

Column 54,
Line 45, "a less decrease" should read -- a smaller decrease --;
Line 54, "a less decrease" should read -- a smaller decrease --;
Line 61, "cell" should read -- cells --.

Column 55,
Line 14, "(contacting" should read -- contacting --.

Column 56,
Line 47, "decrease" should read -- decreasing --;
Line 48, "a less decrease" should read -- a smaller decrease --.

Column 57,
Line 59, "wa" should read -- was --.

Column 58,
Line 54, "wa" should read -- was --.

Column 59,
Line 27, "wa" should read -- was --;
Line 42, "substrate," should read -- substrates, --.

Column 60,
Line 66, "state" should read -- states --.

Column 61,
Line 18, "decrease" should read -- decreasing --;
Line 19, "a lesser decrease" should read -- a smaller decrease --;
Line 46, "portion" should read -- portions --;
Line 51, "were" should read -- was --.

Column 62,
Line 50, "comprises" should read -- comprise --.

UNITED STATES PATENT AND TRADEMARK OFFICE
CERTIFICATE OF CORRECTION

PATENT NO.    : 6,195,147 B1
DATED         : February 27, 2001
INVENTOR(S)   : Yasufumi Asao et al.

It is certified that error appears in the above-identified patent and that said Letters Patent is hereby corrected as shown below:

Column 63,
Line 37, "comprising" should read -- comprises --;
Line 39, "sponding" should read -- spond --;
Line 40, "corresponding" should read -- correspond --;
Line 42, "aid" should read -- said --.

Column 64,
Line 5, "herein" should read -- wherein --.

Column 65,
Line 25, "comprises" should read -- comprise --.

Column 66,
Line 8, "comprising" should read -- comprises --;
Line 10, "sponding" should read -- spond --;
Line 11, "corresponding" should read -- correspond --;
Line 24, "comprising" should read -- comprises --;
Line 25, "corresponding" should read -- correspond --;
Line 39, "An" should read -- A --;
Line 45, "substrate" should read -- substrates --.

Signed and Sealed this

Thirtieth Day of July, 2002

*Attest:*

JAMES E. ROGAN
*Attesting Officer*   *Director of the United States Patent and Trademark Office*